US011741430B1

(12) United States Patent
Shogren et al.

(10) Patent No.: US 11,741,430 B1
(45) Date of Patent: Aug. 29, 2023

(54) INTEGRATED PRIORITIES AND ACTIVITIES ALIGNMENT, COORDINATION AND VISUALIZATION SYSTEMS AND METHODS

(71) Applicant: The Petergren Group, LLC, Washington, DC (US)

(72) Inventors: Brett Allen Shogren, Washington, DC (US); Per Anders Peterson, Washington, DC (US)

(73) Assignee: The Petergren Group, LLC, Washington, DC (US)

( * ) Notice: Subject to any disclaimer, the term of this patent is extended or adjusted under 35 U.S.C. 154(b) by 33 days.

(21) Appl. No.: 16/993,073

(22) Filed: Aug. 13, 2020

Related U.S. Application Data

(60) Provisional application No. 62/886,251, filed on Aug. 13, 2019.

(51) Int. Cl.
*G06Q 10/10* (2023.01)
*G06Q 10/0637* (2023.01)
(Continued)

(52) U.S. Cl.
CPC ....... *G06Q 10/10* (2013.01); *G06Q 10/06375* (2013.01); *G06Q 10/101* (2013.01); *G06Q 10/1093* (2013.01)

(58) Field of Classification Search
None
See application file for complete search history.

(56) References Cited

U.S. PATENT DOCUMENTS 10,540,152 B1 * 1/2020 Krishnaswamy ....... G06F 40/18
11,334,712 B1 * 5/2022 Nadig ..................... G10L 15/22
(Continued)

FOREIGN PATENT DOCUMENTS

| EP | 1560137 A1 * | 8/2005 | ............ G06Q 30/00 |
| WO | WO 2014146086 A2 * | 9/2014 | |
| WO | WO 2018148711 A1 * | 8/2018 | |

OTHER PUBLICATIONS

Yang, Jian, Infeasibility resolution based on goal programming, Computers and operations research 35_5, pp. 1483-1493, 2008 https://www.sciencedirect.com/science/article/pii/S03050548060019247via%3Dihub (Year: 2008).*
(Continued)

*Primary Examiner* — Octavian Rotaru
(74) *Attorney, Agent, or Firm* — Perkins Coie LLP

(57) ABSTRACT

Systems and methods for constructing a scheme containing one or more statements of a plurality of objectives and for using the constructed system are disclosed herein. The system receives an initial statement of a plurality of objectives related to an organization's strategy. For each objective the construction system provides access to one or more authorized users to enable the one or more authorized users to update the information on the objective; automatically analyzes the updated information to identify relationships in the objectives; automatically updates the information to include the one or more relationships; and automatically converts the updated information into a standardized format to publish the updated, converted information. The system includes storing the converted information on the plurality of components. The system then provides remote access to the updated, converted information to the one or more authorized users.

20 Claims, 66 Drawing Sheets

(51) Int. Cl.
   *G06Q 10/1093*   (2023.01)
   *G06Q 10/101*   (2023.01)

(56) References Cited

U.S. PATENT DOCUMENTS

| | | | | |
|---|---|---|---|---|
| 2008/0320000 A1* | 12/2008 | Gaddam | ............. | H04L 63/10 |
| | | | | 707/999.009 |
| 2009/0307598 A1* | 12/2009 | Giles | ............. | G06Q 10/10 |
| | | | | 715/744 |
| 2013/0111429 A1* | 5/2013 | Poole | ............. | G06Q 10/06 |
| | | | | 717/101 |
| 2016/0019661 A1* | 1/2016 | Bouganim | ............. | G06Q 50/01 |
| | | | | 705/319 |
| 2018/0060870 A1* | 3/2018 | Sirakanyan | ............. | G06Q 30/01 |
| 2020/0134643 A1* | 4/2020 | Bucknell | ............. | G10L 15/18 |
| 2020/0167498 A1* | 5/2020 | Pridgen | ............. | G06F 21/6245 |
| 2020/0320458 A1* | 10/2020 | Loreto | ............. | G06F 16/2365 |
| 2020/0366654 A1* | 11/2020 | De Beer | ............. | G06F 16/9574 |
| 2021/0272121 A1* | 9/2021 | Harris | ............. | G06N 5/048 |

OTHER PUBLICATIONS

Paksoyetal, A Multi-Objective Mixed Integer Programming Model for Multi Echelon Supply Chain Network Design and Optimization, System research and information technologies, 4 p. 47-p. 57, 2010 (Year: 2010).*

Mansouri, A multi-objective genetic algorithm for mixed-model sequencing on JIT assembly lines, Elsevier, 03772217, 2004 https://www.sciencedirect.com/science/article/pii/S0377221704004734 (Year: 2004).*

Haarslev V et al, Visualization and Graphical Layout in Object Oriented Systems, Journal of Visual Languages and Computing, 3, p. 1-23, 1992 https://citeseerx.ist.psu.edu/document?repid=rep1&type=pdf&doi=6a84feed37c8a929b09828fe8ac2bb542762eccc (Year: 1992).*

* cited by examiner

🏠 Home    📋 Strategy Management    ♀ Planning Whiteboard    My Dashboard    Paul Jones ▽

Heath Solutions Inc △ <u>Mission</u>    👥 My Admin

| BUSINESS PRIORITIES | FORM STATUS | LAST UPDATE | TEAM |
|---|---|---|---|
| CONTENT OWNER | | | CONTRIBUTOR |
| Trade ☐ | Complete: 100% | Jul 14, 2020 | Assign Contributor |
| USMCA ☐ | Complete: 83% | Jul 11, 2020 | Assign Contributor |
| Code Simplification ☐ | Complete: 76% | Jul 12, 2020 | Carol Johnson ☐ 🗑 |
| CONTENT CONTRIBUTORS | | | Owner |
| Intellectual Property ☐ | Complete: 100% | Jul 13, 2020 | Carol Johnson |
| Privacy ☐ | Complete: 95% | Jul 13, 2020 | Carol Johnson |
| Reimbursement ☐ | Complete: 95% | Jul 13, 2020 | Carol Johnson |

*FIG. 4B*

Haystack Strategy Capture Form

Per
1. WHAT'S THE ISSUE?
2. WHY DOES IT MATTER?
3. WHAT ARE YOU TRYING TO DO?
4. WHAT WILL IT TAKE TO ACHIEVE?
5. WHO'S WORKING ON IT?

[Save] [Share] [Submit]

What's the Issue?

Business Priority Name    View Contributors Input —430
Test Issue

Strategic Overview    View Contributors Input
Briefly summarize and describe so anyone in the business would understand what the core issue or challenge is and what we are referring to i.e. what's this topic all about?

[Next >]

500

532
John | 2020-07-17 13:29:08
I believe the market for these products and services will expand based on new technologies.

FIG. 5B

⌂ Home  ☰ Strategy Management  ♀ Planning Whiteboard  My Dashboard  Paul Jones ▽

Heath Solutions Inc      ⚙ My Admin Issue Edit

Data Capture Form — 500

Trade
1. WHAT'S THE ISSUE?
2. WHY DOES IT MATTER?
3. WHAT ARE YOU TRYING TO DO?
4. WHAT WILL IT TAKE TO ACHIEVE?
5. WHO'S WORKING ON IT?

💾 Save | ⮌ Share | ⊞ Submit

Why Does it Matter?

Criticality Scale          View Contributors Input
[ Important        ▼ ] — 528

Relevance to the Organization       View Contributors Input — 524
Briefly list and describe the keys ways the business will be impacted by the issue i.e. why does the business care?

1. New markets represents $10B min opportunity over 10 years. — 526
                                                    Remove — 540

2. Trade accounts for 30% of current revenue.
                                                    Remove 3. Open agreements are critical to ensure materials and components for devices can be obtained across the business. (50% of all components for

[ Add Relevancy ] — 534

Relevance to Each Business Unit    View Contributors Input
                        Critical    Very        Relevant
                                    Important
                                    Important

*FIG. 5C*

⌂ Home    🗎 Strategy Management    ♀ Planning Whiteboard    My Dashboard    Paul Jones ▽

Heath Solutions Inc    🎲 <u>My Admin Issue Edit</u>

Data Capture Form    ← 500

| Trade |
|---|
| 1. WHAT'S THE ISSUE? |
| 2. WHY DOES IT MATTER? |
| 3. WHAT ARE YOU TRYING TO DO? |
| 4. WHAT WILL IT TAKE TO ACHIEVE? |
| 5. WHO'S WORKING ON IT? |

[💾 Save] [⤴ Share] [🖉 Submit]

---

What Are You Trying To Do?

Do you know your desired outcome?    View Contributors Input
Succinctly separate and state the primary objectives/outcomes you are attempting to achieve

| 1. Enact new trade agreement with South American block. |
| --- |
| Remove |

| 2. Improve enforcement of Chinese agreements. |
| --- |
| Remove |

| 3. Ensure USMCA contains Medical Device Provisions. |
| --- |
| Remove |

| 4. Preserve existing Tariff Regime. |
| --- |

[Add Outcome]

Approach    View Contributors Input
Approach
[Select Approach ▽]

*FIG. 5D*

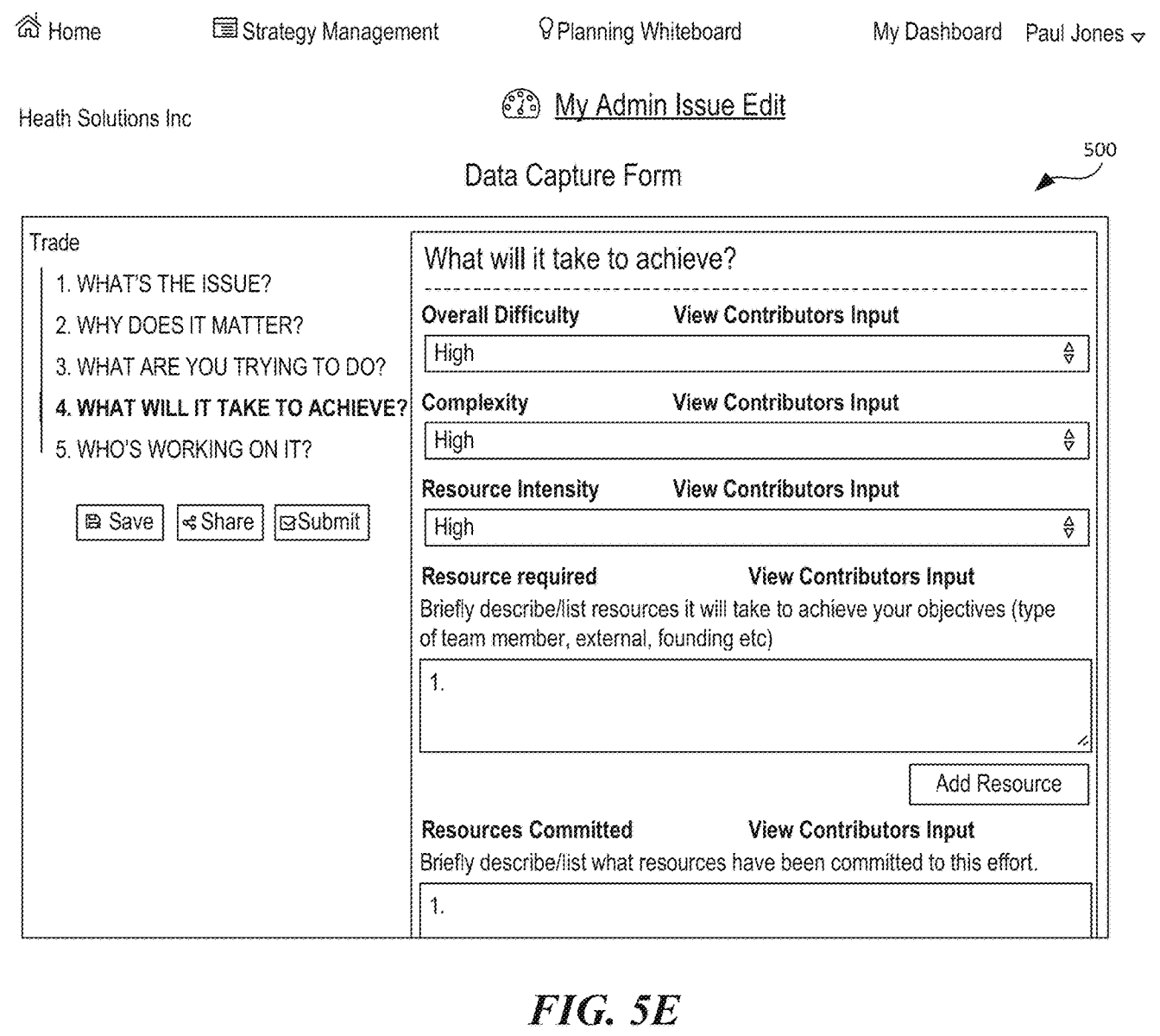

⌂ Home   ▤ Strategy Management   ♀ Planning Whiteboard   My Dashboard   Paul Jones ▽

Heath Solutions Inc   👥 My Admin Issue Edit

Data Capture Form — 500

Trade
1. WHAT'S THE ISSUE?
2. WHY DOES IT MATTER?
3. WHAT ARE YOU TRYING TO DO?
4. WHAT WILL IT TAKE TO ACHIEVE?
5. WHO'S WORKING ON IT?

What will it take to achieve?

Overall Difficulty   View Contributors Input
[High ⇕]

Complexity   View Contributors Input
[High ⇕]

Resource Intensity   View Contributors Input
[High ⇕]

Resource required   View Contributors Input
Briefly describe/list resources it will take to achieve your objectives (type of team member, external, founding etc)
1.

[Add Resource]

Resources Committed   View Contributors Input
Briefly describe/list what resources have been committed to this effort.
1.

[📄 Save]  [⇜ Share]  [✉ Submit]

*FIG. 5E*

🏠 Home　　🗎 Strategy Management　　♀ Planning Whiteboard　　My Dashboard　　Paul Jones ▽

Heath Solutions Inc

🜛 My Admin Issue Edit

Data Capture Form

Trade

1. WHAT'S THE ISSUE?
2. WHY DOES IT MATTER?
3. WHAT ARE YOU TRYING TO DO?
4. WHAT WILL IT TAKE TO ACHIEVE?
5. WHO'S WORKING ON IT?

💾 Save　⤴ Share　☑ Submit

Who's working on it?　　View Contributors Input

Gov't Agencies
☐ Dept of Commerce　　☐ USTR
☐ HHS　　　　　　　　☐ Ways and Means
☐ Finance　　　　　　 ☐ Approps
☐ Judicatory　　　　　 ☐ N/A
☐ Other Key decision makers - External　☐ N/A Name　　　　　　　　　　　Role Organization
[Select ▾]

Point of contact - External　☐ N/A　　View Contributors Input

Name　　　　　　　　　　　Role

[Add Decision Maker]

View Contributors Input

⌂ Home  ☰ Strategy Management  ♀ Planning Whiteboard  ▦ My Dashboard  Paul Jones ▽

Mission ~814
Heath Solutions Inc ⟁  ☰ Strategy Management  ○ Global Issues  ◉ My Issues

| Priorities | Business Units | Gov't Agencies | Analyze and Filter | Management/Reporting |

⬇ Download to PDF   🖶 Print as PDF

PRIORITIES                    STRATEGIC IMPERATIVES

[Intellectual Property]  [Patent Reform]  [International Protections]  ~804

[Trade]  [Tariffs]  [USMCA]  [China]  ~804

[Privacy]  [Consumer Bill of Rights]  [Standards]  ~804

[Reimbursement]  [Medicare Rates]  ~804

[Tax Reform]  [Code Simplification]  [Repatriation]  [R/D Tax Credit]  ~804

*FIG. 8A*

Business Priority

Drive Core Sales    912    Assign to Team Member

| What do we mean? | Why Does it Matter? | What Are You Trying To Do? | What will it take to achieve? | Who's working on it? | Notes / Documents |

| Relevance to the Business: Critical | Business Units |
|---|---|
| 1. Cake and Donuts represent 75% of total revenue to company - This is the core of the business and the primary source of its cash flow which must be preserved.<br>2. Cake and cupcake sales currently generate appx. $2,500,000 - (30,000 cakes per year and an additional 120,000 cupcakes). An achievable 10% Growth target can equal $300k in new sales.<br>3. Cake has extremely high profit margins, high predictability around events, holidays and occasions that can be easily capitalized upon, and consumers who can be targeted for repeatable sale opportunities.<br>4. Donuts currently generate approximately $95,000/month and can grow easily to $140,000/month (appx. $600k in additional revenue/year).<br>5. Downtown location already has excellent, large and excess production capability that can be leveraged to achieve even greater volumes and scale. | Critical<br><br>Corporate    Wholesale<br><br>Very Important<br><br>Retail    Specialty Cake |

Management Position/Guidance

1. We believe that cake and donuts are essential to the future success of the business. We want our customers to think of us first when they think of these items for themselves or any special occasion. (Y)
2. We will not sacrifice quality in these spaces, as they are the brand. We will focus efforts on 1) maintaining the high quality standards that have made these our core products, and 2) developing new high volume opportunities to achieve greater scale. (Y)

*FIG. 9B*

Business Priority

| Drive Core Sales | 912 | | | | Assign to Team Member |

- What do we mean?
- Why Does it Matter?
- What Are You Trying To Do?
- What will it take to achieve?
- Who's working on it?
- Notes / Documents

Outcomes, Timing & Tactics

| Desired Outcomes ✎ | Desired Approach: Partner ✎ |
|---|---|
| 1. Increase cake sales by 50% - from approximately $105,000/month to $150,000/month through addition of high volume institutional and 828 sales<br>2. Optimize synergies between locations and leverage under-utilized capacity.<br>3. Re-establish Wedding Cake business through gatekeeper partnerships to enable institutional event sales.<br>4. Create in house sales and service center with experienced staff. | Drive wholesale donut business and specialty cake business through an internal sales team focused on partnerships to enable scale and sales. Offerings should be harmonized across units in order to maximize efficiency. Emphasis should be on 1) addressing low hanging fruit opportunities with significant sales impact, and 2) high volume growth opportunities. |

| Critical Tactics ✎ | Timelines – Critical Hard Dates? ✎ |
|---|---|
| 1. Assign sales lead for cake. In Progress - on Track ☑ 〜940<br>2. List and define operational synergies between businesses with relative impact evaluated. In Progress - Resolving Issues ☐  940<br>3. Initiate mtgs with top 5 country clubs. Not Started X<br>4. Develop resource proposal for In-House Sales team. Completed ✓ | 1. Holiday Cake Plan Due:- Sep 30,2020<br>2. Draft Halloween plan for donuts and Cake:- Aug 28,2020<br>3. Bakery Convention:- Aug 19,2020<br>4. Test Event:- Jul 29,2020<br>5. Mtg with 3M to Supply their events in TC:- Jul 28,2020 |

*FIG. 9C*

| Trade | | | | 912 | Assign to Team Member |

| What's the Issue? | Why Does it Matter? | What Are You Trying To Do? | What will it take to achieve? | Who's working on it? | Notes / Documents |

External

| Gov't Agencies | 3rd Parties working on the Issue |
|---|---|
| 1. Dept of Commerce<br>2. USTR<br>3. Ways and Means<br>4. Finance | 1. US Trade Alliance<br>2. Coalition for Economic Freedom |

| Key Decision Makers (External) | Point Of Contact (External) |
|---|---|
| 1. Kate Anderson/ Role: Deputy Director/ Organization: USTR<br>2. Tom Williams / Role: Chairman/ Organization: Ways and Means | 1. Peter Connors / Role: Chief Counsel / Organization: Ways and Means |

Internal

| Key Stakeholders | Business Lead |
|---|---|
| 1. Leslie Whitaker/ Role: Trade Coordinator / Business Unit: European Medical<br>2. Thomas Stone / Role: General Manager/ Business Unit: us Devices | I. Kirsten Larsen / Role: Trade Coordinator / Business Unit: US Devices |

| Internal Team |
|---|
| 1. Policy Team<br>2. Legal<br>3. External Consultants |

*FIG. 9E*

⌂ Home  ≡ Strategy Management  ⌖ Planning Whiteboard  ▦ My Dashboard  Paul Jones ▽

Heath Solutions Inc  ⚭ Mission  ≡ Strategy Management  ○ Global Issues  ⊙ My Issues

| Priorities | Business Units | Gov't Agencies | Analyze and Filter | Management/Reporting |

PRIORITIES                STRATEGIC IMPERATIVES    ⤓ Download to PDF   🖶 Print as PDF

| Trade |    | China |

| Privacy |   | Consumer Bill of Rights |

| Reimbursement |   | Medicare Rates |

| Tax Reform |   | Code Simplification | Repatriation |

*FIG. 11*

| Priorities | Business Units | Gov't Agencies | Analyze and Filter | Management/Reporting |

European Medical  View By: ☑ Priorities  ☐ Strategic Imperatives

Critical

| Priorities | Description | Criticality | Difficulty | Complexity | Resource Intensity | Resources Required |
|---|---|---|---|---|---|---|
| Trade | Ensuring free and open ...more | Very Important | Low | Medium | High | 1. Internal expert to outlin<br>2. External consultant to<br>3. US Chamber/High Tec |

Very Important

| Priorities | Description | Criticality | Difficulty | Complexity | Resource Intensity | Resources Required |
|---|---|---|---|---|---|---|
| Privacy | Ensuring new privacy ...more | Very Important | High | High | High | 1. 25 Legal Liaison to dr<br>2. External firm to audit<br>3. Internal Industry Coal |

Important

| Priorities | Description | Criticality | Difficulty | Complexity | Resource Intensity | Resources Required |
|---|---|---|---|---|---|---|
| Intellectual Property | Ensuring that legislat ...more | Critical | High | High | High | 1. .5 FTE from internal<br>2. Internal hill manager<br>3. $400k industry dues |
| Reimbursement | Creating a fair and tr ...more | Critical | Medium | Low | High | 1. 3 external firms with ex<br>2. 3 internal finance lead<br>3. 5 internal policy exper |

Relevant

| Priorities | Description | Criticality | Difficulty | Complexity | Resource Intensity | Resources Required | Resources Commited | Ext. Partners/Tr |
|---|---|---|---|---|---|---|---|---|

Home | Strategy Management | Planning Whiteboard | My Dashboard   Paul Jones ▼

Health Solutions Inc △ Mission ≡ Strategy Management   ○ Global Issues ⊙ My Issues

| Priorities | Business Units | Gov't Agencies | Analyze and Filter | Management/Reporting |

View By:
☑ Priorities
☐ Strategic Imperatives

Business Units:
☐ All
☐ European M
☐ US Devices
☐ Heart Soluti...
☐ Health Tech..

Gov't Agencies:
☐ All
☐ HHS
☐ Approps
☐ Dept of Co..
☐ Ways and ..
☐ Judiciary
☐ USTR
☐ Finance Sort by:  ○ Priority  ○ Criticality Scale  ○ Overall Difficulty  ○ Resource Intensity

[Hide Filter]

| Priorities | Description | Criticality | Difficulty | Complexity | Resource Intensity | Resource Required | Resource Cor |
|---|---|---|---|---|---|---|---|
| Intellectual Property | Ensuring that legislat ...more | Critical | High | High | High | 1. .5 FTE from internal<br>2. Internal hill manager<br>3. $400k industry dues | 1. Internal Leg<br>2. Partial Budg |
| Trade | Ensuring free and open ...more | Very Important | Low | Medium | High | 1. Internal expert to outlin<br>2. External consultant to<br>3. US Chamber/High Tec | 1. External con<br>2. Gov Affairs |
| Privacy | Ensuring new privacy ...more | Very Important | High | High | High | 1. 25 Legal Liaison to dr<br>2. External firm to audit<br>3. Internal Industry Coal | 1. TBD |
| Reimbursement | Creating a fair and tr ...more | Critical | Medium | Low | High | 1. 3 external firms with ex<br>2. 3 internal finance lead<br>3. 5 internal policy exper | 1. Associate c<br>2. Simmons Do |

Heath Solutions Inc △ Mission  ☰ Strategy Management  ○ Global Issues  ⦿ My Issues

| Priorities | Business Units | Gov't Agencies | Analyze and Filter | Management/Reporting |

View By:
☑ Priorities
☐ Strategic Imperatives

Business Units
☐ All
☐ European M
☐ US Devices
☐ Heart Soluti..
☐ Health Tech..

Gov't Agencies
☐ All
☐ HHS
☐ Approps
☐ Dept of Co..
☐ Ways and..
☐ Judiciary
☐ USTR
☐ Finance Sort by: ○ Priority   ○ Criticality Scale   ○ Overall Difficulty   ○ Resource Intensity Hide Filter

| Priorities | Unit Impacted | Ext. Partners/Targets | Desired Outcome | Critical Tactics |
|---|---|---|---|---|
| Intellectual Property d 20L | • European Medical<br>• Health Techtronics<br>• Heart Solutions<br>• US Devices | • Dept of Commerce<br>• Judiciary<br>• USTR | 1. Extend patent protection time..<br>2. Authorize PTO through 2022...<br>3. Establish new Liaison office w | 1. ID Principles internally<br>2. Create Education Mate<br>3. Draft proposal with Les |
| Privacy | • European Medical<br>• Health Techtronics<br>• Heart Solutions<br>• US Devices | • Dept of Commerce<br>• HHS<br>• Judiciary | 1. Establish new industry guideli...<br>2. Enact clear and understanda... | 1. Create Internal View of<br>2. Meeting with Industry I,<br>3. Policy Team Mtg with Ir<br>4. New tactic July 13 |
| Tax Reform gres | • Health Techtronics<br>• Heart Solutions<br>• US Devices | • Finance<br>• Ways and Means | 1. Enact rates to make US more...<br>2. Allow repatriation of oversea..<br>3. Simplify code to reduce com | 1. CEO's meeting with W/t<br>2. Develop Policy Paper<br>3. Prioritize top 3 Change<br>4. BOD Presentation on st |
| Reimbursement n CF Expe | • European Medical<br>• Health Techtronics<br>• Heart Solutions<br>• US Devices | • Finance<br>• HHS<br>• Ways and Means | 1. Audit and establish clear and ..<br>2. Create industry backed stan...<br>3. Maintain current rates for cor...<br>4. Eliminate costly and confusin... | 1. Hire External Audit Firm<br>2. Meet with industry Coc<br>3. Develop internal posit |

*FIG. 14B*

| View By: | Business Units | | Strategic Partners | |
|---|---|---|---|---|
| ✓ Business Priorities | ☐ All | ☐ Corpor... | ☐ All | ☐ SYSCO | ☐ Iverson... |
| Strategic Imperatives | ☐ Wholes... | ☐ Retail | ☐ 7-11 Ga... | ☐ Davis Fr... | ☐ Nation... |
| | ☐ Special... | | ☐ SuperF... | ☐ Univers... | ☐ AMGB... |
| | Sort by: | ○ Priority ○ Criticality ○ Overall Difficulty ○ Complexity ○ Resource Intensity | | | |
| | | Hide Filter | | | |

| Compare | strategic imperatives | Description | Relevancy | Criticality | Overall Difficulty | Complexity | Resource Intensity |
|---|---|---|---|---|---|---|---|
| ☒ | Gourmet Cakes | Intentionally focusing on the hi... more | 1. Cake is largest part of b...<br>2. High Impact - Cake is...<br>3. Cake is THE primary foc...<br>4. Cake is the unlocking p... | Critical | High | Low | High |
| ☐ | Baking Systems | Making the baking process more e... more | 1. Current ovens can only...<br>2. Energy costs account f...<br>3. St. Paul location ovens... | Critical | High | Medium | High |
| ☒ | Social Media | Making Social Media a core compo... more | 1. Modernizes business an...<br>2. Ability to highly target...<br>3. Critical to cake and oc...<br>4. Allows us to control me... | Critical | Medium | Medium | High |
| ☐ | Packaged Donuts | Optimize the current best approa... more | 1. Extremely high margin...<br>2. Currently generates m...<br>3. Excellent offering to soli... | Critical | Low | Low | Medium |

| Compare | strategic imperatives | Description | Relevancy | Criticality | Overall Difficulty | Complexity | Resource Intensity |
|---|---|---|---|---|---|---|---|
| ☒ | Holidays | Creating new and predictable sal... more | 1. Targeted Holiday progr...<br>2. Creates new opportuni...<br>3. Creates new opportuni...<br>4. Predictable and easy... | Very Important | High | Low | High |
| ☐ | Email/CRM | Being able to communicate with o... more | 1. Repeat sales through t...<br>2. Better customer enga...<br>3. High targeted growth t... | Very Important | High | High | High |
| ☐ | Bread | Leverage the production capacity... more | 1. High Gross Margin Prod...<br>2. Customer retention/hi...<br>3. Scalability through wh... | Very Important | Medium | Low | Low |

*FIG. 14C*

| View By: | Business Units | | Strategic Partners | | |
|---|---|---|---|---|---|
| Business Priorities | ☐ All | ☐ Corpor... | ☐ All | ☐ SYSCO | ☐ Iverson. |
| ✓ Strategic Imperatives | ☐ Wholes... | ☐ Retail | ☐ 7-11 Ga... | ☐ Davis Fr... | ☐ Nation... |
| | ☐ Special | | ☐ SuperF-. | ☐ Univers... | ☐ AMGB... |

Sort by:  ○ Priority  ○ Criticality  ○ Overall Difficulty  ○ Complexity  ○ Resource Intensity

[Hide Filter]

| Compare | strategic imperatives | Description | Relevancy | Criticality | Overall Difficulty | Complexity | Resource Intensity |
|---|---|---|---|---|---|---|---|
| ☒ | Gourmet Cakes | Intentionally focusing on the hi ... more | 1. Cake is largest part of b...<br>2. High Impact - Cake is ...<br>3. Cake is THE primary foe...<br>4. Cake is the unlocking p... | Critical | High | Low | High |
| ☒ | Holidays | Creating new and predictable sal... more | 1. Targeted Holiday progr ...<br>2. Creates new opportuni...<br>3. Creates new opportuni...<br>4. Predictable and easy ... | Very Important | High | Low | High |
| ☒ | Social Media | Making Social Media a core compo ... more | 1. Modernizes business an ...<br>2. Ability to highly target ...<br>3. Critical to cake and oc...<br>4. Allows us to control me... | Critical | Medium | Medium | High |

*FIG. 14D*

| Priorities | Business Units | Gov't Agencies | Analyze and Filter | Management/Reporting |
|---|---|---|---|---|

| ☑ Priorities | ☐ All Dates | ☐ Intellectual Pro... | ☐ Trade | ☐ Privacy | ☐ Reimbursement | ☐ Tax Reform |
|---|---|---|---|---|---|---|
| ☐ Gov't Agencies | ☐ Multiple | | | | | |

| < | > | month | week | day | | July 2020 | | Add New Priority/Imperative Date | Add General date |
|---|---|---|---|---|---|---|---|---|---|

| Sun | Mon | Tue | Wed | Thu | Fri | Sat |
|---|---|---|---|---|---|---|
| 28 | 29 | 30 | 1<br>White paper on privacy | 2 | 3 | 4<br>new critical date test date entry from form |
| 4<br>Planning Session 1<br>USPTO Summit Workshop | 6 | 7<br>ID potential external aud | 8<br>China Planning Session | 9 | 10<br>Align on coalition m<br>Internal Legal Compliance | 11 |
| 12<br>Business Leaders 360 | 13 | 14<br>Medical Summit W | 15 | 16<br>Chine Trade Delegation<br>W/M Hearing on R/D Cre | 17 | 18 |
| 19<br>Planning Session 2<br>Privacy test date july 20<br>R&D Workshop | 20 | 21<br>brett test with suma<br>Technical Worksho | 22<br>W/H Meeting on Consume... | 23<br>CEO speech to Chamber | 24<br>USMCA Comments due | 25 |
| 26<br>Tax Roundtable | 27 | 28<br>W/M Hearing on Rates<br>new date | 29<br>Mtg with Gen Cou.<br>Tax Statement R...<br>US Devices CEO...<br>Ways and Means..<br>brett and per test | 30<br>Meeting with CEO | 31<br>Internal patent fi..<br>Internal Privacy Po..<br>Privacy no save da..<br>Tariffs Expire | |

Business Priority [Version]

| What's the Issue? | Why Does it Matter? | What Are You Trying To Do? | What will it take to achieve? | Who's working on it? | Current Version vs. [May 02, 2019] Notes / Documents |

Strategic Overview

Briefly summarize and describe so anyone in the business would understand what the core issue or challenge is and what we are referring to i.e. what's this topic all about? It is the latest version. ⎯1518

[May 02, 2019]

Strategic Overview

Briefly summarize and describe so anyone in the business would understand what the core issue or challenge is and what we are referring to i.e. what's this topic all about? edit ⎯1518

[June 02, 2019]

Strategic Overview

Briefly summarize and describe so anyone in the business would understand what the core issue or challenge is and what we are referring to i.e. what's this topic all about? <u>We have added multiple new capabilities to solve new challenges.</u> ⎯1518

*FIG. 15E*

!Business Priority: Trade

I. What's the Issue?

- Issue Description
  Ensuring free and open markets for our products through clear and enforceable trade agreements, and pursuing new agreements to open markets in developing countries where we can help build sustainable and lasting markets for our products that benefit the population. Our primary focus is on enforcing agreements with China and the EU, and developing new agreements in Asia, Africa and South America.

- Strategic Imperatives
  1) Tariffs 2) USMCA 3) China

- Government Activity
  1) Executive:
     1) WH seeking to initiate new agreements before election. Proposals must be completed and submitted by Jun. 1 in order to have opportunity for passage. 2) POTUS calligraphies for national campaign.
  2) Legislative:
     1) House is committed to passing any agreements sent up as long as sufficient labor protections are in place. Senate Leadership will not allow bill without majority publicly committed before passage.

- Other Activity(External etc)
  1) Anti-trade coalition running ads claiming trade harms workers. 2) Protests in 50 cities, including outside Midwest Corporate headquarters highlighting our

*FIG. 15F*

 Drive Core Sales     One Pager

Strategic Overview

These are the key products that have historically made the business successful, and represent large opportunities for growth. Preserving and growing the business in these core products is necessary in order to generate the sufficient cash flow to support the existing business and invest in growth in other areas.

Relevance to the Business: Critical

1. Cake and Donuts represent 75% of total revenue to company - This is the core of the business and the primary source of its cash flow which must be preserved.
2. Cake and cupcake sales currently generate appx. $2,500,000 - (30,000 cakes per year and an additional 120,000 cupcakes). An achievable 10% Growth target can equal $300k in new sales.
3. Cake has extremely high profit margins, high predictability around events, holidays and occasions that can be easily capitalized upon, and consumers who can be targeted for repeatable sale opportunities.
4. Donuts currently generate approximately $95,000/month and can grow easily to $150,000/month (appx. $600k in additional revenue/year).
5. Downtown location already has excellent, large and excess production capability that can be leveraged to achieve even greater volumes and scale.

Strategic Imperatives

| Gourmet Cakes | Packaged Donuts |

Desired Outcome

1. Increase cake sales by 50% - from approximately $105,000/month to $150,000/month through addition of high volume institutional and 828 sales
2. Optimize synergies between locations and leverage under-utilized capacity.
3. Re-establish Wedding Cake business through gatekeeper partnerships to enable institutional event sales.
4. Create in house sales and service center with experienced staff.

Critical Dates

Core Sales Team Meeting:- Jul 15, 2020

Critical Tactics

1. Assign sales lead for cake. In Progress - on Track ☑
2. List and define operational synergies between businesses with relative impact evaluated. In Progress - Resolving Issues ☐
3. Initiate mtgs with top 5 country clubs. Not Started X
4. Develop resource proposal for In-House Sales team. Completed ✓

Consumer Insights

1. Consumers prefer Bake Shop branded cake and donut flavors to most pre-packaged brands.
2. Yeast donuts are preferred to Cake donuts.
3. Consumers are moving away from packaged products to locally made fresh baked goods.

*FIG. 15G*

Strategy Management

Heath Solutions Inc — Mission

○ Global Issues  ○ My Issues

| Priorities | Business Units | Gov't Agencies | Analyze and Filter | Management/Reporting |

[Trade]  ⊙ One Pager

Strategic Overview

Ensuring free and open markets for our products through clear and enforceable trade agreements, and pursuing new agreements to open markets in developing countries where we can help build sustainable and lasting markets for our products that benefit the population. Our primary focus is on enforcing agreements with China and the EU, and developing new agreements in Asia, Africa and South America.

Relevance to the Organization: Very Important

1. New markets represent $10B min opportunity over 10 years.
2. Trade accounts for 30% of current revenue.
3. Open agreements are critical to ensure materials and components for devices can be obtained across the business. (50% of all components for US Devices come from Asia and South America).

Strategic Imperatives

[Tariffs] [USMCA] [China]

Desired Outcome

1. Enact new trade agreement with South American block.
2. Improve enforcement of Chinese agreements.
3. Ensure USMCA contains Medical Device Provisions.
4. Preserve existing Tariff Regime.

Critical Tactics

1. ID the top 5 benefits for company and industry from potential new S. America Trade Agreement. In Progress - on Track ☐
2. Align on core issues between us/s. America with Industry response - In Progress - Resolving Issues ☐
3. Meet with Internal Chinese Leads Not Started x
4. CEO Alignment Briefing for Hill Mtgs Not Started x

Timeline - Critical Hard Dates?

Mtg With DOC Undersec:- Aug 28,2020
Trade Team Planning Meeting:- Aug 04,2020
China Trade Delegation:- Jul 15,2020

Global Devices Summit Officially Starts:- Aug 18,2020
Ways and Means Hearing on Trade Policy:- Jul 29,2020

*FIG. 15H*

Heath Solutions Inc △ Mission

| Priorities | Business Units | Gov't Agencies | Analyze and Filter | Management/Reporting |

○ Global Issues  ○ My Issues

Issue By Person    View By: ☑ External Relationships    Internal Contacts

Superfoods Grocery Chain

| Name ⇅ | Role ⇅ | Issue ⇅ | Accountability ⇅ |
|---|---|---|---|
| Jeremy Rice | VP of Baked Goods | New Locations – Existing Biz | Stakeholders |
|  | VP of Baked Goods | Pastry |  |
| Joel Harris | Business Development VP | Bread | Stakeholders |
| Kelly Thomas | General Manager - HrBeks | Bread | Stakeholders |
| Lisa Schock | Deputy Director of Sales | Pastry | POC |
| Missy Brooks | Procurement Manager | Bread | Stakeholders |

Davis Frozen Dough

| Name ⇅ | Role ⇅ | Issue ⇅ | Accountability ⇅ |
|---|---|---|---|
| Greg Davis | CFO | Secondary Product Assortment | Stakeholders |
|  | Bakery Sales Lead | Efficiency |  |
|  | Bakery Sales Lead | Pastry |  |
| Peter Roedel | Bakery Sales Lead | Efficiency | POC |
|  | Bakery Sales Lead | Secondary Product Assortment |  |
|  | Bakery Sales Lead | Cookies |  |
| Peter Wolf | Bakery Sales Lead | Cookies | Stakeholders |
|  | Bakery Sales Lead | Cookies |  |

Wagsness Gas Stations

| Name ⇅ | Role ⇅ | Issue ⇅ | Accountability ⇅ |
|---|---|---|---|

*FIG. 15I*

| Trade | | | | 🖨 Print as PDF |
|---|---|---|---|---|
| | Trade | Tariffs | USMCA | China |
| + Policy Team | ○ | ○ | ○ | ○ |
| | Trade | Tariffs | USMCA | China |
| Federal | ○ | ○ | ○ | ○ |
| State | | | | |
| Legal | ○ | | ○ | |
| + External Consultants | ○ | ○ | ○ | ○ |
| + Communications | | ○ | ○ | ○ |

| Privacy | | | 🖨 Print as PDF |
|---|---|---|---|
| | Privacy | Consumer Bill of Rights | Standards |
| + Policy Team | ○ | ○ | ○ |

*FIG. 15J*

| Policy Team | Legal | External Consultants | Communications |

Resource | Priorities/Strategic Imperatives

External Consultants ☐

Thompson Advisors
- Trade | USMCA
- Reimbursement
- Tax Reform | R/D Tax Credit
- Privacy

Withers and Roberts Law Firm
- International Protections | Patent Reform | Intellectual Property
- Consumer Bill of Rights | Standards | Privacy
- Repatriation

Blue Sky, LLC.
- Trade | USMCA | China
- Reimbursement
- Tax Reform
- Intellectual Property

*FIG. 15K*

Critical Tactics: Status

View By: ☑ Priorities ☐ Status

Trade

In Progress -- On Track ☑

- ID the top 5 benefits for company and industry from potential new S. America Trade Agreement. — Trade
- CEO Mtg with USTR Leads. — USMCA
- Include key materials in Industry Submission. — Tariffs
- Draft and submit rules proposal to Congressional committees by Jan 15 — China

In Progress - Resolving Issues ☐

- Align on core issues between US/S. America with Industry response - In Progress — Trade
- Align on Principles internally by Jan 31. — USMCA
- Meetings with House and Senate Members where we have locations — Tariffs
- Industry Leadership mtg to align on recommendations for monitoring — China

Completed

- Draft Framework based on internal needs by Dec 1. — China

Not Started ✗

- Meet with Internal Chinese Leads — Trade

Admin
  Online
  Dashboard
  Organizations and Users    Admin
  Super Admin
  Subscription Request
  Activity Organizations and Users Version 1.0.0

☐ Add Organization

Organizations and Users                        Search:                                      🏠 Home > Organizations and Users

TEST ORGANIZATION  | &+ Add User | ☐ Business Units | 🏢 Partners | ⊡ Approach | ⊚ Field Label | ▾ Filter Page | ≡ Tab Settings | Edit | Delete TEST COMPANY  Basic

| Name | Email | Business Owner | Role | Date | Action | | |
|---|---|---|---|---|---|---|---|
| John Sadface | testuser1@petergren.com | | Power User | 07/13/2020 | Assign | Edit | Delete |
| Sally | sally@petergren.com | Group Owner | Group owner | 07/14/2020 | Assign | Edit | Delete |

Clean Group  Premium   &+ Add User   ☐ Business Units  🏢 Partners  ⊡ Approach  ⊚ Field Label  ▾ Filter Page  ≡ Tab Settings  Edit  Delete

| Name | Email | Business Owner | Role | Date | Action | | |
|---|---|---|---|---|---|---|---|
| User 2 | testuser2@petergren.com | Group Owner | Group owner | 07/13/2020 | Assign | Edit | Delete |
| John Sadface | testuser1@petergren.com | User 2 | User | 07/13/2020 | Assign | Edit | Delete |

Advocacy Demo  &+ Add Organization Group   Organization Owner: Jim Lobbyist                                                                  Edit | Delete Health Solutions Inc.  Premium  &+ Add User  ☐ Business Units  🏢 Partners  ⊡ Approach  ⊚ Field Label  ▾ Filter Page  ≡ Tab Settings  Edit  Delete

| Name | Email | Business Owner | Role | Date | Action | | |
|---|---|---|---|---|---|---|---|
| Paul Jones | pauljones@petergren.com | Group Owner | Group owner | 07/09/2020 | Assign | Edit | Delete |
| John Health | johnhealth@petergren.com | Paul Jones | User | 07/11/2020 | Assign | Edit | Delete |
| Carol Johnson | carol@petergren.com | Paul Jones | User | 07/16/2020 | Assign | Edit | Delete |

*FIG. 19*

Step 1: Select Your Industry [PhRMA/Biotech]

User selects PhRMA/Biotech as their industry and is presented with a set of predefined templates or the option to customize a template. They can view the template for more information or purchase the template.

Step 2: View Templates

Sample 1 – Advocacy

| BUSINESS PRIORITIES | STRATEGIC IMPERATIVES | | |
|---|---|---|---|
| Intellectual Property | Patent Reform | International Protections | |
| Trade | Tariffs | USMCA | China |
| Privacy | Consumer Bill of Rights | Standards | |
| Reimbursement | Medicare Rates | | |
| Tax Reform | Code Simplification | R/D Tax Credit | Repatriation |

[View] [Purchase]

Sample 2 – Manufacturing

| BUSINESS PRIORITIES | STRATEGIC IMPERATIVES | |
|---|---|---|
| Prevention | Travel Protocols | Vaccination |
| Detection | Diagnostics | Global Monitoring |
| Rapid Response | Coordination | Communication |
| Treatment | High Risk Populations | Critical Supplies |
| Critical Healthcare Infrs. | Physicians/Nurses | Hospitals |
| Supply Chain | Agility | Stockpiles | Chokepoints |
| Economic Mitigation | Financial Services Backstop | |
| Future Proofing | New Technologies | Data Infrastructure |

[View] [Purchase]

Sample 3 – R & D

| BUSINESS PRIORITIES | STRATEGIC IMPERATIVES | |
|---|---|---|
| Process Efficiency | Metrics | Documentation |
| Product Development | Systems | |
| Standards | Quality | Safety |
| Science & Technology | Oversight | Analysis |

[View] [Purchase]

Sample 4 – Custom

Order Custom

[View] [Purchase]

*FIG. 21B*

Step 2: View Templates

User selects PhRMA/Biotech and then chooses the Advocacy Template and the user can then look into the content.

Sample 1 - Advocacy

Click any of the boxes to view the content for this template

| BUSINESS PRIORITIES | STRATEGIC IMPERATIVES | |
|---|---|---|
| Intellectual Property | Patent Reform | International Protections |
| Trade | Tariffs | China |
| Privacy | Consumer Bill of Rights | Standards |
| Reimbursement | Medicare Rates | |
| Tax Reform | Code Simplification | Repatriation | R/D Tax Credit |

Back    Purchase

*FIG. 21C*

Step 2: View Templates

Within the Advocacy Template the user has clicked on "Intellectual Property" to view the content to see if they want to purchase the template etc.

Sample 1 – Advocacy – Intellectual Property

Business Priority

[Intellectual Property]

| What's the Issue? | Why Does it Matter? | What Are You Trying To Do? | What will it take to achieve? | Who's working on it? |
|---|---|---|---|---|

[Notes / Documents]

Strategic Overview

Ensuring that legislation and regulation is pursued and enacted that guarantees patent holders sufficient time to recover large scale investment in new innovations. This includes modifications to existing patent and trademark enforcement and pursuing patent modernization legislation to reflect 21st century realities around 1) large scale capital investments, and 2) the technological realities around high tech inventions and components.

Strategic Imperatives

[Patent Reform]   [International Protections]

Government Activity

Executive
1. PTO Draft Authorization Language Due to Hill By Jan 2021.
2. WH vowing to veto any patent bill that doesn't include strong international protections.

Legislative
1. E/C Hearing on PTO Waste/Abuse
2. House Judiciary Chairman wants bipartisan bill signed into law before October 2020. But wants agreement between large and small tech businesses.

Other Activity (External etc)
1. Patent Innovation Coalition launching national campaign to educate voters on impact of IP on prices.

[Back]   [Purchase]

*FIG. 21D*

Step 2: View Templates

Sample view of content made available for purchase for a user. In this view a snippet of information is presented to the user for purchase.

Sample 1 – Advocacy – Intellectual Property

Business Priority: Intellectual Property

| What's the Issue? | Why Does it Matter? | What Are You Trying To Do? | What will it take to achieve? | Who's working on it? |

Strategic Overview

Recommended Content – [Purchase Content]

Ensuring that legislation and regulation is pursued and enacted that guarantees patent holders...

Strategic Imperatives

Patent Reform | International Protections

Government Activity

Executive [Purchase Content]

Recommended Content –

White House vowing to veto any patent bill that doesn't include strong international protection....

Legislative [Purchase Content]

Recommended Content –

House Judiciary Chairman wants bipartisan bill signed into law before...

Other Activity (External etc) [Purchase Content]

Recommended Content –

Patent Innovation Coalition launching national...

[Notes / Documents]

[Back] [Purchase]

*FIG. 21E*

Project Management

Start New Project

Project Name: [Enter Project Name]

Project Owner(s): [Enter Project Owner name]

Project Description: [Enter Project Description]

Tag to Priority/Imperative:
Select all that apply to the project

| BUSINESS PRIORITIES | STRATEGIC IMPERATIVES |
|---|---|
| Drive Core Sales | Cake | Donuts |
| Secondary Product Assortment | Bread | Cookies | Pastry | Coffee |
| New Opportunity and Occasions | B2B | Holidays |
| Retail Expansion | Acquisition | New Locations – Existing Biz |
| Marketing | Social Media | Email/CRM | Promotions |

Import Desired Outcomes: [Import]

Set Success Metrics: [Enter KPIs]

Start Date:

End Date:

Budget: $

[SUBMIT]

*FIG. 22B*

INTEGRATED PRIORITIES AND ACTIVITIES ALIGNMENT, COORDINATION AND VISUALIZATION SYSTEMS AND METHODS

CROSS-REFERENCE TO RELATED APPLICATION(S)

This application claims priority to U.S. Provisional Patent Application No. 62/886,251, filed on Aug. 13, 2019, the entirety of which is incorporated herein by reference.

BACKGROUND

Organizations, businesses, and teams frequently struggle to ensure that critical and relevant information to inform, craft, and execute their strategies is thoughtfully articulated, captured, and organized in a common, easy-to-understand framework. This can lead to gaps in alignment within and across teams, misaligned or unworkable strategies, and workstreams that do not connect to the stated strategic objectives. In addition, the strategy creation process often lacks an efficient way to draft, re-write, align, and visualize their organizational goals, priorities, and what it would take to achieve them in a simple, and easy-to-consume way before a strategy is committed. Further, once a strategy has been agreed upon, and aligned, there is often a gap between that vision and the execution and resources required to achieve success. Teams often have varying degrees of understanding around those objectives, different interpretations of what is intended, and use different language and data to describe them.

In addition, users across organizations need a way to communicate their priorities and work in a manner that connects it to others in the organization and demonstrates how their work is relevant to the broader organization. Having transparent and informed conversations across an organization is critical to aligning organizational teams and allows organizations to prioritize and align their work in an informed manner.

Many of the tools available today were designed for the highest levels of strategic organization, designed to capture the strategy outputs, or designed only at the very detailed levels of capturing and allowing management of only specific objectives at the workstream or project level. This has meant that multiple tools and systems are often required to effectively bridge gaps and manage all of an organization's strategy, goals, and work. Further, organizations have lacked efficient ways to translate and combine the information taken from these various tools so it is consistently structured and consumable to team members and others outside of the organization (e.g., investors). Compounding this problem, many of the systems tailored to one aspect or the other of strategic execution are difficult to use and require constant input, and therefore, are not well maintained, resulting in incomplete and misguided conversations.

In addition, team members often have to recreate information from various systems multiple times for each business stakeholder, which results in unnecessary and repetitive work, as well as eroding consistency as shifting versions of information with small changes are developed and shared.

As a result, nearly every part of the planning and execution process has inefficiencies. For example, creating and communicating a strategy often requires sending around massive files which are hard to update and change because they are not editable or interactive, and different versions are often stored on individuals' systems or devices. Further, there are not consistent and transparent ways to format and/or filter specific objectives and/or components of the strategy based on what's relevant to a user and/or team in real-time.

Compounding this problem is the lack of a standardized framework in which information is captured and communicated across the organization, leading to gaps in understanding of the strategy and/or the work the organization is pursing based on the strategy. Organizations often even choose to completely re-write their strategy because it's easier to create a new strategy than manage, modify or update the current one. This can create erratic and changing focus; create organizational chaos; lead to significant lost or wasted time; cause inefficient and ineffective workstreams; cause inability to efficiently identify, maintain, and leverage resources to achieve organizational objectives; and/or demoralized teams whose work does not connect to (or is not perceived to connect to) the organization's strategy.

BRIEF DESCRIPTION OF THE DRAWINGS

FIG. 2C is a display diagram of the example user interface of FIG. 2A after a user selects one of the organization's priorities in accordance with some embodiments of the present technology.

FIG. 2D is a display diagram of the example user interface of FIG. 2A illustrating one mode of inputting information into the planning component.

FIG. 2E is a display diagram of the example user interface of FIG. 2B after information has been entered into the planning component in accordance with some embodiments of the present technology.

FIG. 2G is a display diagram of the example user interface displaying a warning that sections of the initial statement are incomplete before the user publishes the initial statement in accordance with some embodiments of the present technology.

FIG. 4B is a display diagram of an example user interface from which individual assigned users can view, check the status of, and manage objectives for which they have responsibility.

FIG. 5B is a display diagram of another example user interface of an interactive form a user can engage with to prepare a more detailed statement of the organization's strategy in accordance with some embodiments of the present technology.

FIG. 5C is a display diagram of another example user interface of an interactive form a user can engage with to prepare a more detailed statement of the organization's strategy in accordance with some embodiments of the present technology.

FIG. 5D is a display diagram of another example user interface of an interactive form a user can engage with to prepare a more detailed statement of the organization's strategy in accordance with some embodiments of the present technology.

FIG. 5E is a display diagram of another example user interface of an interactive form a user can engage with to prepare a more detailed statement of the organization's strategy in accordance with some embodiments of the present technology.

FIG. 5F is a display diagram of another example user interface of an interactive form a user can engage with to prepare a more detailed statement of the organization's strategy in accordance with some embodiments of the present technology.

FIG. 8A is a display diagram of an example user interface displaying an organization's strategic priorities and imperatives for visualization and access after the system completes the publishing process of FIG. 7 in accordance with some embodiments of the present technology.

FIG. 9B is a display diagram of the example user interface of FIG. 9A after a user selects another tab of the component in accordance with some embodiments of the present technology.

FIG. 9C is a display diagram of the example user interface of FIG. 9A after a user selects another tab of the component in accordance with some embodiments of the present technology.

FIG. 9E is a display diagram of the example user interface allowing a user to add additional information and commentary in accordance with some embodiments of the present technology.

FIG. 11 is a display diagram of an example user interface after a user selects to view only the objectives they are responsible for in accordance with some embodiments of the present technology.

FIG. 12B is a display diagram of an example user interface displaying information related to a specific business unit in accordance with some embodiments of the present technology.

FIG. 14A is a display diagram of an example user interface displaying various filters the user can apply to the information in accordance with some embodiments of the present technology.

FIG. 14B is a display diagram of an example user interface displaying further filters the user can apply to the information in accordance with some embodiments of the present technology.

FIG. 14C is a display diagram of an example user interface displaying a compare filter the user can apply to the information, with objectives sorted by criticality in accordance with some embodiments of the present technology.

FIG. 14D is a display diagram of the example user interface of FIG. 14C after the user has applied the compare filter in accordance with some embodiments of the present technology.

FIG. 15C is a display diagram of an example user interface after the user has navigated to a calendar component in accordance with some embodiments of the present technology.

FIG. 15D is a display diagram of an example user interface for adding a date to the calendar component illustrated in FIG. 15C in accordance with some embodiments of the present technology.

FIG. 15E is a display diagram of an example user interface after the user has navigated to a history component in accordance with some embodiments of the present technology.

FIG. 15F is a display diagram of an example report that the system generates after the user navigates to a report component in accordance with some embodiments of the present technology.

FIG. 15G is a display diagram of an example report that the system generates after the user navigates to a summary component in accordance with some embodiments of the present technology.

FIG. 15H is a display diagram of another example report that the system generates after the user navigates to the summary component in accordance with some embodiments of the present technology.

FIG. 15I is a display diagram of an example user interface after the user has navigated to an objective-by-person component in accordance with some embodiments of the present technology FIG. 15J is a display diagram of an example user interface after the user has navigated to an internal resources component in accordance with some embodiments of the present technology.

FIG. 15K is a display diagram of another example user interface after the user has navigated to the internal resources component in accordance with some embodiments of the present technology.

FIG. 15L is a display diagram of an example user interface after the user has navigated to a status component in accordance with some embodiments of the present technology.

FIG. 15M is a display diagram of an example user interface after the user has navigated to a strategic diagnostics component in accordance with some embodiments of the present technology.

FIG. 19 is a display diagram of an example user interface an Administrator can use to edit and customize the format of the user interfaces in the system in accordance with some embodiments of the present technology.

FIG. 21B is a display diagram of another example user interface a user can interact with to purchase pre-designed templates and information in accordance with some embodiments of the present technology.

FIG. 21C is a display diagram of another example user interface a user can interact with to purchase pre-designed templates and information in accordance with some embodiments of the present technology.

FIG. 21D is a display diagram of another example user interface a user can interact with to purchase pre-designed templates and information in accordance with some embodiments of the present technology.

FIG. 21E is a display diagram of another example user interface a user can interact with to purchase pre-designed templates and information in accordance with some embodiments of the present technology.

FIG. 22B is a display diagram of an example user interface a user can interact with to add a project to the project management system from the website's system in accordance with some embodiments of the present technology.

DETAILED DESCRIPTION

Figure 1:
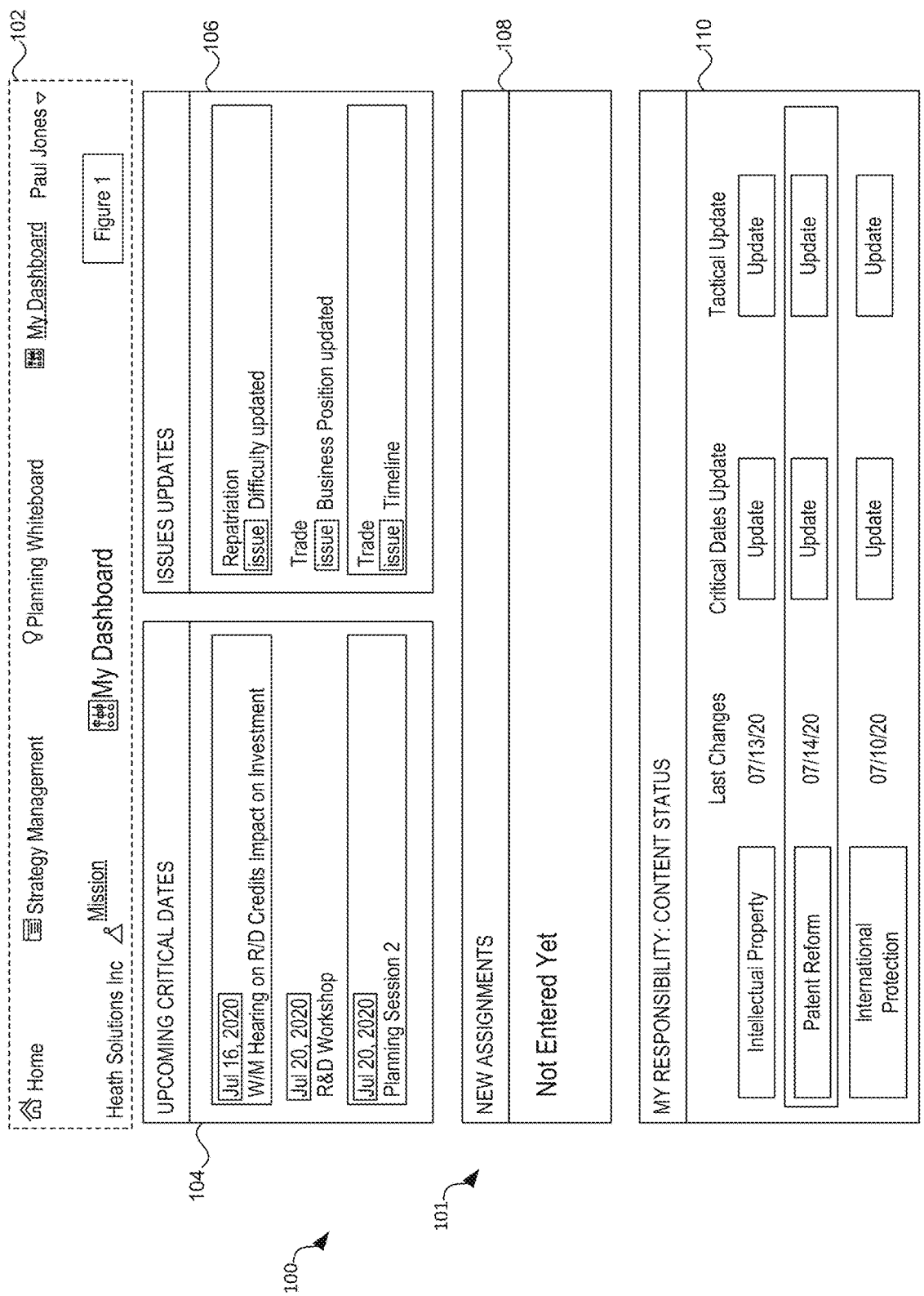
FIG. 1 is a display diagram of an example user interface that a user can use to navigate to and access the key components of the system in accordance with some embodiments of the present technology.

In order to address the shortcomings of existing systems and methods, a purpose-built, integrated system that bridges the connection between strategy and execution and methods of using the same are disclosed herein. In some embodiments, the system can organize and format an organization's strategy in a standardized, interconnected, and transparent framework. This framework can improve the organization's consistency and persistent connection to the work required in their strategy, as well as improve alignment between the strategy and the work by the organization. In some embodiments, the system and its tools can capture, communicate, and share critical information more efficiently. The improvements allow, for example, the organization to engage in relevant conversations at many different levels by identifying a set of common information and standardizing a structure for input. In some embodiments, the system can summarize and generate reports of the information for specific organizational priorities (e.g., long term strategies, business operations, etc.) as well as pull out specific components (e.g., goals, tasks, meetings, deadlines, contracts, proposals, etc.) to include in other reports or presentations.

In some embodiments, the system can run a computer-implemented method for constructing and sharing an organization-specific scheme containing a statement of a plurality of priorities for an organization. The system can bridge the gap between a planning phase, a development phase, and consistent work on the organization's priorities, and can build relationships between components of the priorities that allow the organization to realize efficiencies in their work. In some embodiments, the system can receive an initial statement of the plurality of objectives (e.g., priorities, goals, imperatives, business components, etc.) related to an organization's strategy. The initial statement of the objectives can include information on one or more components for each objective. In some embodiments, for example, one objective can be a priority, and the components in the initial statement can include a description of the priority, an indication of a relevance of the priority to the organization, a description of a goal for the priority, an indication of an expected resource requirement, an indication of personnel involved in the priority, and/or a description of one or more imperatives related to the priority. The system can then provide remote access to one or more authorized users over a network to enable the one or more authorized users to update the information in the initial statement.

For example, for each objective in the initial statement, the system can allow the one or more authorized users to update information on the one or more components for that objective. In some embodiments, the system can prompt the one or more authorized users to update the description of the objective, update the indication of the relevance of the objective to the organization, update the description of the goal for the objective, update the indication of the expected resource requirement, update the indication of the personnel involved in the objective, and/or update the specification of the one or more imperatives related to the objective. In some embodiments, the system's prompts can suggest a component by component flow to the authorized users in updating the information. In some embodiments, the system can display one or more recommendations on how to update the information.

Once information is updated, the system can automatically analyze the updated information on the plurality of components to identify one or more relationships between the plurality of components. The system can then automatically further update the information on the plurality of components to include the one or more relationships. The system can automatically convert, for example through a content server, the updated information on the plurality of components into a specified format and populate a plurality of nodes on a website specific to the organization with the updated information. The system can then store, in one or more storage devices, the updated information. The system can then automatically generate a notification after storing the updated information on the plurality of components (e.g., alerting the users about the updated information). The system can then provide remote access to the one or more authorized users over the network to enable the one or more authorized users to view the updated information on each of the plurality of priorities. The system can allow the one or more authorized users to filter a display of the plurality of priorities in various ways (e.g., based on attributes of the information about the plurality of priorities). In some embodiments, the system can allow users to edit and/or update the information directly on the website as work is completed and/or as the strategy changes.

In some embodiments, the system can utilize algorithms to automatically evaluate the status of various components, and can generate reports to organizations based on the analyzed information, for instance enabling users to understand the balance or health of their portfolio. In some embodiments, for example, the system can analyze specific data points such as status, budget, degree of difficulty, and/or type of resources required across all of (or some subset of) an organization's priorities to determine which priorities or strategic imperatives should be prioritized over others. In some embodiments, the system can identify areas in which the organization can work more efficiently, areas the organization should focus on, areas the organization should readdress, and/or areas the organization should avoid. In some embodiments, the system can measure the organization's work against specific outcomes over time to recommend specific actions or prioritization using machine learning based on which actions have been successful in the past (e.g., applying a regression analysis to predict the likelihood of success for one or more components of an organization's strategy).

Although primarily discussed and illustrated herein in the context of a system generating a website having various features and components accessible over the internet, one of skill in the art will understand that the invention is not so limited. In some embodiments, the system can be a software package downloaded onto authorized devices that runs an applet connected to an intranet of information. In some embodiments, the system can also operate on other devices, such as portable electronic devices (smart phones, tablets, laptops, personal desktop assistants (PDAs), etc.). In some embodiments, the system can interact with users through audio devices, for example allowing the system to be more accessible to a user with disabilities such as limited sight to hear information presented to them and edit the information through dictation. In some embodiments, the system can incorporate, or be incorporated into, virtual reality and/or augmented reality technology (e.g., displayed using optical projection systems Google® Glass, Apple® Glass, Oculus® Headsets; and/or through various multi-dimensional (e.g., three-dimensional (3D)) user interfaces). Accordingly, the scope of the invention is not confined to any subset of embodiments, and is confined only by the limitations set out in the appended claims.

DESCRIPTION OF THE FIGURES

Many of the details and features shown in the Figures are shown schematically and/or are merely illustrative of particular embodiments of the technology. Accordingly, other embodiments can have other details and features without departing from the spirit and scope of the present technology. Furthermore, various embodiments of the technology can include components and/or features other than those illustrated in the Figures and are expressly not limited to the structures shown in the Figures. Moreover, the various elements and features illustrated in the Figures may not be drawn to scale. In the Figures, similar reference numbers identify identical or at least generally similar elements.

FIG. 1 is a display diagram of an example user interface 101 that a user can use to navigate to and access the key components of the system 100 accordance with some embodiments of the present technology. In the illustrated embodiment, the system 100 includes a user interface 101. Users can enter the system 100 and can navigate to specific components or nodes through the user interface 101 by selecting different views and/or features within a view. For example, the illustrated embodiment includes a header 102 with "my dashboard" selected. As illustrated, the user's dashboard includes a critical dates component 104, an updates component 106, an assignments component 108, and a responsibility component 110 all populated with information specific to the user. If the user selects any of the components, the system can update the user interface with a display specific to that component. In addition, the user can select different tabs from the header to be taken to other components of the system. For example, when a user selects "Planning Whiteboard" from the header, they can be taken to a planning component, where the system can facilitate the creation of a draft statement of the organization's objectives and/or various components of the priority therein.

Figure 2A:
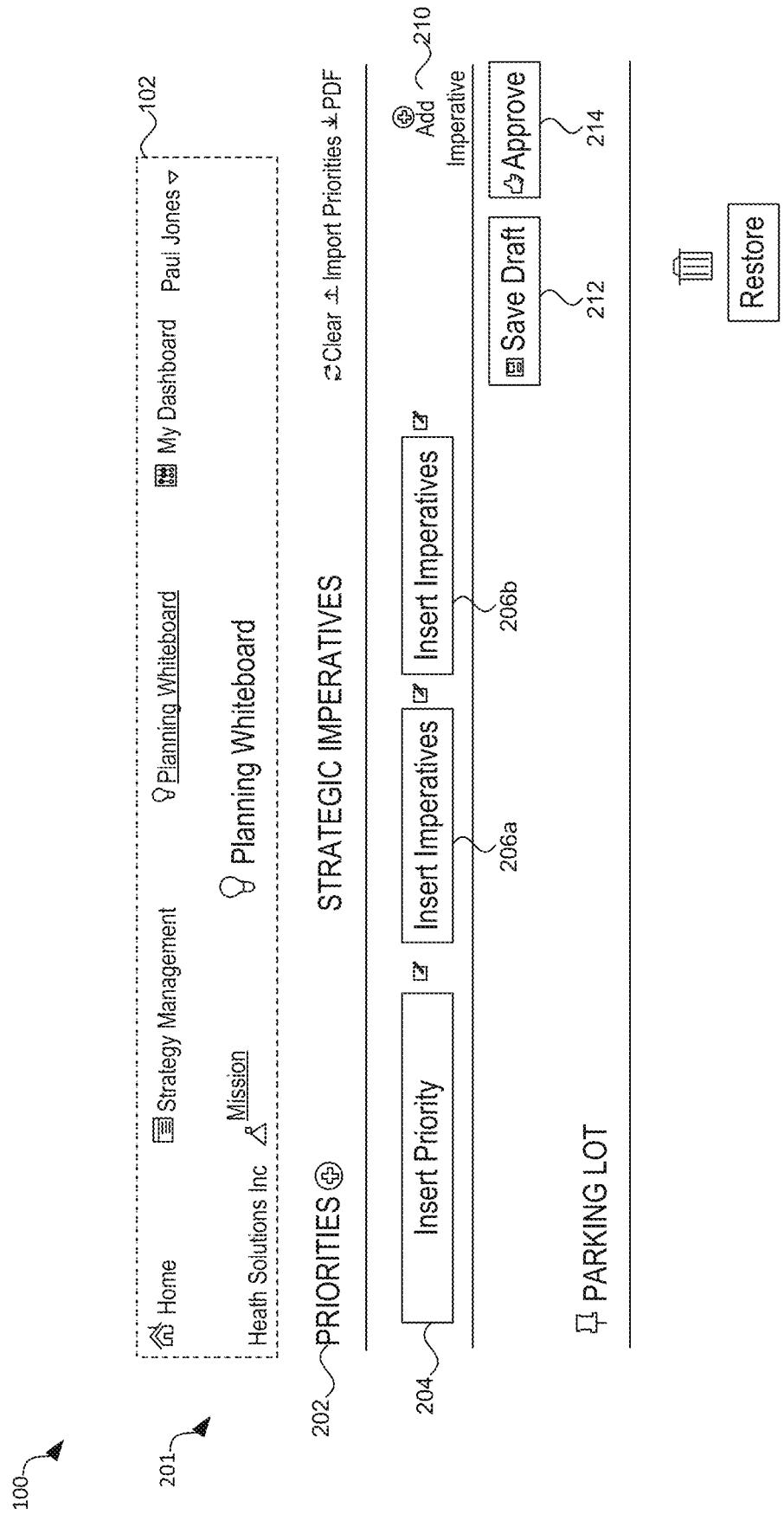
FIG. 2A is a display diagram of an example user interface the user can interact with in a planning component to generate an initial statement in accordance with some embodiments of the present technology.

FIG. 2A is a display diagram of an example user interface 201 the user can interact with in the planning component in accordance with some embodiments of the present technology. In the illustrated embodiment, the system allows the user to enter a draft statement of the organization's objectives, such as the organization's priorities and imperatives and/or import previously created drafts. For example, the user interface 201 includes a button 202 to insert any number of priorities relevant to the organization and a priority button 204 linking the user to information about a first priority. As further illustrated, before a priority is created, the priority button 204 can function as a button to insert a priority as well. Similarly, the user interface 201 includes, a first imperative button 206a linking the user to a first imperative (e.g., a goal, a task, and upcoming event, a contract, etc.) already created for the priority button 204, a second imperative button 206b linking the user to a second imperative already created for the priority button 204, and a button 210 allowing a user to insert any number of imperatives. Before any imperatives are created, the first and second imperative buttons 206a, 206b can also function as a button to add an imperative. The user interface 201 also includes a save button 212 and an approve button 214.

In some embodiments, the system can also allow the user to import objectives (e.g., existing priorities, various components of the priority, imperatives, issues, and/or various other objectives and their components). For example, in some embodiments, the system can allow the user to import previously approved objectives to avoid redundant work and maintain continuity with existing work. Further, although illustrated as boxes in the illustrated embodiment, one of skill in the art will understand that other manners of displaying objectives can be used instead (e.g., circles, other shapes, simple text, etc.).

Figure 2B:
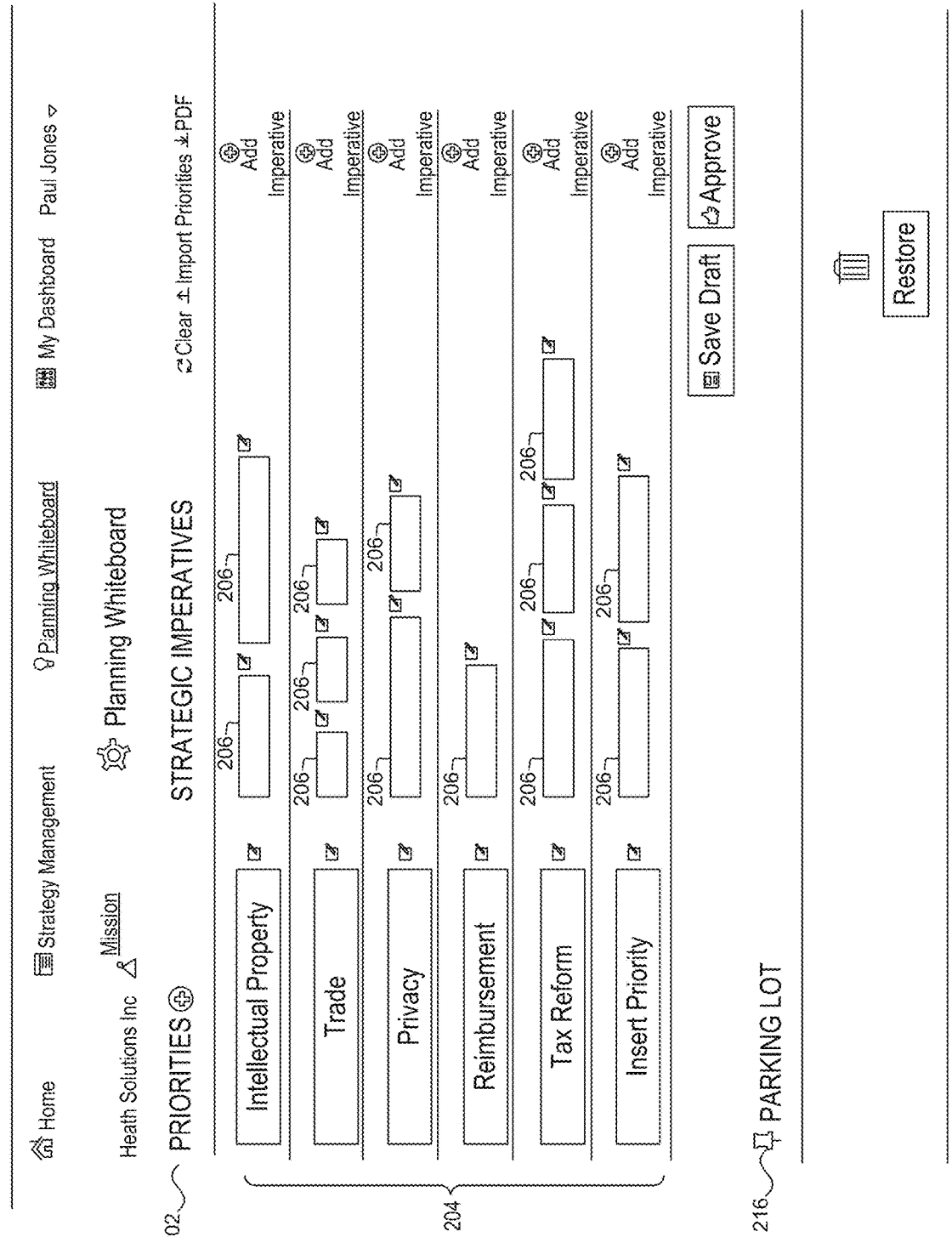
FIG. 2B is a display diagram of the example user interface of FIG. 2A after a user has entered or imported multiple priorities into the planning component.

FIG. 2B is a display diagram of the example user interface of FIG. 2A after a user has entered or imported multiple priority buttons 204 into the draft planning component. The system allows users to "drag and drop" objectives to other lines on the page, so they can be reorganized, viewed and aligned with a different objective or priority and can also be dragged into a parking lot 216 while they are unassigned and/or can be dragged into a trash bin to be deleted. Further, the user can input critical information about each objective by clicking into the edit box by each objective.

Figure 2C:
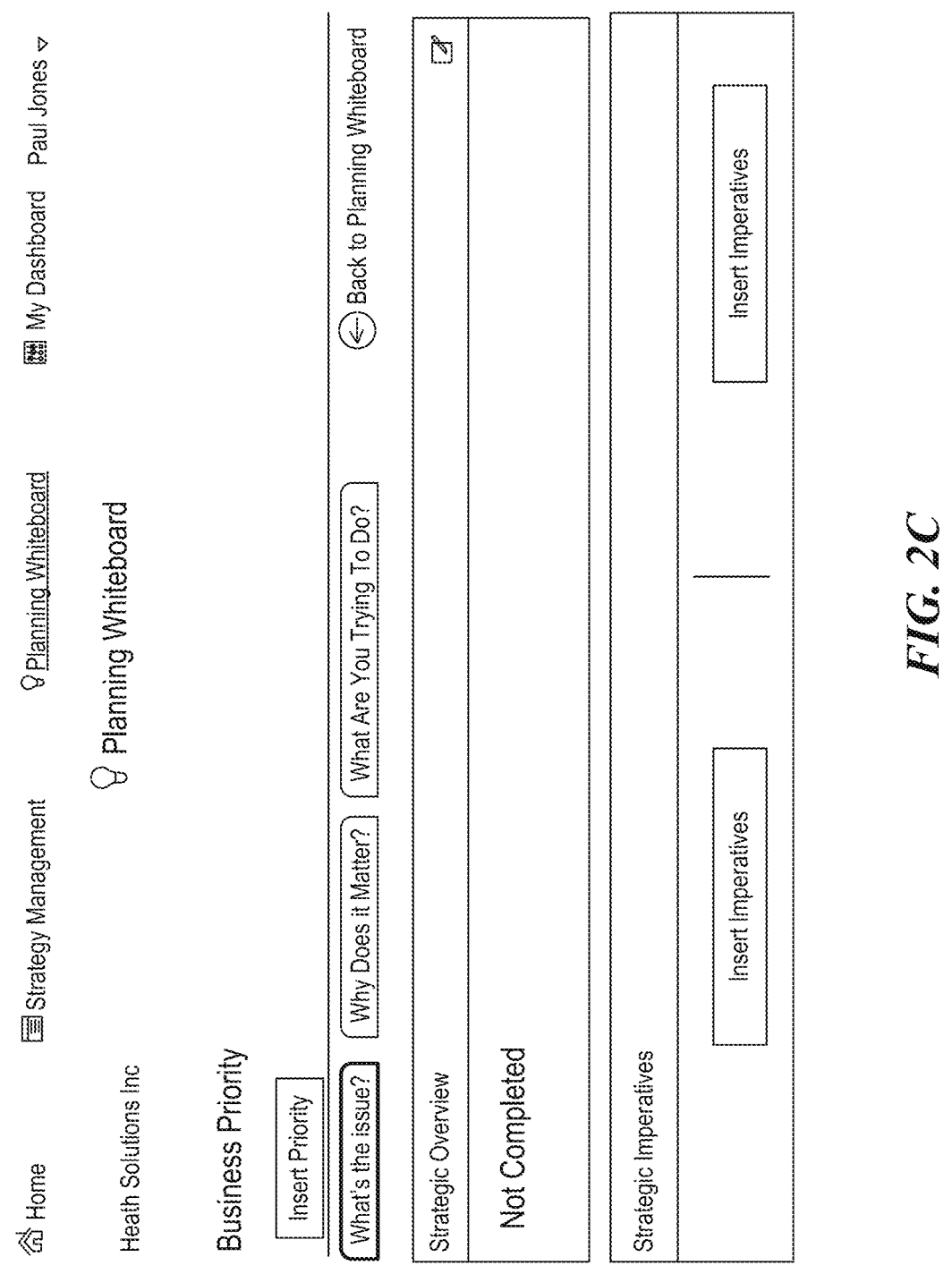

FIG. 2C is a display diagram of the example user interface of FIG. 2A after a user selects one of the organization's priorities in accordance with some embodiments of the present technology. The filtered view can provide an efficient way for the user to visualize details about the information input into the planning component to ensure alignment and agreement as the objectives are constructed.

Figure 2D:
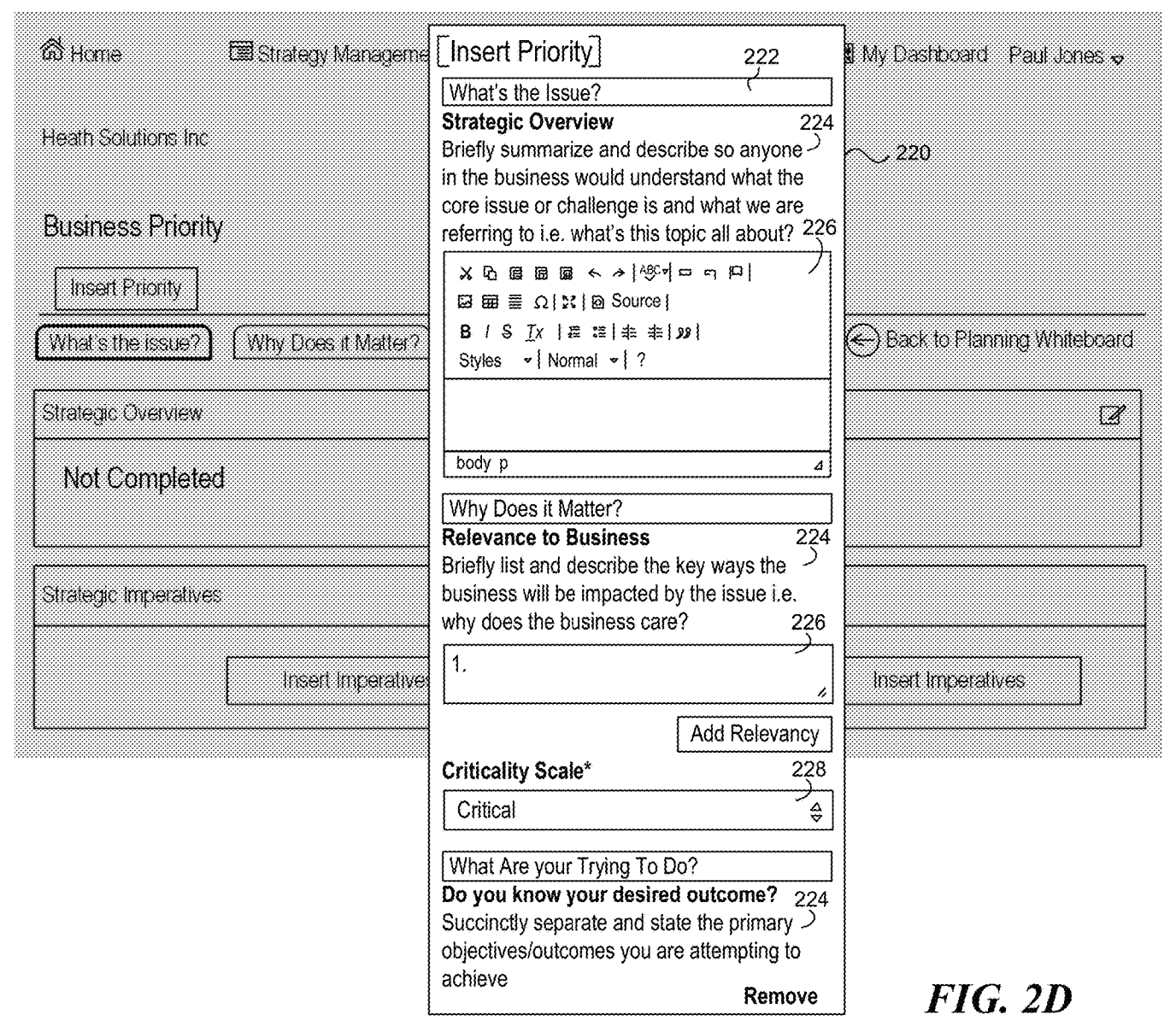

FIG. 2D is a display diagram of the example user interface of FIG. 2A illustrating one mode of inputting information into the planning component. In the illustrated embodiment, the system provides a short form 220 that can prompt the user to enter critical and/or minimum information about each objective to be populated into the draft planning component. In some embodiments, system can call the form 220 when the user selects an edit button from any of the graphical user interfaces illustrated in FIGS. 2A-C. In some embodiments, the form can be an interactive form with pre-defined instructions/questions the system determines are relevant to the organization. In the illustrated embodiment, the form 220 includes a directive question 222, a plurality of instructions boxes 224 to prompt the user for information, a plurality of text entry boxes 226 to receive a textual response, and one or more dropdown boxes 228 to receive an answer in the form of a selection from a predefined set of answers. In some embodiments, the system can allow the user to enter the information through audio input (e.g., using a voice to text translation).

Figure 2E:
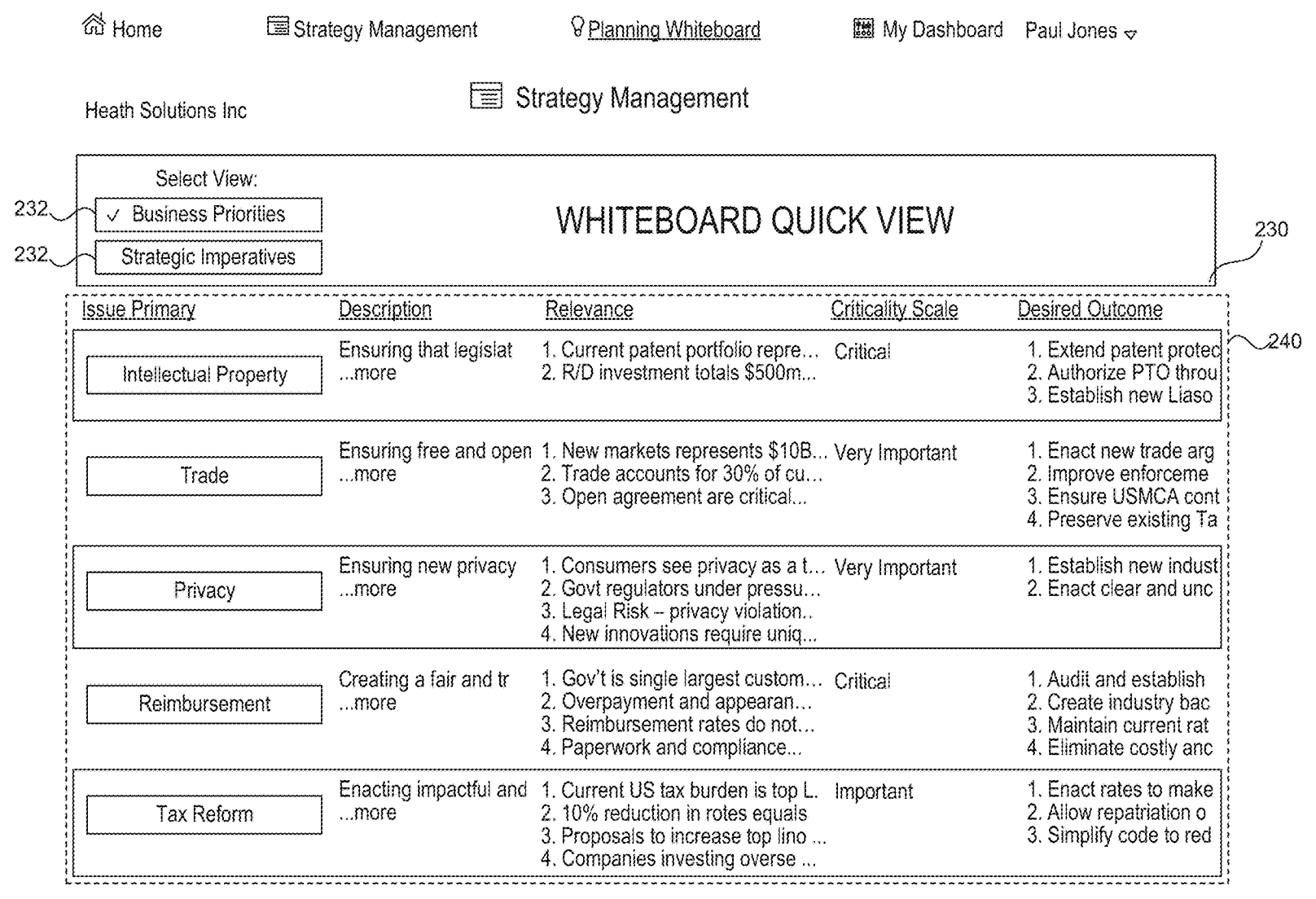

FIG. 2E is a display diagram of the example user interface of FIG. 2C after information has been entered into the planning component in accordance with some embodiments of the present technology. In the illustrated embodiment, the user interface includes a header portion 230 and a display portion 240. From the header portion 230, the user can select from one or more view buttons 232 to alter the information displayed in the display portion 240 between priorities and imperatives.

Figure 2F:
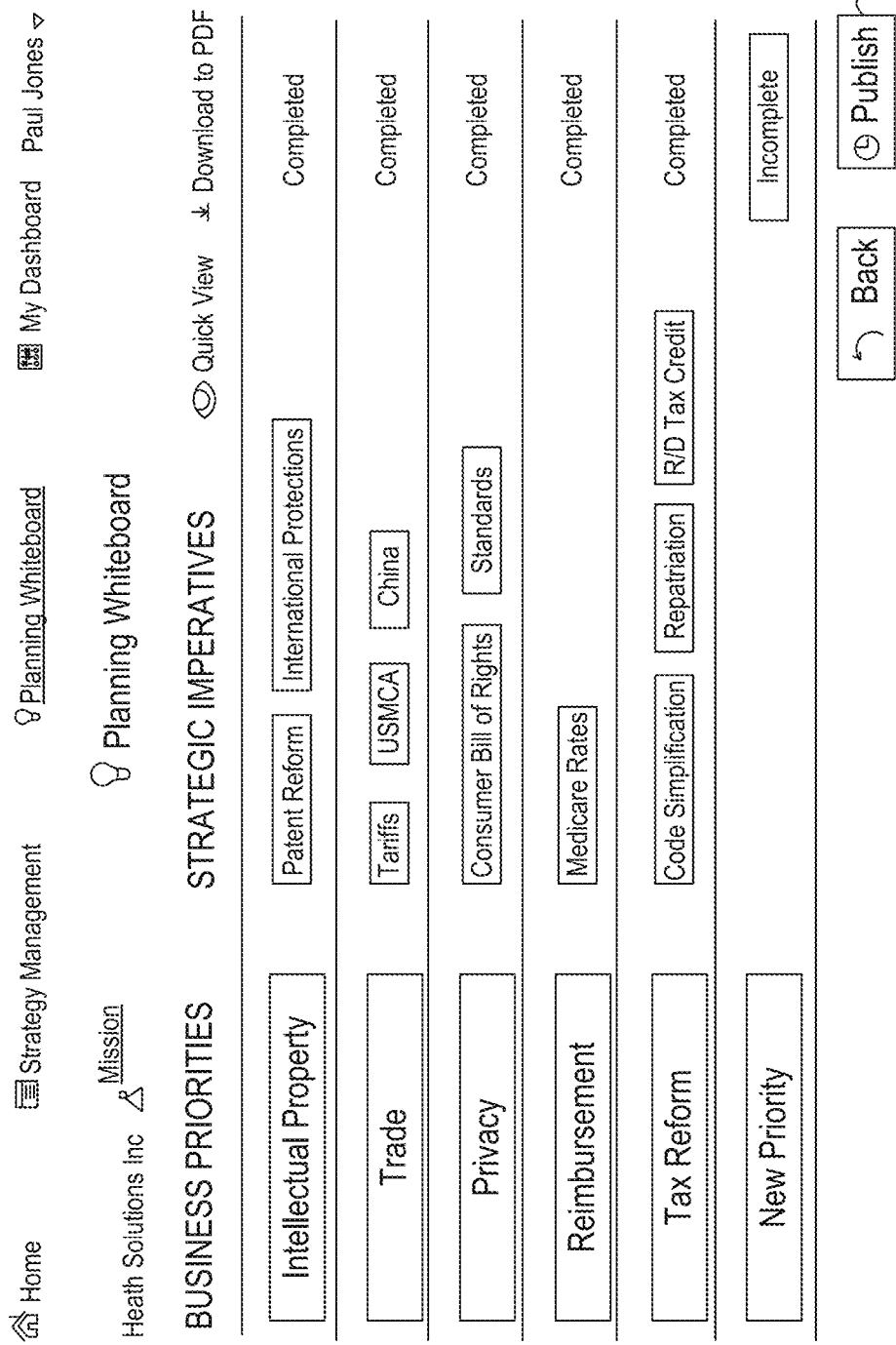
FIG. 2F is a display diagram of the example user interface of FIG. 2B with indicators of which objectives have been completed by the user in accordance with some embodiments of the present technology.

FIG. 2F is a display diagram of the example user interface of FIG. 2E with indicators of which objectives have been completed by the user in accordance with some embodiments of the present technology. In some embodiments, once a pre-determined amount of minimum information is entered into the system, the system can update and display the status of the objective to complete; else the system can display the status as incomplete. Once a user is satisfied that the objectives are aligned and are articulated with sufficient detail to ensure the purpose and objective is clear, those objectives can be "Approved" and published to the main page of the website as the current objectives for an organization, for example by selecting the publish button 250.

Figure 2G:
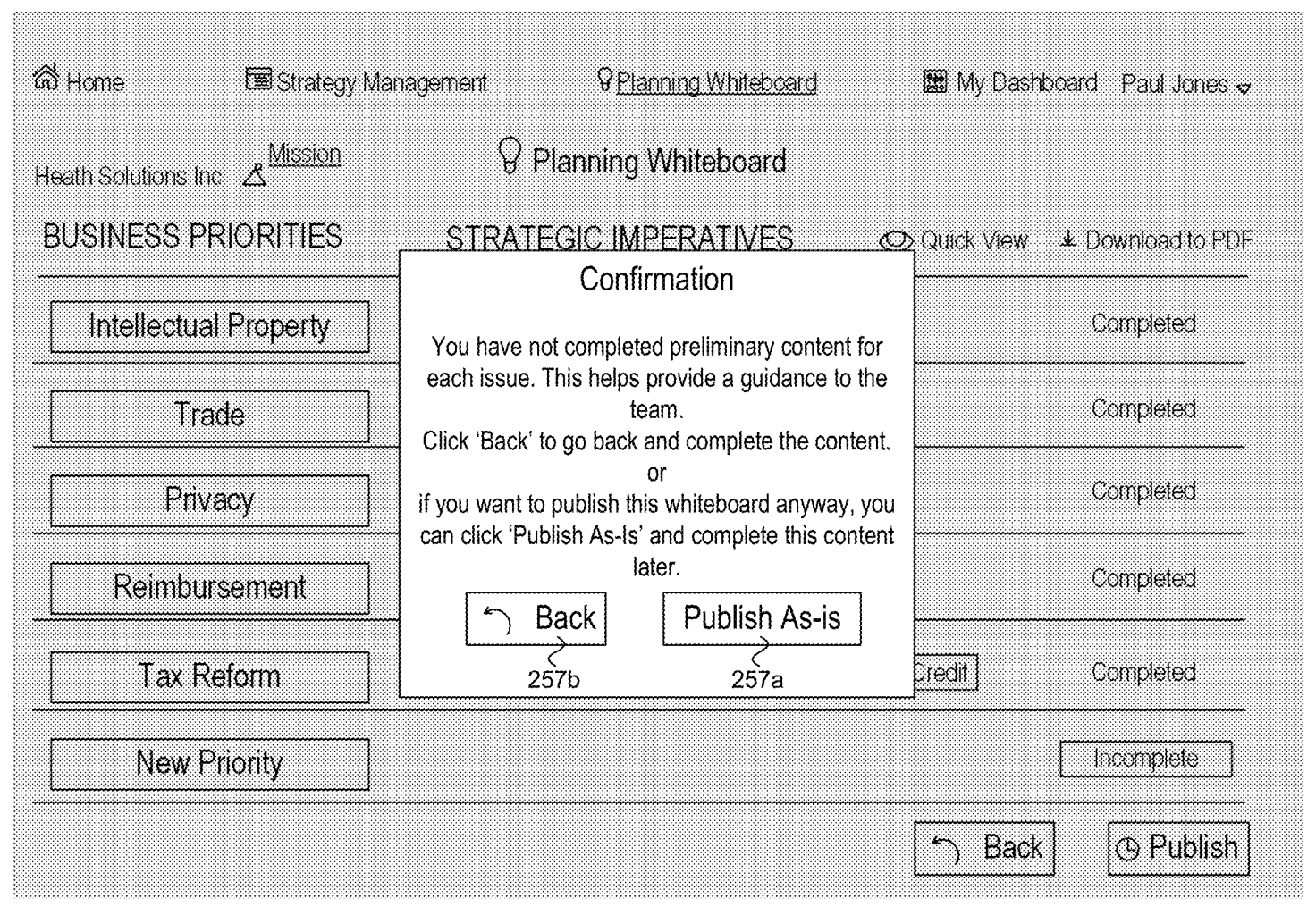

In some embodiments, if the minimum information for an objective has not been completed, the system can flag the incomplete information for example using a warning as illustrated in the display diagram of the example user interface of FIG. 2G. As illustrated, the user may select a button 257a to publish as is, or a button 257b to cancel to return to edit the information. In some embodiments the system can prevent the user from publishing until all, or some critical subset, of the information is completed. In some embodiments, objectives that are not completed can be identified and highlighted visually to make editing simple for the user.

In some embodiments, the system employs machine learning (e.g., using decision trees, neural networks, regression analysis and other suitable techniques) and artificial intelligence to aid an organization in the development of their strategy, broadly and/or with respect to an individual objective, priority, or imperative. For example, the system can use regression modeling to predict the likelihood of success of a particular component of the strategy, or the health of the portfolio. In some embodiments, the system can use artificial intelligence to develop and plan a strategy for the organization. For example, the system can allow an organization to specify end points they are trying to reach, targets along the way to those endpoints, and a preferred cost-benefit approach and the system can generate a strategic plan. The system can process the specifications alone or with support from other workstreams and other information. As data for the organization increases, the system's ability to improve strategic outcomes by processing that data and making previously unknown or non-obvious connections improves. Further, the system can remove limitations of human processing of the new information by using a clearly defined and repeatable framework to generate efficient strategic plans that connect to information in the system.

Figure 3:
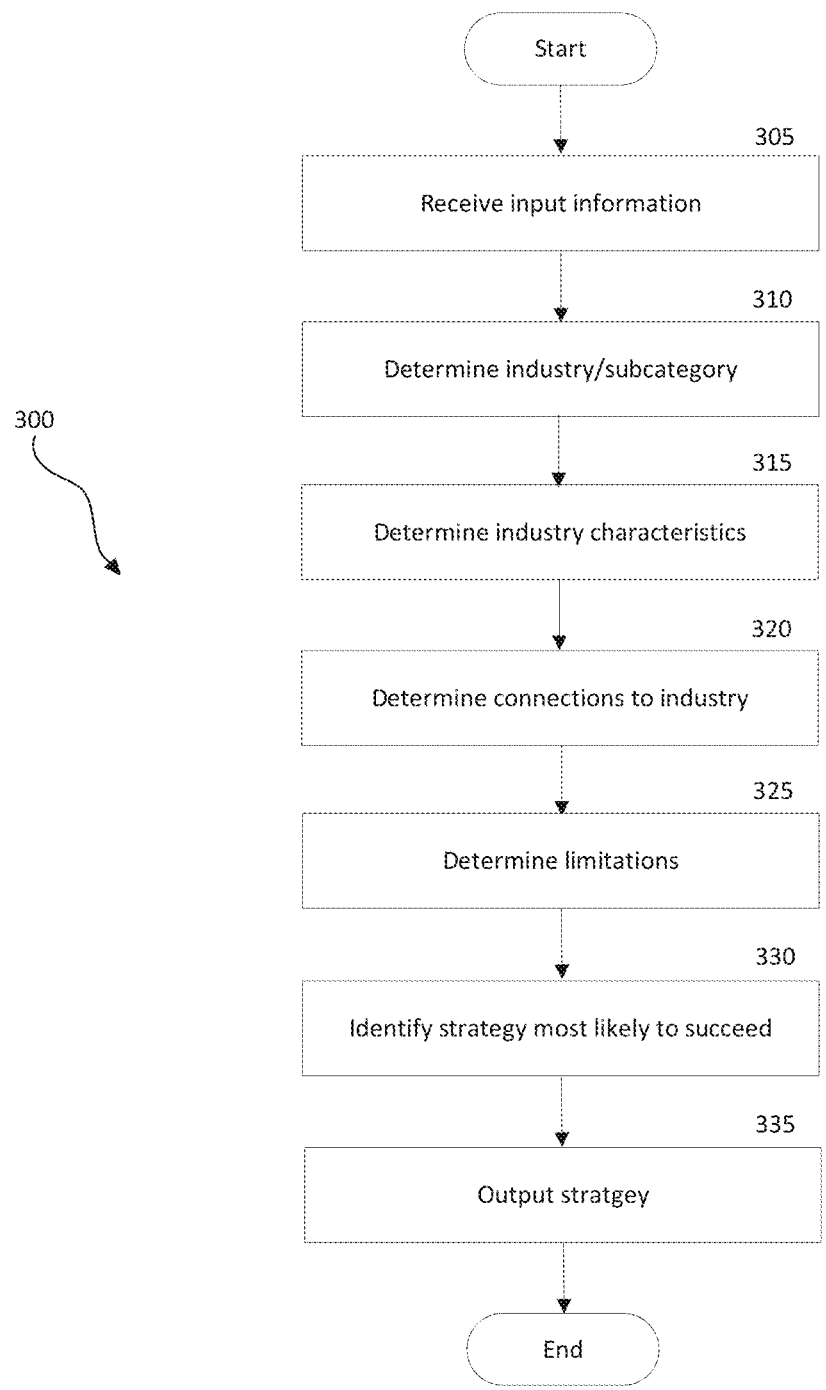
FIG. 3 is a flow diagram of a process for generating an initial statement that the system can follow in accordance with some embodiments of the present technology.

FIG. 3 is a flow diagram of a process 300 for generating an initial statement of the strategy in accordance with some embodiments of the present technology. The process 300 can be followed by the system in order to implement machine learning and artificial intelligence techniques into the generation of statement of a strategy for an organization.

At block 305 the system receives input information, which can include a selection of an industry, a sub-category within the industry, industry characteristics, limitations of the organization, and/or various other relevant selections. In some embodiments, the input information can be an import of the organization's statement from the planning phase. In some embodiments, the input information can be a description of the problem the organization is addressing along with relevant details about the problem (e.g., a short description, tag words, an article or paper, and/or various other inputs).

At block 310 the system determines what industry and/or sub-category of an industry the organization is, or will be, operating in (collectively referred to as the industry). In some embodiments, the determination can follow directly from the inputs at block 305. The system can use various techniques to determine which industry the organization fits into based on the information that was input. For example, the system can use semantic analyses and machine learning algorithms) to determine which industry the organization fits into. Allowing the system to determine the industry, for example, can remove some bias from the determination, which can result in a more accurate determination of the industry that the organization fits into, thereby improving the likelihood of success from the eventual strategy.

At block 315 the system determines the industry characteristics for the determined industry. For example, industry characteristics can include possible strategic frameworks (e.g., based on existing frameworks); primary objectives, priorities, and/or imperatives; identify known information; points for research; indicia of success in that industry; key players and/or contacts; and/or various other relevant information. In some embodiments, the characteristics can also follow directly form the inputs at block 305. The system can maintain a database of known industry characteristics that can supplement and/or replace the input information. In some embodiments, the system can make further use of machine learning techniques to extract characteristics from the input information and/or information from external sources (e.g., the internet) once an industry has been determined.

At block 320 the system determines connections the organization has to the industry. Connections to the industry can include, for example, contacts in the industry (e.g., suppliers, manufacturers, buyers, regulators, oversight boards, lobbyists, competitors, potential clients or customers, potential collaborators, etc.), industry needs the organization may be prepared to meet (e.g., manufacturing demands, regulatory oversight, decision making power, etc.), sources of resources, applicable intellectual property, and various other factors that could impact the formation and/or execution of one or more components of a strategy. In some embodiments, the connections to the industry can also follow directly form the inputs at block 305. The system can additionally, or alternatively, make further use of machine learning techniques to determine the connections.

At block 325 the system determines limitations for the organization. Limitations can include, for example, limits on resources available to pursue a strategy (including capitol, time, personnel, etc.), acceptable risk, components of strategies the organization is not willing to pursue (e.g., a company may refuse to co-manufacture goods), and various other factors that could prevent and/or undermine one or more components of a strategy.

At block 330 the system identifies one or more strategies that are most likely to lead to success for the organization (e.g., as a ranked list), based on the industry, industry characteristics, connections to the industry, limitations, and various other factors. In some embodiments, the system can use various machine learning techniques (e.g., decision trees, neural networks, regression analyses, reinforced learning, dynamic programing, or other suitable means) to identify and choose between relevant strategies. The machine learning algorithms can be trained using data from the strategies and performance of the organization in question and/or other organizations on the system. For example, if numerous organizations in an industry use the system to prepare their strategies, the system can use data on the success of those strategies to train the machine learning algorithm on successful components of the strategies.

In various embodiments, the system prepares a statement of the strategy with high level details on objectives the organization should consider; details on one or more priorities in the strategy; details on one or more imperatives for each priority; details on specific work to complete to pursue the imperatives or strategies; dates to complete work by; goals the organization should set; and/or various other levels of detail. In some embodiments, the system can rank the objectives in order of most likely to succeed.

At block 335, the system outputs the statement of the strategy. In some embodiments, the system can output the statement into the planning phase component described above with respect to FIGS. 2A-2G for the organization to review and modify before publishing to their website in the system. The system can output the statement straight to the website for review, and/or the system can output the statement to the organization for review in a separate component where the system receives feedback on the draft statement. The feedback can prompt the system to return to any phase of the process 300 to alter the information and eventual strategy.

Purely by way of example, in some embodiments, a user could input a short problem description such as "We are trying to develop a global solution to reducing pandemic spread of Covid 19, which is largely spread by people traveling across borders, without being tested and quarantined. Large, common transportation carriers are one major potential entry point into new geographic locations" The system can then analyze the problem statement using a language processing algorithm and/or various machine learning algorithms to: identify an industry; identify possible strategic frameworks based on that industry; identify primary objectives, priorities, and/or imperatives; identify known information; and/or identify points for research. The system can then identify connections the organization(s) has to the identified industry, such as government contacts, medical device manufacturing contacts, manufacturing capabilities, etc. The system can further identify limitations for the organization(s), such as FDA regulations, available resources, etc. Further, the system can analyze the problem using external sources, such as literature reviews, patent documents, health care diagnostics, and/or known strategies for other disease outbreaks to determine potential criteria for the strategy (e.g., what any diagnostic tool should be able to measure, possible devices that can be used to ID important symptoms, and characteristics of devices that would make them readily deployable—thereby helping to identify the most impactful and scalable diagnostic devices to allow resources to be targeted and deployed much more efficiently). The system can then use the information from above to generate a statement of the strategy for the organization(s) to address problem. For example, the system may determine that the organization(s) implementing the strategy would need to be able to screen and test, would need a common standard of illness, relevant diagnostics, and a database of all travel connection hubs. Accordingly, the statement of the strategy can include components that focus on the development of diagnostic tools and screening protocols to minimize the spread of the virus. The statement of the strategy can include links to contacts the organization(s) can leverage, requirements the system determined must be met for the diagnostic device, a timeline for gaining approval for the diagnostic device, etc. Once the system has generated a statement of the strategy, the strategy could be output to the organization(s) for review, revisions, and/or implementation.

In some embodiments, the system can also expose the framework, or portions of the framework, externally to allow others to collaborate in developing the framework. Because the system can make specific problems, context, demand, objectives, etc. transparently available, the system allows multiple parties to connect directly to the strategy to develop and/or execute the strategy in an efficient, organized manner. For example, a government agency responding to a public health crisis (such as the pandemic virus situation described above) can input known information about the public health crisis; the system can develop an initial strategic framework for addressing the public health crisis; and the system can make the strategic framework publicly available to health experts, vendors, other governments, other agencies, etc. to collaborate on the development of the strategic framework. Accordingly, the system can efficiently facilitate a coherent response to the public health crisis, thereby saving lives and resources in the process.

Further, since the system develops the initial strategy based on likely outcomes and identified trends in the initial information, the system can identify problems and solutions that would have otherwise been missed and build them into the strategic framework. Continuing the example from above, the system may be able to see non-obvious connections between input information (e.g., to determine that the density of transportation terminals risks spread before detection, resulting in ineffective detection systems if deployed in the terminals) to make advanced recommendations on strategic priorities (e.g., to deploy detection systems upstream from the terminals to avoid spread throughout them).

Figure 4A:
FIG. 4A is a display diagram of an example user interface from which the user and/or an Administrator can view the status of objectives and assign roles and access rights to others in accordance with some embodiments of the present technology.

Once the user indicates that an objective is approved based on the initial preliminary information, the system can prompt the user to assign the objective to a specific member of the organization and/or a team at the organization, for example through the interface illustrated in FIG. 4A.

FIG. 4A is a display diagram of an example user interface from which the user and/or an Administrator can view the status of objectives and assign roles and access rights to others in accordance with some embodiments of the present technology. For example, the Administrator may be an Organization's leader, and can use the user interface to efficiently assign and/or prompt a team member to complete more detailed information and/or maintain responsibility for in the future. In some embodiments, the system allows users to be added from a pull-down based on internal team lists, emails or other mechanisms to assign individual team members. The system can allow the Administrator to change and/or update assignments at any time and can further generate a message indicating updates to assignees as they are made. In some embodiments, the user interface can also indicate when an objective was last updated to inform leaders and/or other users of a status of an objective (e.g. work completed, remaining work, upcoming deadlines, etc.). In some embodiments, the system can generate reminders or reports to improve validation and/or ensure completion rules are being followed for the website.

In some embodiments, if an objective is assigned to a user, it can then be added to their own "admin" page which they can access from the website, in order to update or edit information, for example as illustrated in FIG. 4B.

FIG. 4B is a display diagram of an example user interface from which individual assigned users can view, check the status of, and manage objectives for which they have responsibility. The assigned users can also assign others to contribute or edit their content. A user can see which objectives they are responsible for or "own" and which ones they are asked to contribute to from this panel, and who else may be working on or be responsible for an objective. In some embodiments, the system can display the status of a given form, for example by the percent complete and/or date of last update. In some embodiments, the system can send a message to remind users to complete or update tasks or information based on pre-determined criteria (e.g., upcoming deadlines, repeated reminders, etc.). In some embodiments, the system can transmit the message through various automated communication systems such as email, text or other means. In some embodiments, the system can display to a user which objectives require updating and be directed to the relevant section of the website from the user's dashboard (see FIG. 1) to increase the user's efficiency in performing and updating their work. In some embodiments, the system can display the work statuses of other users to Administrators and/or other authorized users for management or other purposes.

The system allows information relevant to the organization's objectives to be updated (e.g., edited, expanded on, completed, populated, etc.) through a thorough and detailed interactive user interface similar to the one used in the planning component.

FIGS. 5A-5G are display diagrams of an example user interface containing the interactive form 500 for organized, detailed updates to the organization's statement of their priorities in a detailing component of the system in accordance with some embodiments of the present technology.

In some embodiments, the system can provide various users remote access to the detailing component through the user interface made available over a network (e.g., through the internet). In turn, the user interface can allow a user to update and/or expand upon answers in an efficient manner through a form 500 over the network. The form 500 is designed to guide the user through critical and specific business or organizational questions. In some embodiments, the system can format information from the planning phase and automatically pre-populate the form 500 to eliminate duplication of work and improve alignment between organizational leadership and the organization's teams.

Figure 5A:
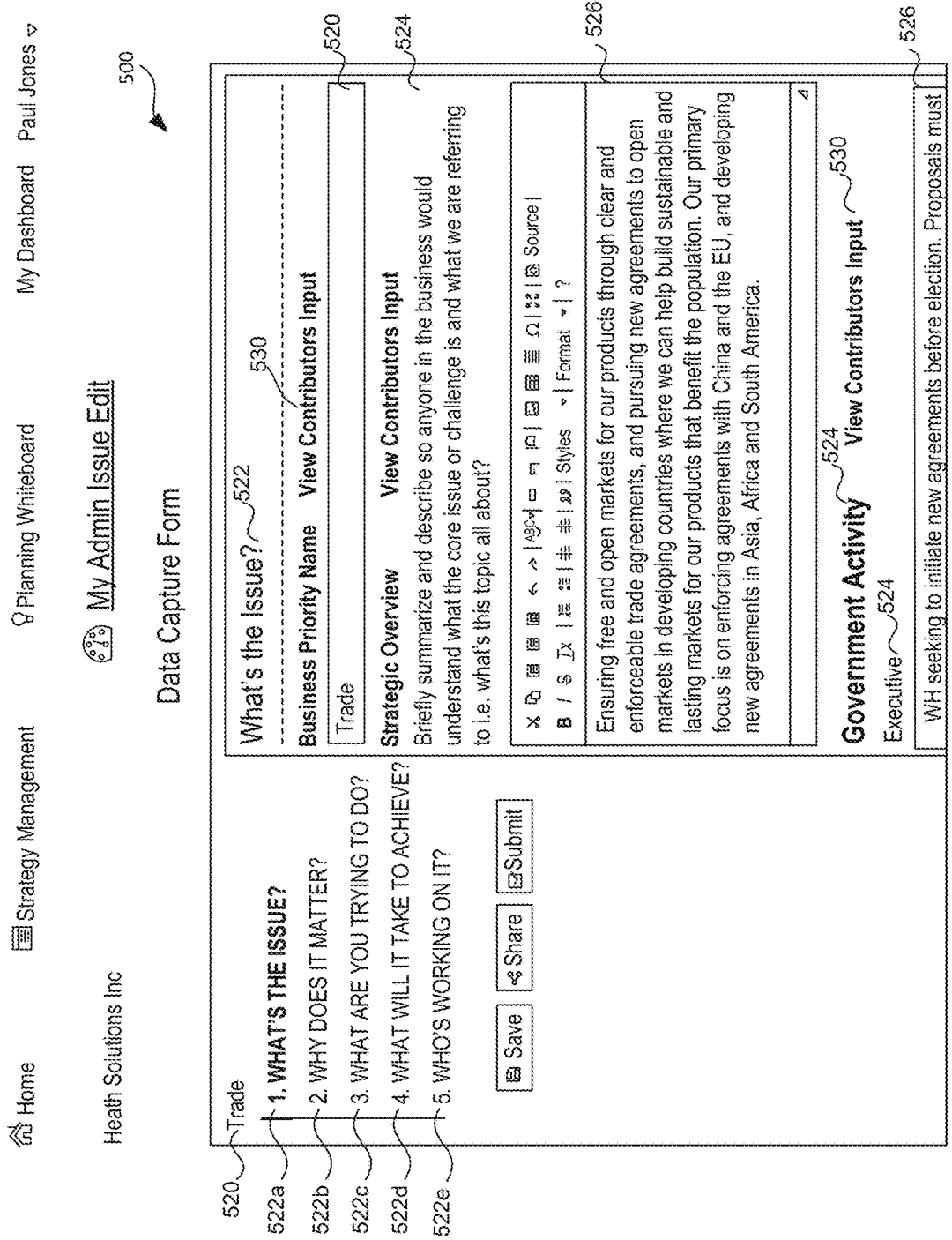
FIG. 5A is a display diagram of an example user interface of an interactive form a user can engage with to prepare a more detailed statement of the organization's strategy in accordance with some embodiments of the present technology.

FIG. 5A is a display diagram of an example user interface of the form 500 in accordance with some embodiments of the present technology. In the illustrated embodiment, the form 500 includes a section for each priority 520. Each section can include a plurality of components 522 designed to direct and guide the user's development of information on the priority. In various embodiments, the form 500 can request additional information for one or more priorities (e.g., presenting additional questions, requesting additional input data for the priority, requesting additional development of strategy, etc.), or can request revisions and further development of the information (e.g., presenting only details from the planning phase and requesting revised information) for one or more priorities. For any given component 522, the system can provide a prompt 524 (e.g., textual instructions, questions, indications, etc.; visual graphic; and/or audiovisual display) to instruct the user on what information to enter and/or where information is missing. Following the prompt 524, the system can provide an entry box 526 allowing the user to enter information and/or upload various documents. In some embodiments, the form 500 can encourage and enable collaboration. For example, contributors can make comments and suggestions onto the form in order to input and complete the data in a collaborative manner if desired, which can be accepted or rejected in order to complete the form. In some embodiments, for example, the system allows contributors to embed comments in the report, which the user can view by selecting a button 530.

FIG. 5B is a display diagram of another example user interface of the form 500 a user can engage with to prepare a more detailed statement of the organization's strategy in accordance with some embodiments of the present technology. In the illustrated embodiment, the user has selected button 530 to view a contributor's comment and the system has launched a window 532 to display the comment.

FIG. 5C is a display diagram of another example user interface of the form 500 a user can engage with to prepare a more detailed statement of the organization's strategy in accordance with some embodiments of the present technology. In the illustrated embodiment, the form includes one or more buttons 534 to add the relevancy of a component to the priority 520 and/or a subcomponent to the component. In some embodiments, for example, the user can select from critical, very important, important, and/or relevant to input the relevancy for a subcomponent. In some embodiments, the user can select from a scale (e.g., scale from 1 to 10, 1 to 5, etc.) to input the relevancy. As further illustrated, the form 500 can include a button 540 to remove one or more subcomponents and/or questions from the information. For example, the button 540 allows the user to efficiently remove information that has completely changed or become irrelevant since the planning phase.

In some embodiments, the form 500 can facilitate a component-by-component approach to completing the detailing of the organization's strategy. For example, as the user addresses each prompt 524 and moves through the form 500 for a first component 522*a* of the priority 520, the form 500 can direct the user to a second component 522*b* for that priority 520. Once every component 522 for a priority has been addressed, the form 500 can direct the user to any remaining priorities in the organization's strategy. FIGS. 5C-5G illustrate various other portions of this iterative process in accordance with some embodiments of the present technology.

In some embodiments, the form 500 can request and capture information that is not later displayed in the system (e.g., information relevant to a priority that should not be shared, such as specific budget numbers, private contributions, and/or screened personnel assignments, or need not be shared, such as feedback about a proposed component of the strategy). In some embodiments, the form 500 can highlight specific questions or datapoints that an organization's management wants to prioritize and/or emphasize.

Once the form is complete, the form can allow a user to submit (e.g., publish) the information in the form submitted or "published" to the remainder of the system. In some embodiments, the system can prevent the user from publishing information from the form 500 until some (e.g., predefined components) or all of the form 500 is completed. In these embodiments, for example, the system can prevent team members from beginning work on a priority until critical information has been fully developed in the form 500. Once the form is submitted, the system can automatically format and store and publish the updated information to the website so various authorized users can access and visualize given objectives that have been identified as part of the strategy. In some embodiments, the system can publish the information nearly simultaneously with its entry and/or storage, thereby allowing the authorized users to view the most up to date information in real time.

Figure 5G:
FIG. 5G is a display diagram of another example user interface of an interactive form a user can engage with to prepare a more detailed statement of the organization's strategy in accordance with some embodiments of the present technology.

FIG. 5G is a display diagram of another example user interface of the form 500 a user can engage with to prepare a more detailed statement of the organization's strategy in accordance with some embodiments of the present technology. In the illustrated embodiment, the system enables the user to add contributors to the objective, thereby enabling additional users to be authorized to add detailed information and/or update the existing information.

Figure 6:
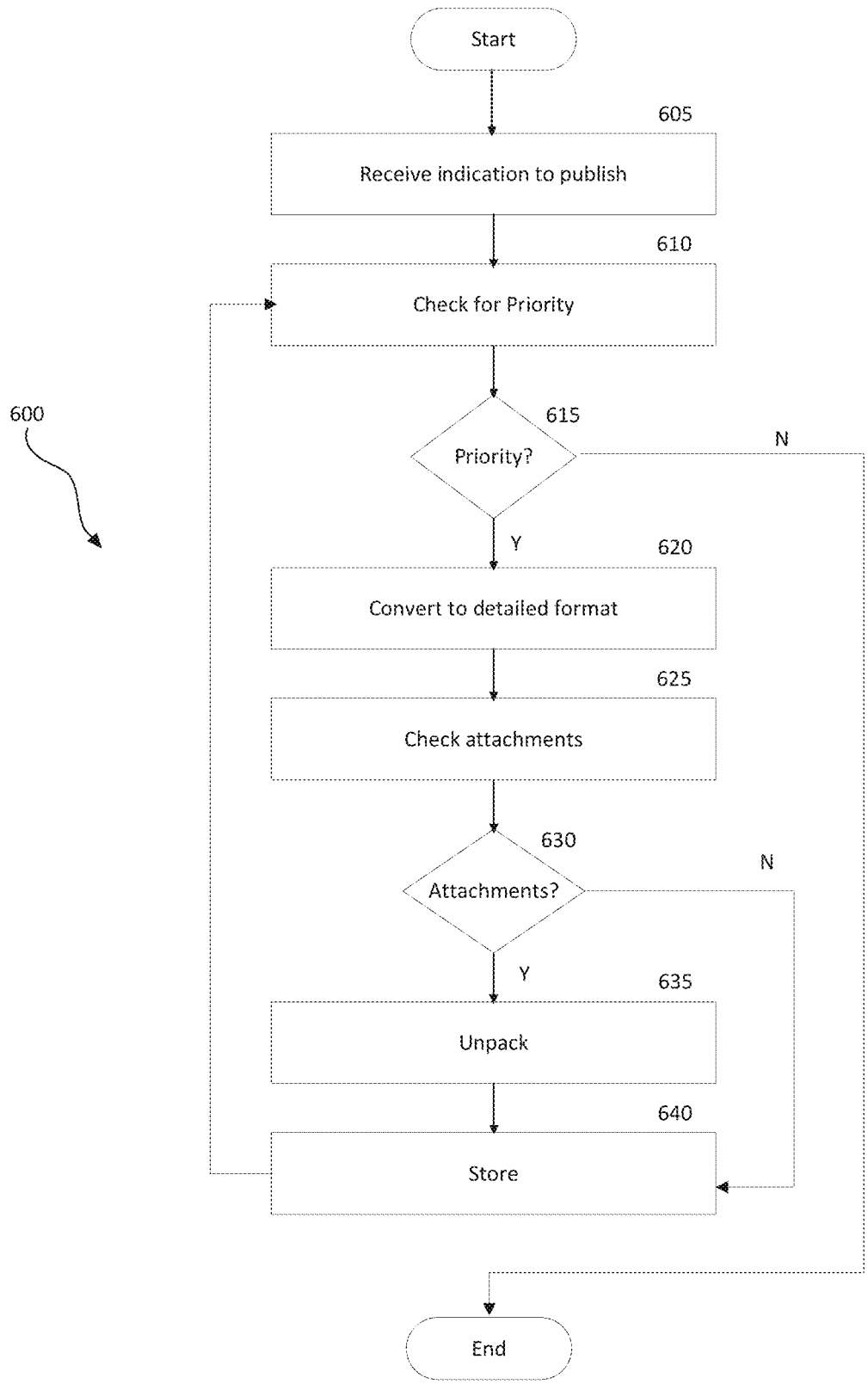
FIG. 6 is a flow diagram of a process for publishing an initial statement of an organization's priorities from the planning phase to the organization's website in accordance with some embodiments of the present technology.

FIG. 6 is a flow diagram of a process 600 for publishing an initial statement of an organization's priorities from the planning phase to the organization's website in accordance with some embodiments of the present technology. The initial statement can then be used in the interactive form as described above with respect to FIGS. 5A-5G.

At block 605, the system receives an indication to publish information from the user interacting with the planning component (for example as illustrated in FIG. 2G). The indication kickstarts an automated process in which the system prepares the information from the planning component for later use.

At block 610, the system begins a process akin to a for-loop and checks the information for a priority. At decision block 615, if there is a remaining priority, the system moves to block 620, else the system completes the process 600.

At block 620, the system converts the information on the priority from the planning component format into a standardized format to create the initial statement for the organization's website and/or the detailing component. In some embodiments, this can be an iterative process in which the system populates nodes in the formats with corresponding information from the planning component's format. In some embodiments, there can be a 1:1 relationship between the planning format and the standardized format. In other embodiments, information from the planning phase can be directed into multiple nodes in the standardized format.

At block 625, the system checks for attachments, such as data sheets, excel files, text files, etc. uploaded during the planning phase.

At decision block 630, if there were attachments, the system can move to block 635, else the system can move directly to block 640.

At block 635 the system can unpack the information in the attachments. For example, in some embodiments, the system can perform a semantic analysis of attached text files to extract additional information to populate nodes for the priority. In some embodiments, the system can unpack and format data (e.g., sales numbers, supply chains, etc.) to populate nodes for the priority.

At block 640, the system can store the reformatted information in an initial statement and publish the same to the organization's website. The initial statement of the objectives can then be viewed and/or fed into the detailing component. After storing and publishing the information, the system can return to block 610 to check for another priority.

At decision block 615, if the system has processed every priority entered in the planning phase, the system can complete the process 600.

Figure 7:
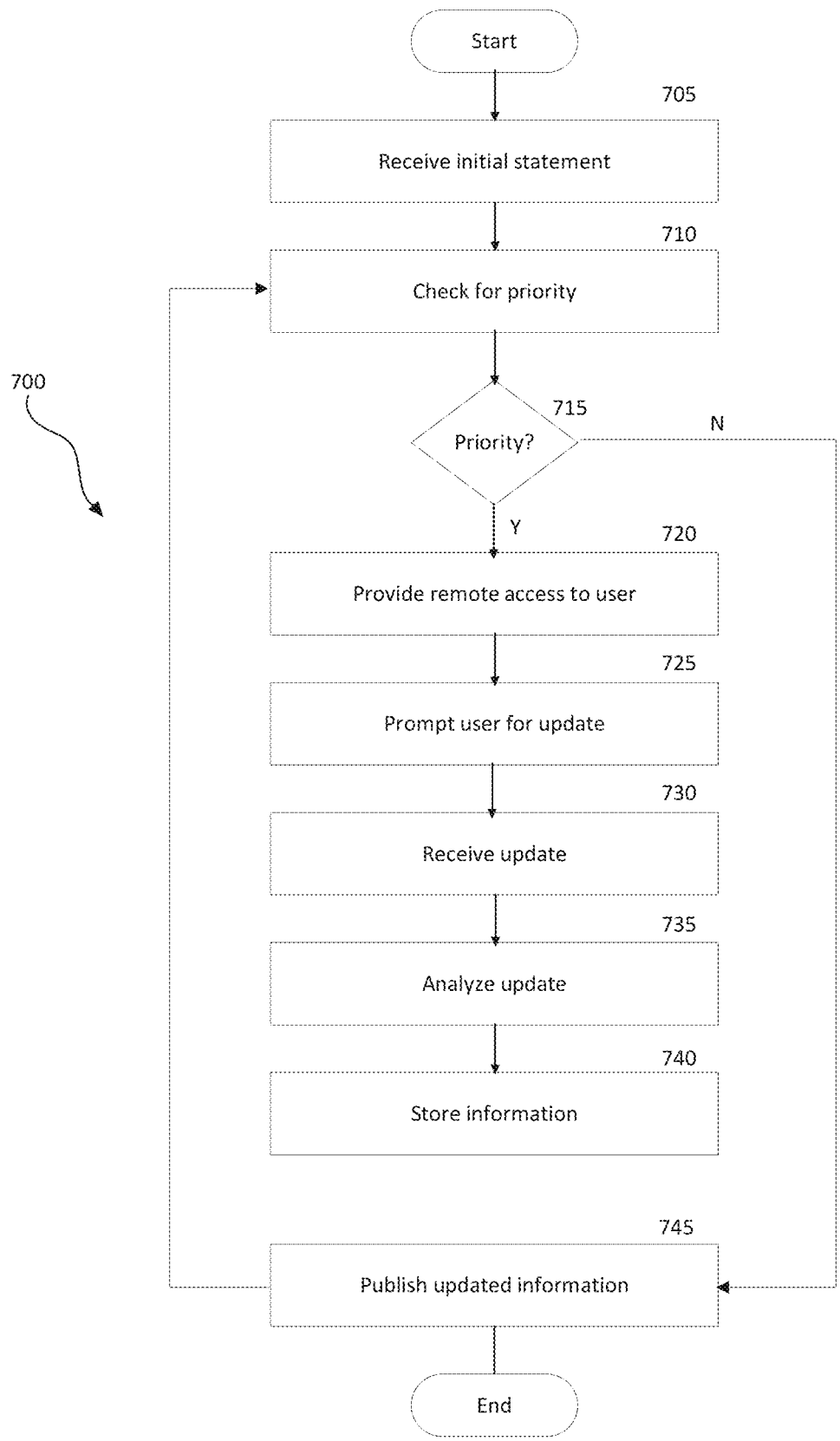
FIG. 7 is a flow diagram a process for updating a statement of an organization's priorities and publishing the same to the organization's website in accordance with some embodiments of the present technology.

FIG. 7 is a flow diagram a process 700 for updating a statement of an organization's priorities and publishing the same to the organization's website in accordance with some embodiments of the present technology.

At block 705 the system receives an initial statement. In some embodiments, the initial statement can come straight from the process 600 described above with respect to FIG. 6. In some embodiments, the initial statement can be retrieved from a storage device. In some embodiments, a user can purchase an initial statement from a marketplace, and the system can then receive the initial statement from the marketplace.

At block 710, the system checks for a priority in the initial statement that has not been updated in this run through the process 700. At decision block 715, if there is a priority remaining to be updated, the system can move to block 720; else the system can move to block 745.

At block 720, the system provides remote access to the information in the initial statement about the priority, the imperatives in the priority, and the various components of the priority.

At block 725, the system enables the user to provide an update to the information. In some embodiments, the system can prompt the user for the update. In some embodiments, the prompt can be a textual and/or visual instructions and/or suggestions displayed next to an input box. In various embodiments, the system can use various other audiovisual methods (e.g., pop-up window, notifications, alarms, videos, voice recordings, verbal communication, moving graphics, color graphics etc.) to prompt the user to provide an update to the information by instructing, suggesting, querying, etc. the user.

At block 730, the system can receive updated information. In some embodiments, for example, the system receives updates through the input boxes in the interactive form illustrated in FIGS. 5A-5G. In some embodiments, the system can receive an attachment, such as a text file containing the update.

In some embodiments, blocks 725 and 730 can be an iterative process as the system prompts the user for an update on information, instructs them on how to consider the information, then receives the updated information. For example, the iterative process can repeat the process in blocks 725 and 730 to sequentially prompt the user and receive information on components such as a description of the priority, an indication of a relevance of the priority to the organization, a description of a goal for the priority, an indication of an expected resource requirement, an indication of personnel involved in the priority, and/or a specification of one or more imperatives related to the priority.

At block 735, the system automatically analyzes the updated information. In some embodiments, the system analyzes the information to identify missing information (e.g., components that have not been addressed, questions in each component that have not been addressed, etc.), and can return to block 725 to prompt the user for information. In some embodiments, the system analyzes the updated information to identify one or more relationships between the updated information and one or more components elsewhere in the organization's statement. For example, if the user updates a mission statement in one priority, that update can be automatically carried through every priority. As another example, if the user provides an update on upcoming dates, the system can automatically link the information to a calendar component and/or update information in the calendar component accordingly. In some embodiments, the system can apply a machine learning algorithm (e.g., decision tree, neural network algorithm, regression analysis, or other suitable algorithm) to the updated information to predict further updates and/or generate links to other components in the organization's statement. For example, if the user provides an update on an upcoming deadline, the system can apply a natural language processing algorithm to identify the update, use a machine learning algorithm to predict likely updates to the status of the priority, and automatically change a status of the priority accordingly. In another example, the system may apply a machine learning algorithm to determine whether the updated information impacts other priorities in a way that was previously unaccounted for, and suggest updates to the information based on the determination.

At block 740, the system stores and formats the information to be populated onto the nodes on the organization's website to publish the updated information. After storing the information, the system returns to block 710 to check for another priority. If there are no more priorities to be addressed, the system moves to block 745.

At block 745, the system publishes the information to the organization's website, thereby providing remote access to the updated information. Because this process can happen in real time (e.g., within seconds or minutes so that the updated information is available virtually immediately), other users in the organization accessing the website can obtain access to the most up to date information available.

In some embodiments, the system can automatically generate a notification when updated information is published. In various embodiments, the notification can include an indication of the update, a summary of the update, and/or a link (e.g., in wherein the link is one of: URL, URI, QRCode, etc.) to the update.

FIG. 8A is a display diagram of an example user interface displaying an organization's strategic priorities and imperatives for visualization and access after the system completes the publishing process 700. The user interface can be filtered to highlight only the priorities 804 a user is working on, is assigned to, and/or is following. In some embodiments, the system also allows users to download or print the images of the user interface into pdf or other formats, for example, to provide a hard copy of the user's assigned objectives. In some embodiments, the user interface can also include a link 814 to a mission statement and/or foundational information on the organization.

Figure 8B:
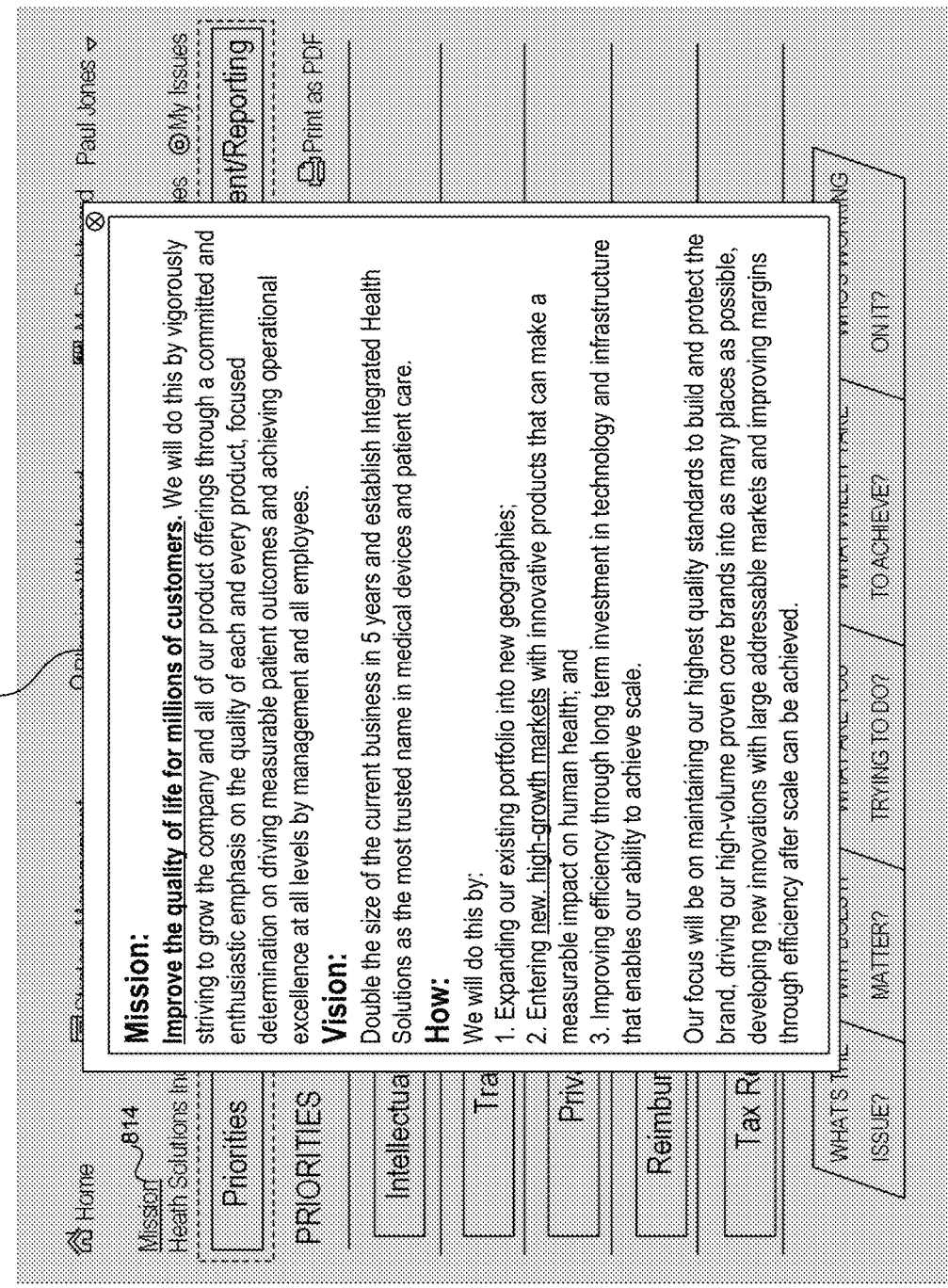
FIG. 8B is a display diagram of the example user interface of FIG. 8A after the user selects to view broader strategy information for the organization in accordance with some embodiments of the present technology.

FIG. 8B is a display diagram of the example user interface of FIG. 8A after the user selects the link 814 to view the mission statement and broader strategy for the organization. In the illustrated embodiment or example, the user has selected "View Foundational Information" and the system launched a display window 830 displaying information relevant to the strategy, such as mission, purpose, vision, and other foundational information.

When a user selects a priority and/or imperative, the system can display the information stored for that objective in accordance with a standardized format for the organization. The standardized format can allow users to visualize the information in a structured and organized way, thereby further allowing any number of users to review, discuss, align, debate and/or further update the information in a focused and consistent manner. An example of the user interface containing the standardized display is illustrated in FIGS. 9A-9G. The standardized format also provides a common framework with a logical progression that allows information to be communicated around core organizational questions, driving a more integrated approach to strategy, planning, and execution across teams.

Figure 9A:
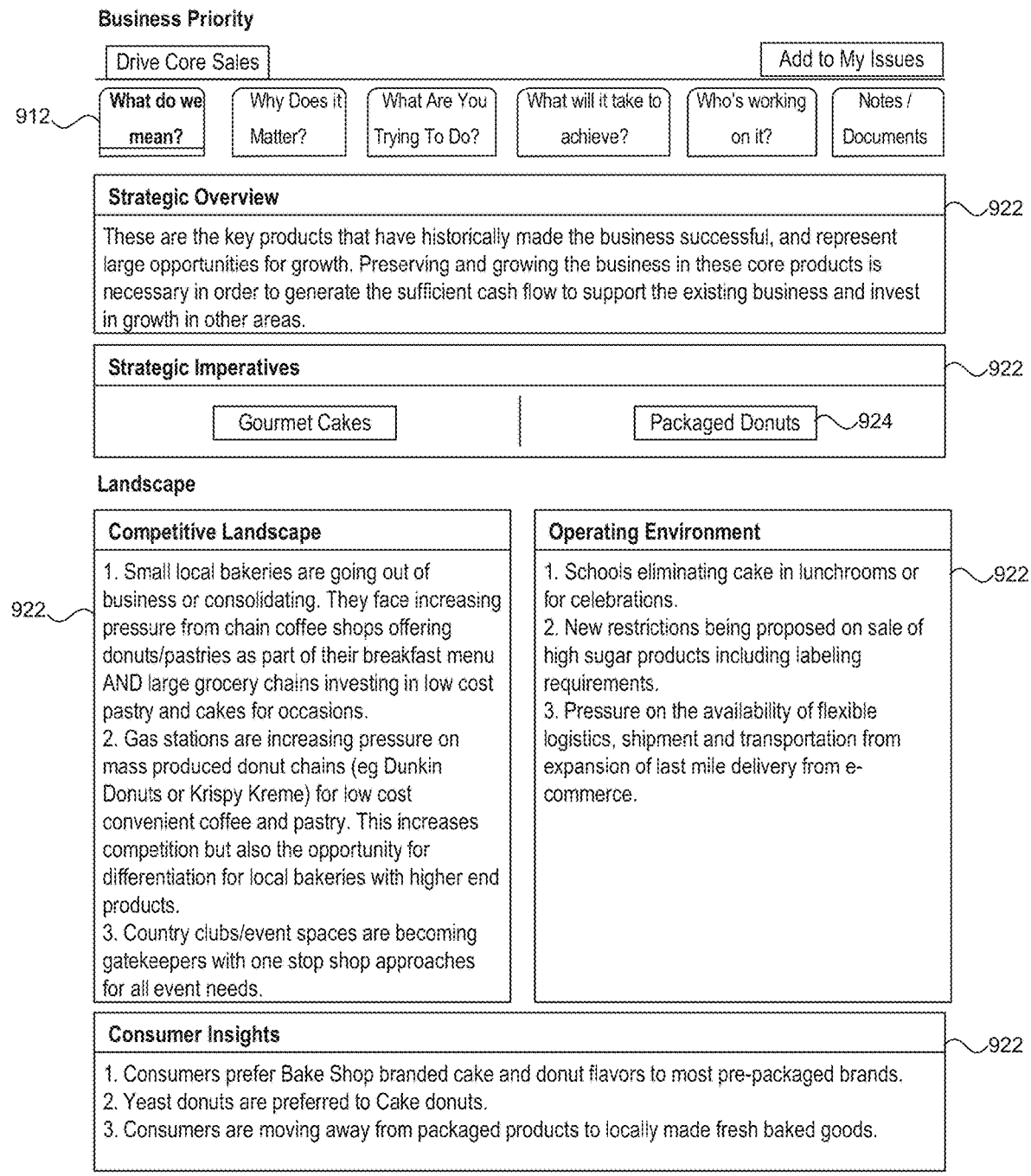
FIG. 9A is a display diagram of an example user interface displaying updated information on a selected objective in accordance with some embodiments of the present technology.

FIG. 9A is a display diagram of an example user interface displaying updated information on a selected objective in accordance with some embodiments of the present technology. In the illustrated embodiment, the user has selected the What do we mean?" tab 912. Accordingly, the system displays information assigned to what is meant by an objective under the standardized format. In some embodiments, for example, the display can include a plurality of components 922 to indicate a strategic overview for the objective, imperatives related to the objective, the landscape for the objective, consumer insights related to the objective, and various other relevant components. As further illustrated, components 922 can contain one or more subcomponents 924 related to that component. The components 922 and subcomponents 924 displayed for each objective can vary based on the organization, the industry the organization is in, the organization's development of an objective in the planning phase and detailing phase, etc. (e.g., the priorities, and components of those priorities can vary from a consumer sales business and a charitable organization). In some embodiments, the display includes an overview of the objective as well as information regarding other contextual activity that shapes the landscape around the objective. For example, as illustrated in FIG. 9A, the display organizes the information around the first topic—describing the topic or objective so any user knows the definition, scope, intent, and/or context of a given topic. That is, the format can help provide alignment and a common understanding of the objective at hand, so that work and planning can be performed in an intentional way. In some embodiments, the format can also display whether the visualized objective is part of a larger objective, is dependent on others, and/or has other connection points, etc.

FIG. 9B is a display diagram of the example user interface after a user selects another tab of the component in accordance with some embodiments of the present technology. In the illustrated embodiment, the user has selected the "Why does it matter?" tab 912 and the system displays information pertaining to business relevance under the standardized format. In some embodiments, this can include information stating the specific relevance and/or impact to the organization, what parts of the organization it impacts (e.g., business units or divisions), whether the organization has a position or policy statement on it, if that position is formalized or official as opposed to simply understood, etc. For example, this display allows an organization to check whether they are aligned on the impact and importance of an objective. Further, the display can allow the organization to communicate the objective's relevancy in an efficient manner to the teams that have to develop and execute a plan to address the objective. As a result, the system can improve work efficiency by directing users to define the objective, then define its impact, and then proceed with deciding and articulating how to address the objective.

FIG. 9C is a display diagram of the example user interface after a user selects another tab of the component in accordance with some embodiments of the present technology. In the illustrated embodiment, the user has selected the "What are you trying to do?" tab 912 and the system is displaying information pertaining to outcomes, timing, etc. under the standardized format. In some embodiments, the display can include information relevant to describe what the goals for an objective are, and/or tactics or activities aligned to those goals. In some embodiments, the system can track the progress of the goals, objectives, tactics, and/or activities and automatically update the information to include the updates in the display.

In some embodiments, the "What are you trying to do?" tab 912 can reflect critical components that can impact and shape an organization's plan and/or approach to an objective. For example, once a user has understood the objective and impact to the organization in FIGS. 9A-9B, it can be useful to clearly understand what the organization is trying to achieve, how it would be done (or critical workstreams, tactics, or activities), and/or when there are critical dates or timelines or planning, and/or what the landscape surrounding that objective is like (e.g., external environment, major campaigns, political environment, etc.). In some embodiments, information related to critical dates and timing can be entered directly by a user. In some embodiments, the system can automatically enter information related to critical dates and timing (e.g., pulling from internal data sources (e.g., internal calendars) and/or external sources (e.g., by semantically mining websites or publicly available documents and repositories that can be networked into)).

As further illustrated in FIG. 9C, information can be marked and highlighted to allow a user or team leader to quickly understand and determine status of a particular tactic or workstream for accountability or to adjust strategy. For example, the display can include a status indicator 940 displayed near a listed tactic. In some embodiments, the status indicator 940 can be one of a selected number of indicators, such as "In Progress with No Challenges," "In Progress with Roadblocks," "Completed," "Not Started." In some embodiments, the status indicator 940 can include other visual cues, such as colors, stop lights, etc. that are commonly understood in the organization to provide further clarity on the status of each tactic. The status indicators 940 help ensure management and other team members are aligned on what needs to be done, why it needs to be done, whether they are progressing according to plan, and/or whether there are specific challenges that need to be addressed. In some embodiments, the status information can be entered by a user providing an update to information on the objective. In some embodiments, the system can connect the statuses of multiple tactics to automatically update the status information, for example when a related status is updated elsewhere in the system.

In some embodiments, the system can visually connect the tactics and workstreams to a particular desired outcome. In some embodiments, the system can allow a user to add workstreams to objectives and/or components of objectives. In some embodiments, the system can allow the user to enter relevant information about each workstream such as a description, timeline, status, etc. In some embodiments, the system can include information about specific activities within a workstream to allow granular management of work that is efficiently and directly connected with the larger strategy. In some embodiments, the system can include performance indicators and/or other measurements of progress in the visualization. For example, the system can connect an outcome to pre-determined Key Performance Indicators, such as the "Number of Contacts Made" by a particular team member versus their sales goals.

In some embodiments, the system can be connected to more detailed project management and tracking component in the system to create a holistic strategy and project management approach. In some embodiments, the system can be connected to external management systems to enable consistent and streamlined management of and reporting on workstreams.

Figure 9D:
FIG. 9D is a display diagram of the example user interface of FIG. 9A after a user selects another tab of the component in accordance with some embodiments of the present technology.

FIG. 9D is a display diagram of the example user interface after a user selects another tab of the component in accordance with some embodiments of the present technology. In the illustrated embodiment, the user has selected the "What will it take to achieve?" tab 912 and the system is displaying information under the standardized format. This tab can include components 922 with descriptions of how difficult or complex the objective is, what will be required to achieve the objectives, what resources need to be committed, etc.) to achieve the goals and/or execute the tactics for an objective. For example, the display can include the number of employees, type of employee, skill set, budgets, etc. expected to be required to achieve a goal for a given objective. In some embodiments, users can also update the information with the actual resources committed.

These displays can allow the user and/or organizational management to determine whether the approach to the goal is reasonably attainable; the approach cannot be resourced so it should be delayed, de-prioritized, stopped, etc.; and/or whether the approach requires resources disproportionate to the goal and/or objective.

These displays can also allow the user and/or organizational management to evaluate whether the resourcing required aligns to and matches up with expectations and/or the goal being achieved. These displays can also enable teams to more efficiently and accurately identify a gap between the strategy and the execution of the strategy, align their teams, and/or alter their priorities in a transparent way.

FIG. 9E is a display diagram of the example user interface after a user selects another tab of the component in accordance with some embodiments of the present technology. In the illustrated embodiment, the user has selected the "Who's working on it?" tab 912 and the system is displaying information pertaining to internal and external people or organizations, and their roles in the work or project under the standardized format. In some embodiments, the display can include other relevant details relevant to tracking, contact points, decision makers, etc. As a result, the display can provide an efficient way for users to identify, access, and find relevant contacts working on a given objective for communication purposes. The display can also allow better management of who is doing what, whether there are particular people or organizations that teams should develop better relationships with, contact between team members, and/or the planning of strategic and relevant conversations and relationships based for the displayed objective.

In some embodiments, system can allow communication with contacts in the information directly from the user interface through email, text hyperlinks, and/or other communication mechanisms. As a result, users can engage in streamlined and immediate strategic conversations through the system.

Figure 9F:
FIG. 9F is a display diagram of the example user interface of FIG. 9A after a user selects another tab of the component in accordance with some embodiments of the present technology.

In addition, in some embodiments, users can add additional commentary, relevant information, descriptions of challenges or roadblocks, files, documents or summaries, or other information to an objective to provide context or easy access to relevant information, for example as shown in FIG. 9F.

FIG. 9F is a display diagram of the example user interface of FIG. 9A after a user selects another tab of the component in accordance with some embodiments of the present technology. In the embodiment illustrated in FIG. 9F, the system allows users to add notes and updates to the priority, upload documents or other material relevant to the priority, and access documents that have already been uploaded.

Figure 9G:
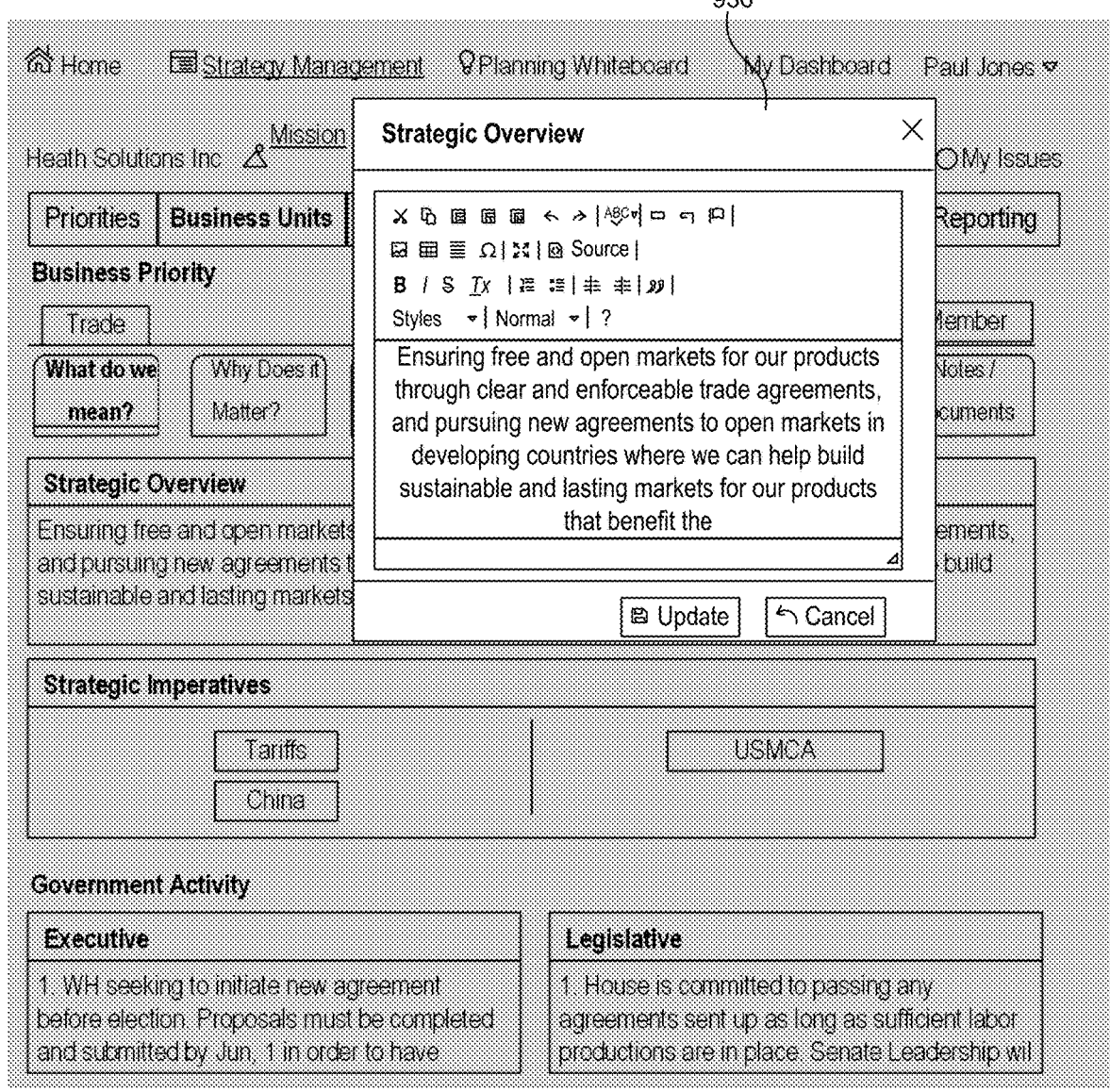
FIG. 9G is a display diagram of the example user interface of FIG. 9A illustrating an additional feature of the user interface in accordance with some embodiments of the present technology.

FIG. 9G is a display diagram of the example user interface illustrating an additional feature of the user interface in accordance with some embodiments of the present technology. In the illustrated embodiment, the system can allow users to update and edit specific content on from the user interface itself, for example by clicking an edit icon entering the updated information into a pop-up entry box 930. Once entered, the system formats and stores the information to generate the same outputs in the user interface as what is generated from the interactive form described above with respect to FIGS. 5A-5G. As a result, users can efficiently provide small updates to the information. In some embodiments, the system can additionally, or alternatively, allow users continuously update information (e.g., immediately when it changes, in intervals decided by the organization, etc.) by returning to the interactive form described above, thereby allowing users to efficiently provide larger updates to the information.

In some embodiments, users can be notified when information on any objective they follow is updated. In some embodiments the notification can include a link (e.g., in wherein the link is one of: URL, URI, QRCode) to the user interface displaying the updated information. In various embodiments, the notification can be transmitted via email, mobile messaging, social media, shared work platforms, and/or through notices posted to the user's account in the system or on their home page.

In some embodiments, the system can be augmented by machine learning or artificial intelligence in order to include notifications for information available from relevant internal and/or external sources pertinent to the objective. In some embodiments, for example, based on a user's particular interests or objective set, the system can analyze external publications and/or internal webpages to determine if they are relevant to an objective (e.g., through a semantic analysis), and, if so, generate a notification to the user with a link to the external source as a recommendation. In some embodiments, the system can generate links to internally networked systems and databases, and/or to external sources accessed via the web or other network options.

Figure 10:
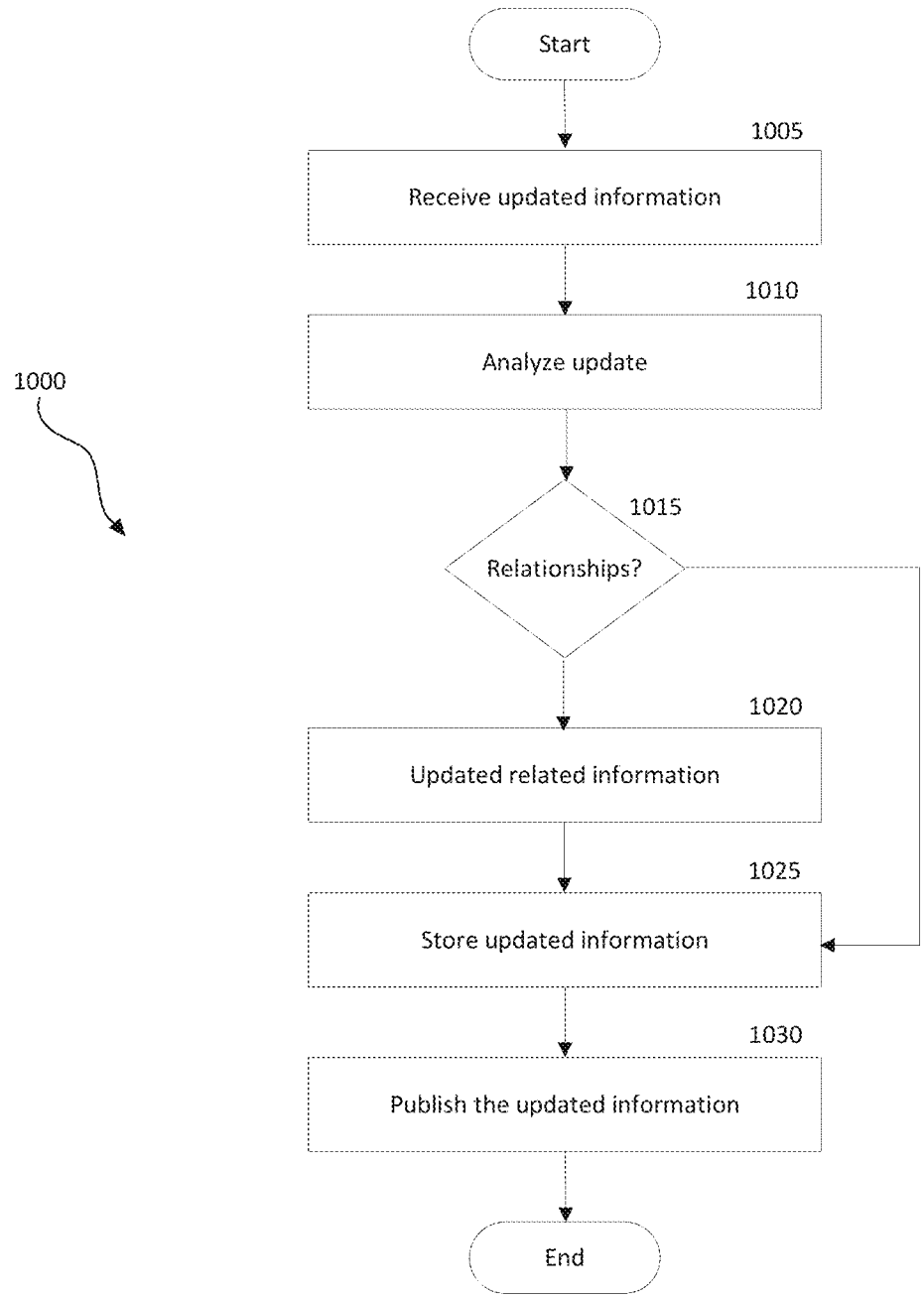
FIG. 10 is a flow diagram of a process for updating information on the organization's priorities from the organization's website in accordance with some embodiments of the present technology.

FIG. 10 is a flow diagram of a process 1000 for updating information on the organization's priorities from the organization's website in accordance with some embodiments of the present technology.

At block 1005 the system receives updated information (e.g., through the user interface illustrated in FIG. 9G).

At block 1010 the system automatically analyzes the update to determine whether the updated information is related to any other information stored in the system. In some embodiments, the system can use links previously generated to search for related information. In some embodiments, the system can perform a semantic analysis of the updated information. In some embodiments, the system can apply a machine learning algorithm to predict relationships to other information based on the update to the information.

At decision block 1015, if the updated information is related to other information stored in the system, the system can move to block 1020 to update the related information; else the system can move to block 1025. At block 1025, the system can store all of the updated information.

At block 1030, the system can publish the information to the organizations website. Accordingly, at block 1030, the system can provide a real time update to the information to the organization's website. In some embodiments, the system can also generate a notification of the newly published information. In various embodiments, the notification can include a notice of the updated information, a summary of the updated information, and/or a link to the updated information. After publishing the information, the system completes the process 1000.

In some embodiments, the system allows users to filter their displayed objectives (from, e.g., FIG. 9A) in various ways based on attributes in the information. FIGS. 11-14B are display diagrams of an example user interfaces after the user has selected one or more filters in one or more components of the website.

FIG. 11 is a display diagram of the example user interface after a user selects to view only the objectives they are responsible for. As illustrated, the filter allows the user to separate the objectives they are responsible for and/or follow from the full set of objectives, as indicated in this example by selecting between "My Issues" and "Global Issues." In some embodiments, the system allows users to elect to follow and/or add an objective to their responsibilities, thereby expanding the objectives displayed once filtered.

Figure 12A:
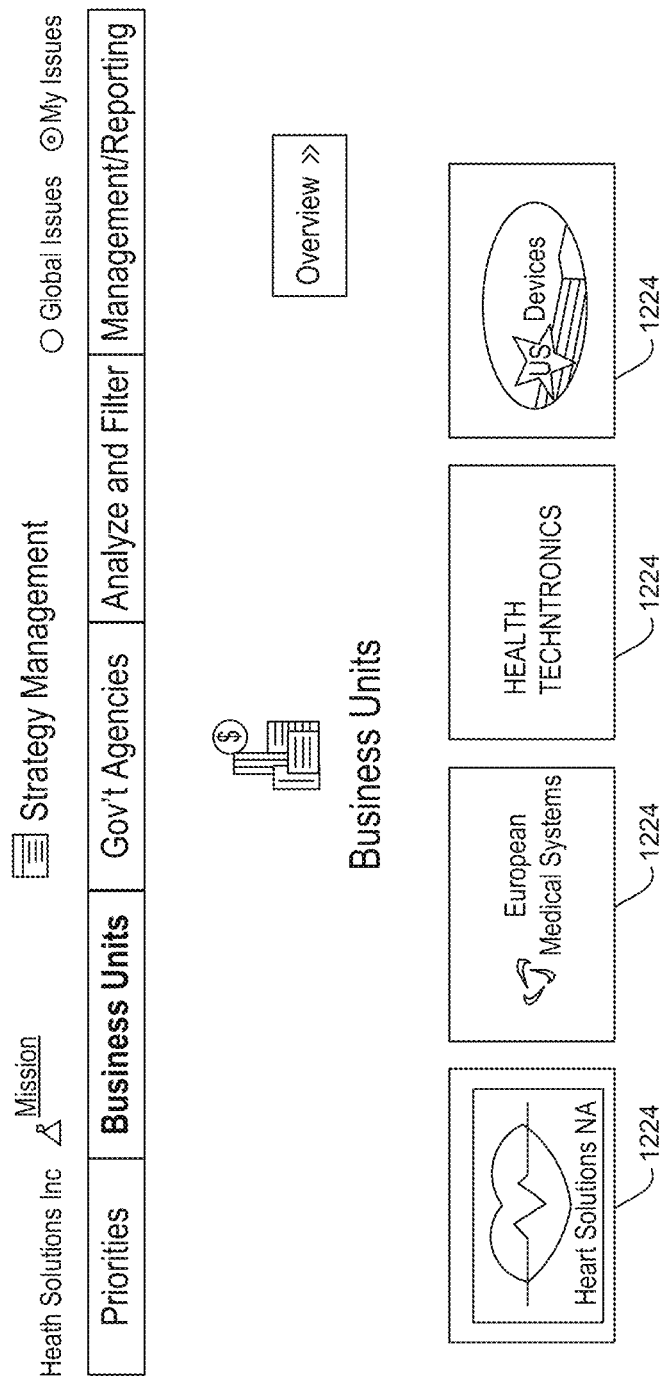
FIG. 12A is a display diagram of an example user interface displaying business units or divisions, or other organizational units, related to or within the organization in accordance with some embodiments of the present technology.
Figure 12C:
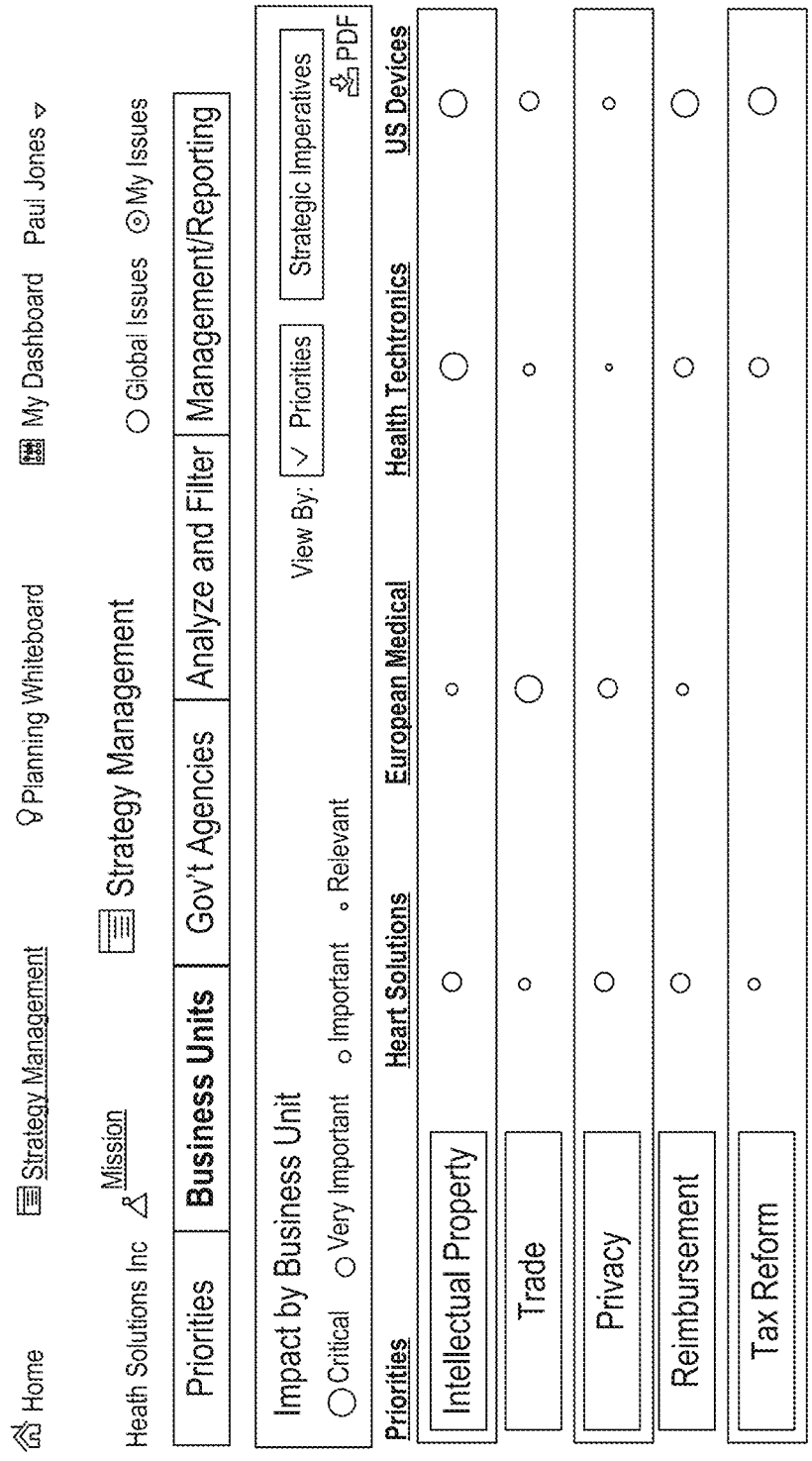
FIG. 12C is a display diagram of an example user interface displaying a graphical representation of the connection between business units and various objectives in accordance with some embodiments of the present technology.

FIGS. 12A-12C are displays diagram of the example user interface after the user selects various filters according to business units or divisions. The business units filter allows the user to see how components of an objective connect to different units or divisions of an organization. In some embodiments, the business units filter can also illustrate connections to other information, such as external parties that the organization is partnering with and/or attempting to partner with. Accordingly, the filter allows users to better understand who and/or what their work impacts, the benefit they are delivering, and where they should be placing more or less resources to maximize the impact of their work. In addition, the business units filters allow users to compare various objectives to each other to enable efficient prioritization, elimination of duplicative resources, and/or deeper comparison to specific criteria across a subset of the portfolio. As a result, the business units filter provides organizational teams with an efficient way to see the impact of any given objective and/or business unit that can then help guide them to more detailed evaluation and/or conversation about the objective and/or business unit.

FIG. 12A is a display diagram of the example user interface displaying business units or divisions related to or within the organization in accordance with some embodiments of the present technology. From this display, users can navigate to how a specific business unit relates to the objective by clicking on an icon 1224 for the specific business unit. For example, the user can click on the icon 1224 corresponding to European Medical to navigate to the user interface illustrated in FIG. 12B.

FIG. 12B is a display diagram of the example user interface displaying information related to a specific business unit in accordance with some embodiments of the present technology. In the illustrated embodiment, the user interface displays high level information on how each priority or imperative connects to the selected business unit. In some embodiments, the user can select a displayed objective to be taken to a display with more detailed information about the connection between the selected business unit and the selected objective.

FIG. 12C is a display diagram of the example user interface displaying a graphical representation of the connection between business units and various objectives in accordance with some embodiments of the present technology. In some embodiments, the high-level view of connections can be used to indicate a degree of relevance, for example through different size shapes, bubbles, colors, etc. In the illustrated embodiment, for example, the degree of relevance is illustrated by different sized and colored bubbles in a table having business units in the columns and priorities in the rows. In some embodiments, information on the degree of relevance can be captured in the interactive form or in updates provided to the system through the user interface (e.g., as shown in FIG. 9G). The display of the degree of relevance can be a useful way for users to quickly identify, discuss or isolate the most critical priorities to a business unit, and/or demonstrate what work a team is doing for a particular unit, division, and/or other relevant part of the organization.

In some embodiments, the degree of relevance can indicate whether a particular objective is Critical to an organization, Very Important, or Relevant. In some embodiments, the degree of relevance can be displayed with a large or red bubble if "Critical," a medium-sized blue bubble if "Very Important," and a small, black bubble if "Relevant." In various other embodiments, the system can use other descriptors, and/or can display the relevance using other mechanisms to convey the relevance or impact (e.g., various other colors, shapes, icons, etc.).

Figure 13:
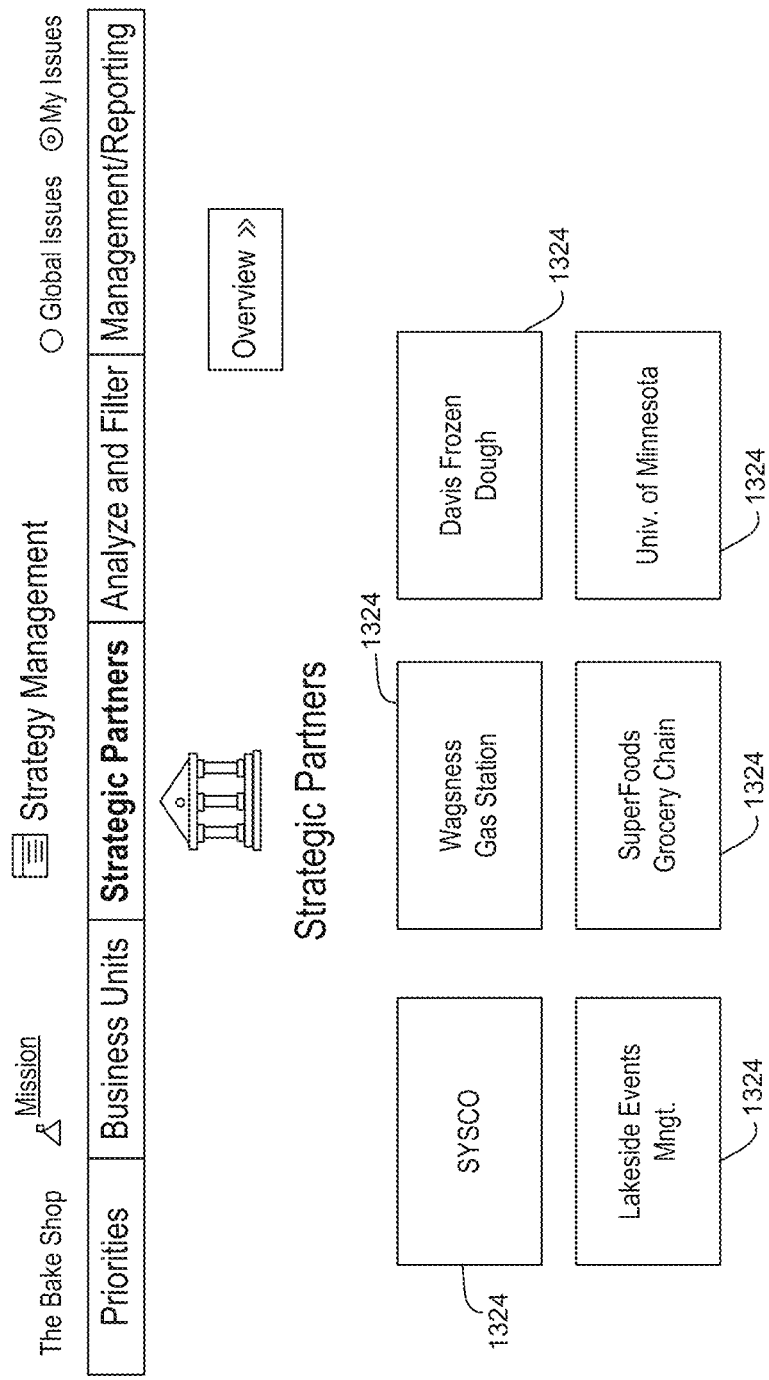
FIG. 13 is a display diagram of an example user interface displaying strategic considerations external to the organization in accordance with some embodiments of the present technology.

FIG. 13 is a display diagram of the example user interface displaying strategic partners external to the organization in accordance with some embodiments of the present technology. Like the user interface in FIG. 12A, a user can select a specific strategic partner icon 1324 to be taken to a display illustrating information specific to that strategic partner and their connection to objectives (for example, similar to the user interfaces in FIGS. 12B and 12C).

In some embodiments, users can visualize all the objectives together and filter and sort them based on numerous features in the information. FIGS. 14A-14D illustrate an example user interface a user can interact with to apply the various filters, as well as examples of the result.

FIGS. 14A and 14B are display diagrams of the example user interface displaying various filters the user can apply to the information in accordance with some embodiments of the present technology. In various embodiments, the user can select to view objectives by rank of priority, difficulty level, resource intensity, budget, division impacted, etc. For example, in the embodiment illustrated in FIG. 14A, the user has selected to view objectives by priority and the user interface displays various qualifies applied to the objective such as the criticality, difficulty, intensity, resources required, resources committed, etc. In the embodiment illustrated in FIG. 14B, the user has similarly selected to view objectives by priority, and has scrolled in the user interface to view more detailed information related to each objective.

In some embodiments, users can also refine their view to see which priorities impact or apply to specific or multiple units, partners, government agencies, etc., to see where there may be overlapping impacts, opportunities to leverage resources, and/or identify gaps. As a result, the system allows users to place individual priorities in a more complete context, compare them against competing priorities, and better prioritize and align workstreams and resources based on clear and concise data.

FIG. 14C is a display diagram of the example user interface displaying a compare filter the user can apply to the information, with objectives sorted by criticality in accordance with some embodiments of the present technology. In the illustrated embodiment, the user interface further includes a compare filter, allowing users to select a subset of the objectives to be displayed for comparison. For example, the compare filter allows a user who is part of a business that has ten objectives can select three of them, filter, and compare the three objectives by certain further selected filters and/or criteria (e.g., difficulty level to achieve), in order to, for example, efficiently determine which objective has the best chance of success with the least amount of resources. As a result, the user can de-prioritize the other objectives and move resources to the more tangible or attainable priority. In some embodiments, the comparison can be automated in the system, described in more detail below with respect to FIGS. 15A-15M.

FIG. 14D is a display diagram of the example user interface of FIG. 14C after the user has applied the compare filter in accordance with some embodiments of the present technology.

In some embodiments, the fields, filters and required information inputs discussed above with respect to FIGS. 11-14D can be edited, hidden, deleted, and/or added onto in a simple manner based on the organization's needs (e.g., changing the names of filters or deleting them if they are not relevant). In some embodiments, the system can automatically generate tags for each objective when a new filter is added, for example through a semantic analysis of the information stored in the system. In some embodiments, the filters and design features can also be changed to maximize flexibility and customizability of the user interface, inputs, information required, manner of filtering, reporting templates, etc., thereby enabling a higher degree of customization tailored to each user and/or organization.

In some embodiments, the system can also allow users to generate various summaries and reports based on the data tailored to specific organizational needs. Example user interfaces for doing so are illustrated in FIGS. 15A-15M. For example, the system can be used to generate one-page summaries; collated reports on specific partners, people, units, and/or divisions; and/or calendars on critical dates. In some embodiments, the system can automatically generate calendars and timelines from the information entered elsewhere in the system (e.g., in the planning component of FIGS. 2A-2E, in the interactive form of FIGS. 5A-5G, etc.) and using a standardized calendar format. In some embodiments, the system can automatically generate various other reports and summaries by formatting the information entered into and/or updated in the system into another standardized format. For example, in some embodiments, the system can automatically generate one-page summaries of an objective by automatically formatting critical information and saving the formatted information in a communicable document (e.g., a PDF, Word document, PowerPoint, webpage, etc.). In some embodiments, the system can allow the user to sort and efficiently generate these reports based on specific, relevant components—for example to include only what impacts a specific business unit.

Figure 15A:
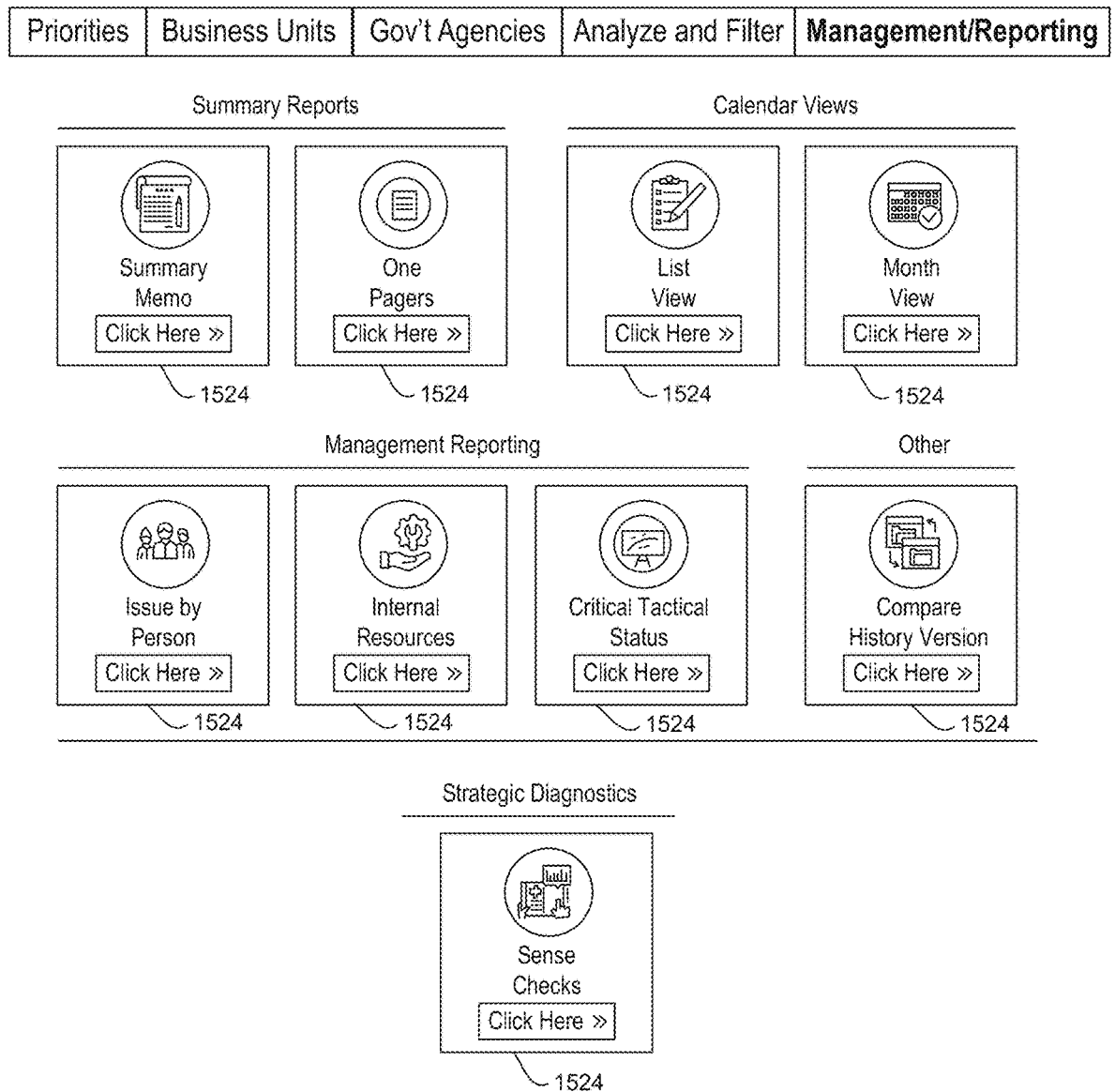
FIG. 15A is a display diagram of an example user interface for launching into various management and/or reporting components in accordance with some embodiments of the present technology.

FIG. 15A is a display diagram of an example user interface for launching into various management and/or reporting components in accordance with some embodiments of the present technology. As illustrated in FIG. 15A, the user interface includes a plurality of links 1524 to various components in the management component.

Figure 15B:
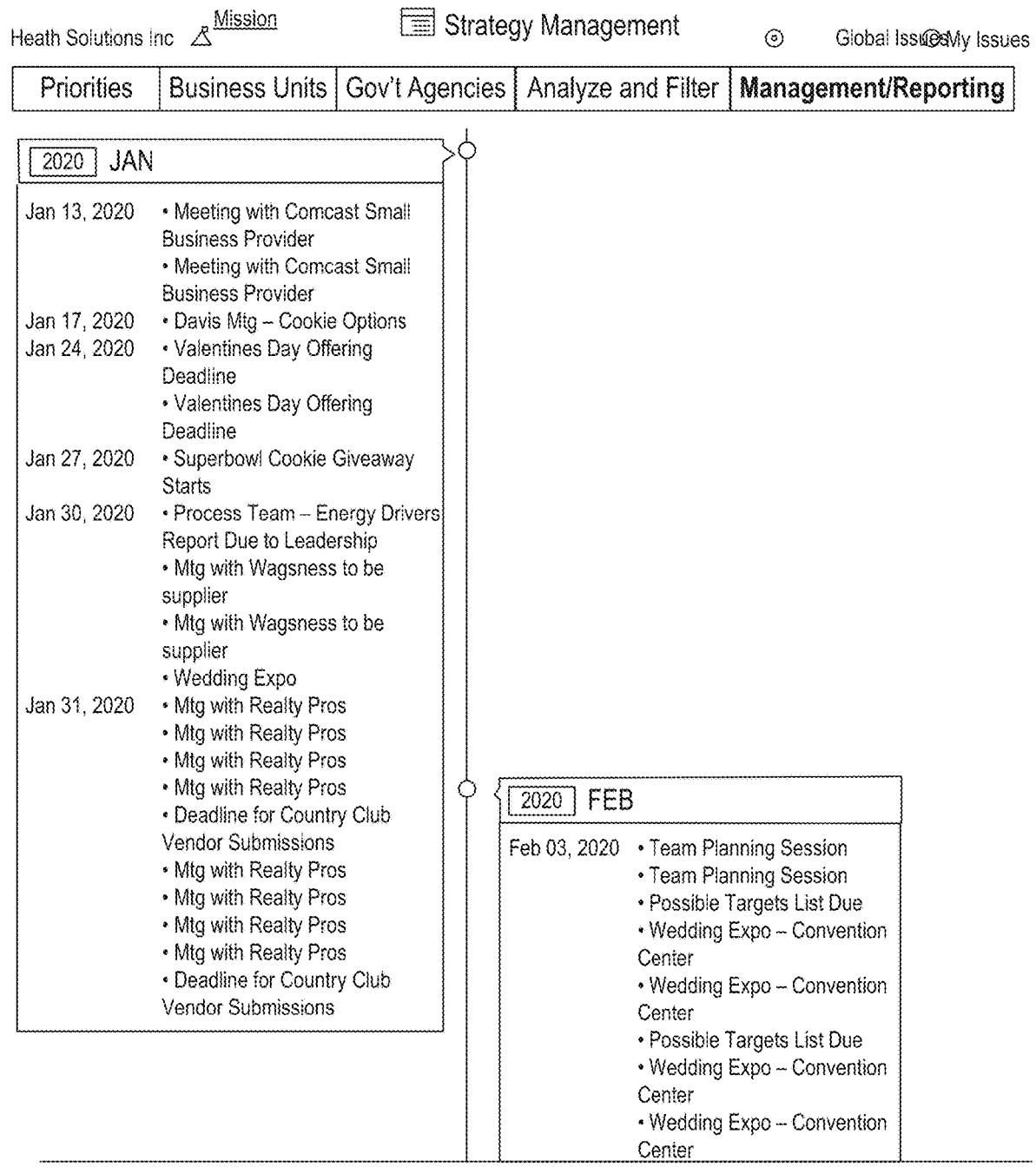
FIG. 15B is a display diagram of an example user interface after the user has navigated to a list view component in accordance with some embodiments of the present technology.

FIG. 15B is a display diagram of an example user interface after the user has navigated to a list view component in accordance with some embodiments of the present technology. The system can generate a list of dates using information input in various other components of the system. In some embodiments, the list can include just a headline for each element. In some embodiments, the elements in the list can be links to other components in the system, allowing a user to quickly jump to more detailed information about an upcoming date.

FIG. 15C is a display diagram of an example user interface after the user has navigated to a calendar component in accordance with some embodiments of the present technology. In some embodiments, the system can generate a calendar using information input in various other components of the system. In some embodiments, each calendar event can contain a link to another component in the system to view more detailed information. In some embodiments, the system can generate a short summary to include in each calendar event (e.g., displayed when the event is clicked on). In some embodiments, the calendar can also be filtered, for example to only show dates pertaining to a specific objective. In some embodiments, the system can also allow users to add events and/or other information through the calendar.

Figure 15D:
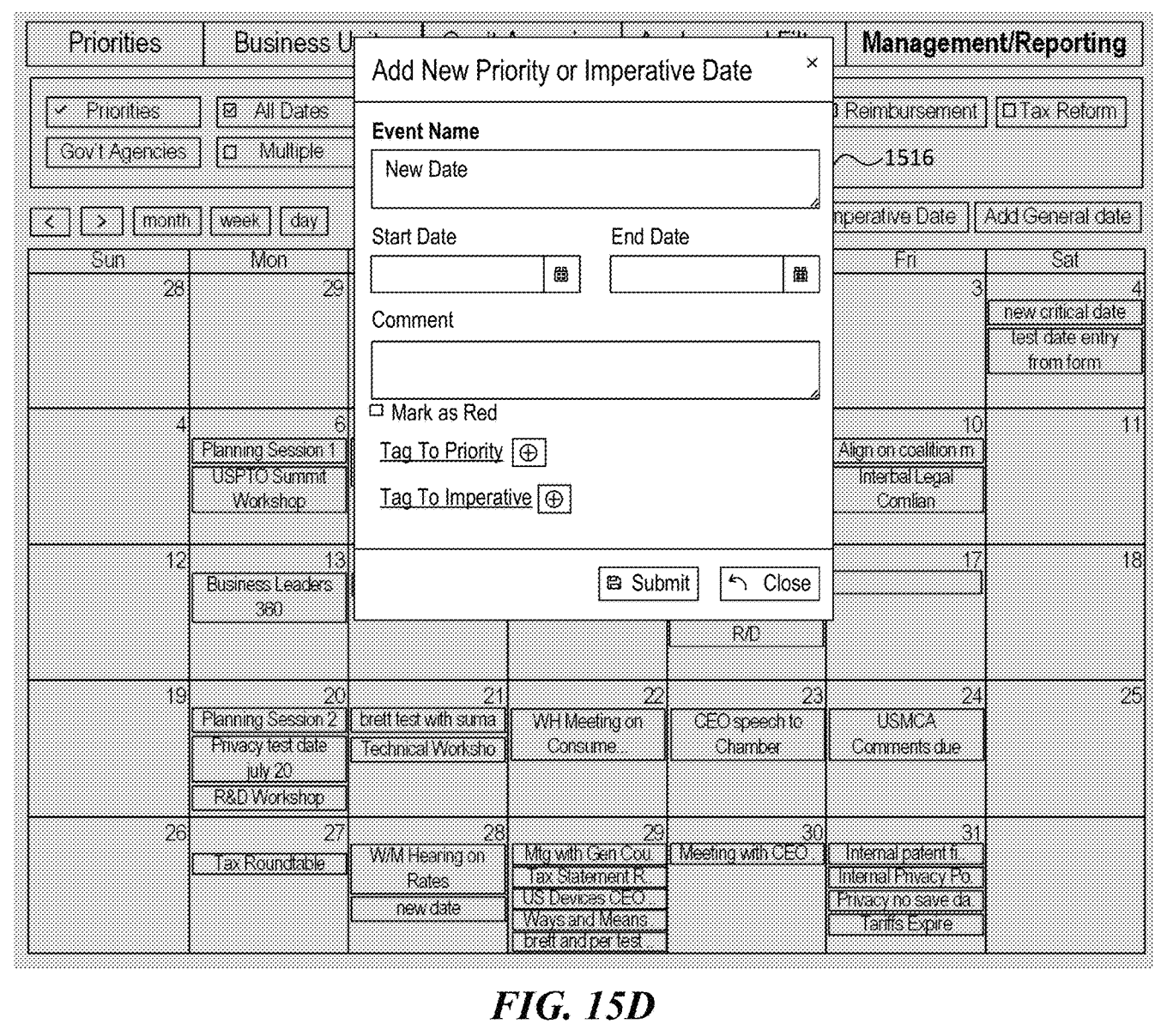

FIG. 15D is a display diagram of an example user interface for adding a date to the calendar component illustrated in FIG. 15C in accordance with some embodiments of the present technology. The calendar view and inner-calendar entry features can allow users to engage in contextual planning that accounts for upcoming deadlines.

In the illustrated embodiment, the system allows the user enter information on a new event and tag the event to an objective through a dialog window 1516 in the calendar. Once the user indicates the tag, the system can automatically update information related to that objective to include the event. In some embodiments, the update can include sending a notification to all users following that objective. In some embodiments, the system can allow the user to enter additional information on an event, an objective, and/or various tasks related to the objective through a similar dialog window. For example, the user can add a comment to the strategic plan for an upcoming pitch through the calendar, and the system can update the information related to the event. In some embodiments, the system can allow the user to add markings (e.g., surrounding a date with a red box to indicate the date requires pre-work, preparation, and/or or special attention) that the system can incorporate into other information to help facilitate the organization's planning. For example, the automatic incorporation allows a much tighter integration between the strategic blueprint and the execution of the strategy.

In some embodiments, the calendar component can integrate with other calendar applications to populate the dates in the other calendars and/or populate the calendar component with dates from the external calendar. For example, in some embodiments, the calendar can mesh within a Google or Outlook calendar to increase the ease of access to information about critical dates. In some embodiments, the calendars can be converted to various file types for export, for example allowing the calendar to be printed outside of the system.

FIG. 15E is a display diagram of an example user interface after the user has navigated to a history component in accordance with some embodiments of the present technology. To generate a display, a user can select a particular date and the system can pull information from an archive for the particular date. In some embodiments, the system can allow users can compare versions of the information in order to visualize or track what has changed over time. For example, to generate the display in FIG. 15E, a user can select one or more dates to compare to the current day's information, and the system pulls the information inputs from each day from the archive. In some embodiments, the system can allow users to compare a plurality of dates against each other to see how an objective has changed over several months.

In the illustrated embodiment, for example, the comparison is displayed through multiple graphical components 1518, each dated appropriately to show what the information contained on selected dates. In various embodiments, the system can display the history in a variety of manners in order to create user-friendly reports and visuals. For example, in some embodiments, the display can highlight specific changes with different colors, underlines, etc. to make it easier for users to quickly identify where the information was updated.

FIG. 15F is a display diagram of an example report that the system generates after the user navigates to a report component from the user interface of FIG. 15A in accordance with some embodiments of the present technology. In the report component, the system can automatically generate a report that collates all, or portions of, the information from the interactive form (FIGS. 5A-5G) into a communicable file (e.g., PDFs, Word documents, PowerPoint presentations, tables, graphs, charts, text files, email supported formats, memos and/or other relevant text and/or visual presentations) that can be saved and/or shared as is. In some embodiments, the system can allow the user to specify the format of the communicable document and/or pick the format from a plurality of templates. In some embodiments, the system can also allow users to pick out certain aspects of the communicable file to edit, reformat, and/or place into other presentations in an efficient manner.

The report component can alleviate the burden of constantly recreating presentations of the information when it is updated and/or reduce the cost of duplicate efforts of creating presentations. Further, the summary memo component ensures information is pulled from a consistent and reliable source to ensure "one version of the truth" for an organization. The summary memo component can also mitigate the tendency for information or descriptions to change slightly each time, which can gradually shift, or drift, the content away from the original intent. The content can be formatted for pre-designed presentations or memos for easy retrieval and consistent formatting.

FIG. 15G is a display diagram of an example report that the system generates after the user navigates to a summary component from the user interface of FIG. 15A in accordance with some embodiments of the present technology. In the summary component, the system can automatically generate a summary report (e.g., a one-page report) that collates critical information about an objective and export the report into various communicable document file (e.g., PDFs, Word documents, PowerPoint presentations, tables, graphs, charts, text files, email supported formats, memos and/or other relevant text and/or visual presentations). In some embodiments, the system can collate a pre-defined subset of information to include in the summary report. In some embodiments, the pre-definition can be indicated by a user during the planning phase and/or through the interactive template. In some embodiments, the pre-definition can be purchased from a marketplace in the system. In some embodiments, the pre-definition can be defined by the system after applying a machine learning algorithm to past summary reports and/or user activity on the system (e.g., to identify the information that is the most viewed, shared, updated, printed, etc.).

FIG. 15H is a display diagram of another example report that the system generates after the user navigates to the summary component in accordance with some embodiments of the present technology. In particular, FIG. 15H illustrates a one-page summary generated for a different organization, having differing priorities and strategies directed at their priorities.

FIG. 15I is a display diagram of an example user interface after the user has navigated to an objective-by-person component in accordance with some embodiments of the present technology. In this component, the system allows users to visualize and generate reports on which individuals are working on different components of the strategy based on the information collected in the system. Further, the system can allow the information to be viewed in different ways depending on the user's desired need. In the illustrated embodiment, the system has organized individuals by the External Group they work for. This organization allows a user to quickly see what things individuals within an external group are actually working on, enabling the user to contact the correct parties and ensure accurate engagement and communication etc. In some embodiments, the system also, or alternatively, allows a user to sort information by Objective, Role, and/or other criteria as relevant. In some embodiments, the system allows users to view who is working on objectives from an internal perspective, thereby providing users with a quick and structured way to know who is responsible for various objectives within the organization, who is a point of contact, what role they have in an organization, etc.

FIG. 15J is a display diagram of an example user interface after the user has navigated to an internal resources component in accordance with some embodiments of the present technology. In the resources component, the system allows users to visualize what components, functions, and/or teams within an organization are relevant to or are working on different parts of the strategy.

In the illustrated embodiment, for example, the system is displaying objectives worked on by teams through a listing of various teams, and a dot indicating which objectives they are working on. The display allows users to determine which teams (and sub-teams) are relevant to the objective of a Trade priority. As a result, the system enables users to improve visibility into the appropriate teams that are necessary to achieve success on an objective, thereby increasing communication and alignment to improve execution of the strategy.

FIG. 15K is a display diagram of another example user interface after the user has navigated to the internal resources component in accordance with some embodiments of the present technology. In the illustrated embodiment, the system is displaying information relevant to the team of external consultants. As further illustrated, the system can display teams in sub-teams, thereby allowing a user to view all of the priorities or imperatives each external consultant is working on. That is, the system collects information on individual external contacts in a central location, and enables users to view it all at once, rather than having to track it down from multiple locations. As a result, the system can make evaluating which contacts are relevant to a particular strategy much simpler, make determining how to use and connect contacts more efficient, and make determining how contacts can contribute (or not) across an entire portfolio much simpler. In turn, these improvements result in an increase in efficiency across the organization, and improve ongoing planning based on what individuals, partners, and/or teams are most relevant to in the organization and based on information across the entire strategy.

FIG. 15L is a display diagram of an example user interface after the user has navigated to a status component in accordance with some embodiments of the present technology. The status component enables users to view the status of critical tactics across an organization's plurality of priorities and/or for any selected priority. In the illustrated embodiment, for example, the system is displaying the status of all tactics for a selected priority (Trade). In some embodiments, the system can sort the tactics for a priority by status to enable efficient and structured conversations among users. In some embodiments, the system can also display all the priorities across the portfolio by status, thereby enabling focused conversations on progress across the organization, such as a conversation about the work that has not been started and/or is in progress but faces a roadblock that requires an intervention from the organization's leadership.

Figure 15M:
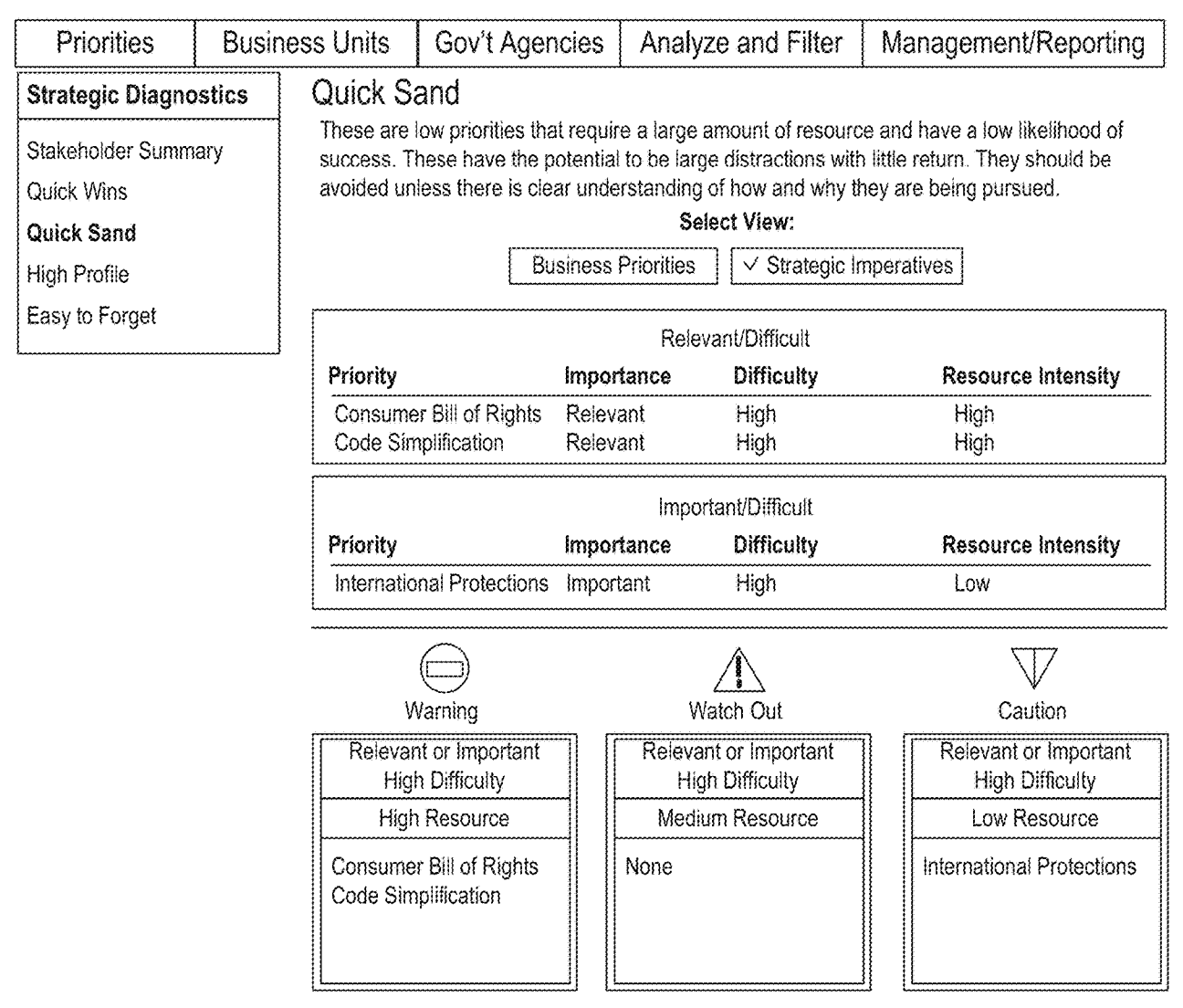

FIG. 15M is a display diagram of an example user interface after the user has navigated to a strategic diagnostics component in accordance with some embodiments of the present technology. In some embodiments, the system can run specific reports or diagnostics on the status of an organization's portfolio to give recommendations or guide the organization on things to do and/or avoid to best manage their portfolio. In the embodiment illustrated in FIG. 15M, the system is displaying one such report highlighting the relevant Stakeholders, Quick Wins, Quick Sand, High Profile, and the Easy to Forget objectives, with the user having selected to view the Quick Sand display. The Stakeholders display can illustrate personnel and which components of the strategy they are responsible for with the organization. The Quick Wins, Quick Sand, High Profile, and Easy to Forget displays can display portions of the strategy (e.g., priorities, components, goals, imperatives, etc.) with categories that have been assigned to each portion to facilitate the organization's management of their strategy. The Quick Wins display can highlight portions of the strategy (e.g., priorities, components, goals, imperatives, etc.) that the system has determined to be the easiest and/or fastest to achieve. The Quick Sand, for example as illustrated, display can highlight the portions of the strategy that the system has determined are the least relevant and/or most difficult to do, thereby indicating the portions should be avoided and/or revisited. The High Profile display can highlight the portions of the strategy that both are the most critical and require the most resources to indicate which portions may require specific attention by the team and/or the organization's management. The Easy to Forget display can highlight portions of the strategy that are often overlooked and/or that management may lose focus on because the objectives don't command high budgets and/or are not sufficiently critical to spend significant time on individually. However, the objectives in the "Easy to Forget" display can encompass a large portion of a portfolio when combined, such that the management of all of them can be important to an organization's success. Together, the displays can allow an organization to quickly and efficiently isolate strategic objectives, evaluate where there are gaps and where the organization should direct resources, then direct resources in a consistent and structured manner.

In some embodiments, system can tailor the reports based on the organization's desired outcomes. In some embodiments, the system can automatically generate the reports in the background and can flag objectives that it determines are Quick Wins, Quick Sand, and/or High Profile elsewhere in the system. In doing so, the system can consistently warn and notify the organization of the most opportune priorities and/or components to pursue as well as those to avoid, thereby enabling the organization to determine when and where to re-allocate its resources and focus in a coordinated, efficient way. That is, the system can provoke relevant conversations and/or highlight concerns or opportunities that the management and team should focus on and align their plans around. Further, the system allows organizations to avoid ad hoc management, inconsistent approaches to each part of the strategy, and/or misaligned prioritization and resource allocation.

The various features of the website can be viewed and interacted with by others as assigned by the organization. Access rights can be granted and limited through a variety of access control mechanisms based on an organization's security and technical needs.

Figure 16:
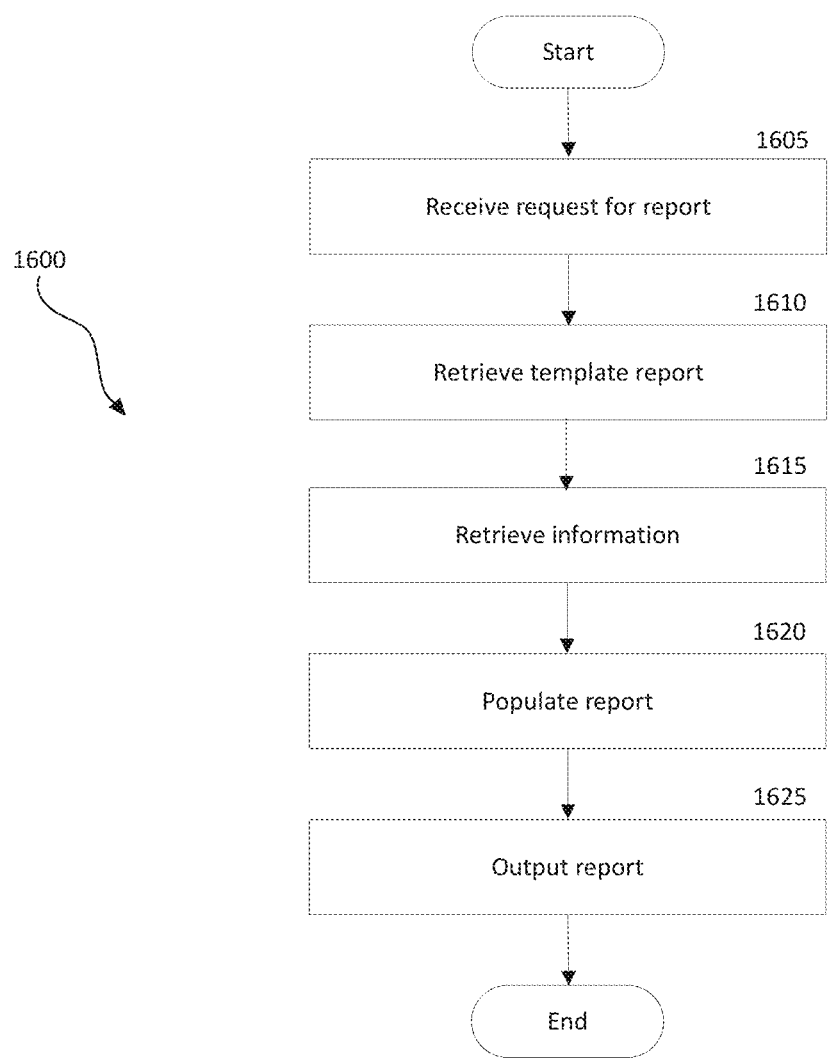
FIG. 16 is a flow diagram illustrating a process for generating a communicable report in accordance with some embodiments of the present technology.

FIG. 16 is a flow diagram illustrating a process 1600 for generating a communicable report in accordance with some embodiments of the present technology. In some embodiments, for example, the process 1600 can generate the example report illustrated in FIG. 15F.

At block 1605, the system receives a request for the report from a user. In some embodiments, the request can specify a document type requested by the user (e.g., Word document, PowerPoint, PDF, text file, virtual reality file, 3D graphic file, etc.). In some embodiments, the request can specify a specific format or design for a structured presentation (e.g., the user can select a first format for a report to a CEO and a second format for a report for investors). In some embodiments, the request can specify media (e.g., audio, visuals, multimedia, etc.) for the report. In some embodiments, the request can specific where the report should be sent after generation (e.g., allowing a team member to send the report directly to a manager after it is generated).

At block 1610, the system retrieves a template for the report. In some embodiments, the report template can be based on the information in the request, such as the document type. In some embodiments, two or more templates can be retrieved and presented to the user for selection. In some embodiments, the template can be preloaded into the system by a user and contain indications of the what sources of information to include in the report. The template(s) can also be purchased from a marketplace of template reports. In some embodiments, the system can apply a machine learning algorithm (e.g., a decision tree algorithm, neural network, and/or regression analysis) to one or more users' history on the website, one or more users' previously generated reports, and/or on the organization's history of exporting information to determine which information to include in the report and generate a template of the same.

In block 1615, the system retrieves information to populate the report (e.g., by querying the sources of information associated with the report template). At block 1620, the system populates the report with the retrieved information. In some embodiments, blocks 1615 and 1620 can be an iterative process as the system populates a portion of the template of the report and needs to retrieve other information to populate other portions. However, the retrieval and entry can happen nearly instantaneously, thereby eliminating a previously cumbersome process a user would have to go through to generate a similar report.

At block 1625, the system outputs the report to the user in the specified format and completes the process 1600. In some embodiments, the system can output a report and complete process 1600 within seconds of the user requesting the report (e.g., thereby generating the report in real time).

Figure 17:
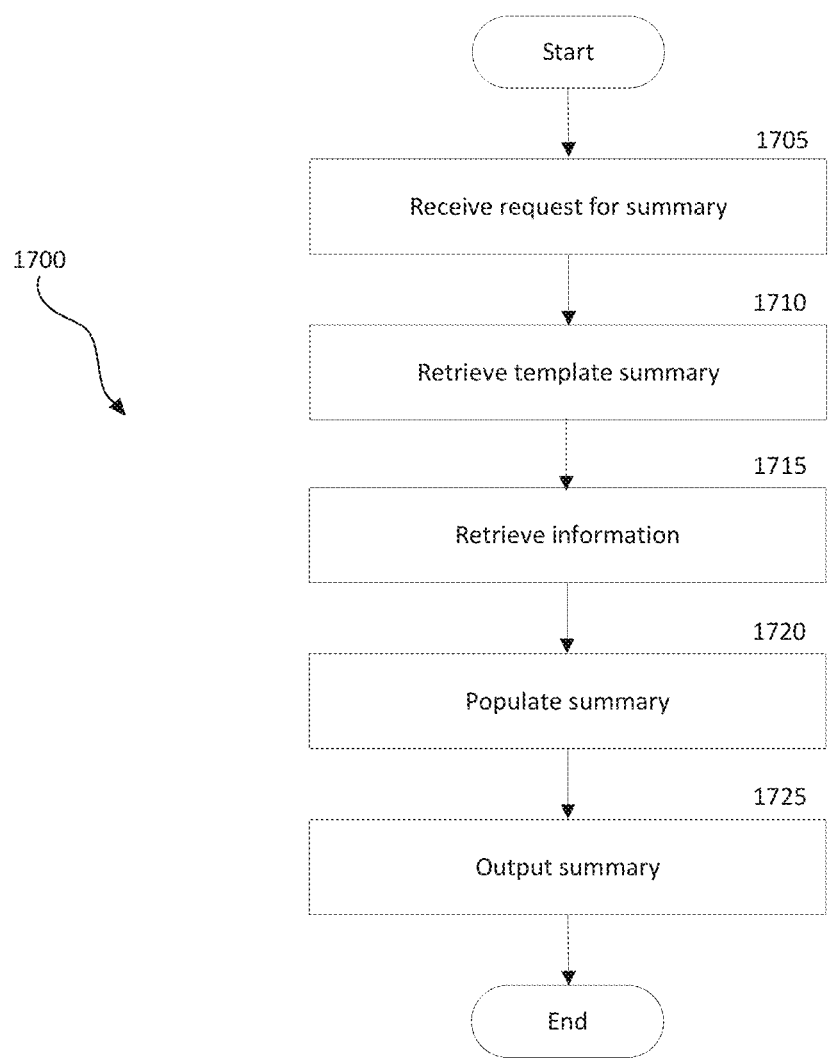
FIG. 17 is a flow diagram illustrating a process for generating a communicable summary in accordance with some embodiments of the present technology.

FIG. 17 is a flow diagram illustrating a process 1700 for generating a communicable summary in accordance with some embodiments of the present technology. In some embodiments, the process 1700 is similar to the process 1600 described above, but results in a more concise summary of information.

At block 1705, the system receives a request for the report from a user. In some embodiments, the request can specify a document type requested by the user (e.g., Word document, PowerPoint, PDF, text file, virtual reality file, 3D graphic file, etc.). In some embodiments, the request can specify a specific format or design for a structured presentation. In some embodiments, the request can specify media (e.g., audio, visuals, multimedia, etc.) for the report. In some embodiments, the request can specific where the report should be sent after generation (e.g., allowing a team member to send the report directly to a manager after it is generated).

At block 1710, the system retrieves a template for the summary. In some embodiments, the summary template can be based on the information in the request, such as the document type. In some embodiments, two or more templates can be retrieved and presented to the use for selection. In some embodiments, the template can be preloaded into the system by a user and contain indications of the what sources of information are important enough to include in the summary. The template(s) can also be purchased from a marketplace of template summaries. In some embodiments, the system can apply a machine learning algorithm to one or more users' history on the website, one or more users' previously generated reports, and/or to the organization's history of exporting information to determine which information is critical to include in the summary and generate a template of the same.

In block 1715, the system retrieves information to populate the summary (e.g., by querying the sources of information associated with the summary template. At block 1720, the system populates the summary with the retrieved information. In some embodiments, blocks 1715 and 1720 can be an iterative process as the system populates a portion of the template of the summary and needs to retrieve other information to populate other portions. However, the retrieval and entry can happen nearly instantaneously, thereby eliminating a previously cumbersome process a user would have to go through to decide which information is important enough to include in the summary and generate the same.

At block 1725, the system outputs the summary to the user in the specified format and completes the process 1700. In some embodiments, the system can output a report and complete process 1700 within seconds of the user requesting the report (e.g., thereby generating the report in real time).

Figure 18:
FIG. 18 is a display diagram of an example user interface through which a user can manage access rights in the system in accordance with some embodiments of the present technology.

FIG. 18 is a display diagram of an example user interface through which a user can manage access rights in the system in accordance with some embodiments of the present technology. For example, in some embodiments, the system can allow an organizational leader or administrator to control (e.g., grant, extend, restrict, revoke, etc.) access rights to various priorities in the organization's portfolio and/or features on the system. Through the illustrated interface, the user can manage access rights in a simple, efficient manner as teams or organizations change. In some embodiments, for example, the system allows an administrator to grant a first group of users access to all functionalities and views, a second group of users only a subset of editing rights, a third group of users read-only rights to only view items, and/or a fourth group of users only access to see selected portions of the website and/or a priority's information.

Figure 20:
FIG. 20 is a display diagram of an example user interface an Administrator can use to edit and customize the format of the information contained in the system in accordance with some embodiments of the present technology.

FIGS. 19 and 20 are display diagrams of example user interfaces an administrator can use to edit and customize the format of the user interfaces in the system and the information contained therein in accordance with some embodiments of the present technology. In some embodiments, for example, the system can allow an administrator or organizer to edit specific feature of the website from an Admin panel to customize the feature for the organization's particular needs. In some embodiments, the system can allow the administrator or organizer to change the name of business units and/or edit particular fields throughout the system. In some embodiments, the system can enable the administrator or organizer to re-design and/or customize of the layout and design of various user interfaces to match the needs of the organization. For example, the system can enable the administrator to design new layout templates, colors, shapes, logos, images, icons or changing of filters and information inputs. In some embodiments, once a new template has been generated, the system can automatically reformat information in the organization's profile according to the template.

FIGS. 21A-21E are display diagrams of example user interfaces a user can interact with to purchase pre-designed templates and information from a marketplace in the system in accordance with some embodiments of the present technology. That is, in some embodiments, the system can host a marketplace of templates and/or priorities and information that an administrator can interact with to purchase designs and information.

Figure 21A:
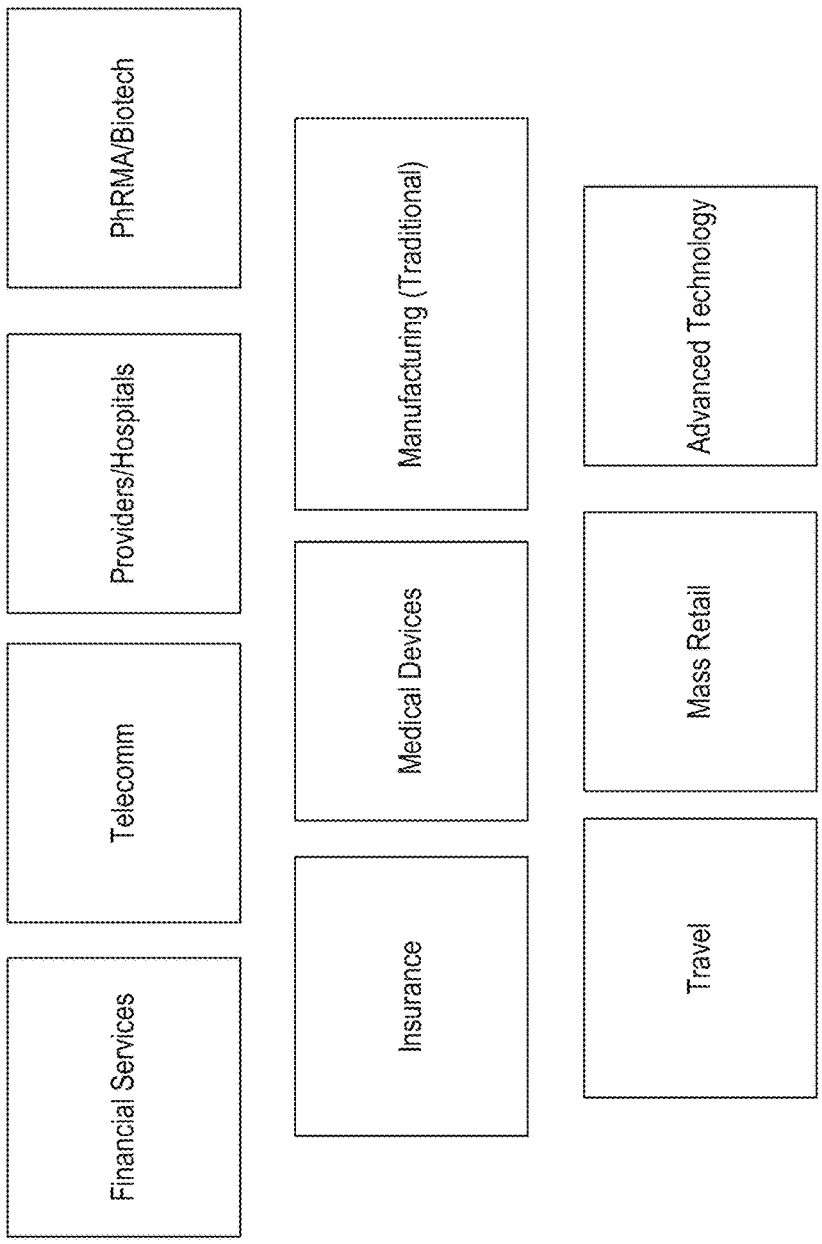
FIG. 21A is a display diagram of an example user interface a user can interact with to purchase pre-designed templates and information in accordance with some embodiments of the present technology.

FIG. 21A is a display diagram of an example display diagram of a user interface with a marketplace delineated by industry. Through the interface, users can select an industry to find templates related to their field of work.

FIG. 21B is a display diagram of an example display diagram of a user interface with the marketplace delineated into a set of subcategories within an industry to allow the user to find a more refined and tailored template based on a specific organizational need. In some embodiments, the templates can be pre-populated with information on recommended priorities and imperatives for each priority.

FIG. 21C is a display diagram of an example display diagram of a user interface displaying the priority framework after a user has selected a specific template. For example, a business relying on consumer sales of goods can purchase a template from the marketplace that is pre-formatted to optimize features for a sales-driven business, and the template can be prepopulated with priorities, imperatives, and/or other information relevant to consumer sales. For example, if a user selects a PHARMA template based on supply chain innovation, the template can be tailored to that specific challenge, down to the type of Pharma company, its size, etc.

FIG. 21D is a display diagram of an example display diagram of a user interface in which the system has provided prepopulated content tailored to the user. The templates can allow organizations to save time on in compiling a strategy, thereby enabling them to dedicate more resources to accomplishing their priorities. In some embodiments, content can be provided as part of the template, or can be made available for purchase or download independently in the marketplace. For example, in some embodiments, the system can recommend information to the user as part of the template based on pre-defined association. In some embodiments, the system can make use of machine learning algorithms, semantic analyses, etc. to process a template and/or the organization's priorities to identify information to recommend. Further, in some embodiments, the system can also directly connect an organization with a need for specific information to those who have it, or may have it, and enable a transaction to purchase that information. In some embodiments, information can be sold in large packages to populate an entire template. In other embodiments, information can be sold a la carte to populate portions of a template.

FIG. 21E is a display diagram of an example display diagram of a user interface displaying relatively small descriptive portions of recommended information that the user can purchase or download individually. Further, in some embodiments, the system can enable a marketplace for consultants to design templates and/or input information relevant to varying industries.

In some embodiments, the system can enable a marketplace between organizations in the system by identifying potential partnerships based on priorities, imperatives, and/or other information the organizations house in the system. For example, the system can allow an organization to monetize their information and strategic frameworks by making the same available for purchase on the marketplace. Because the system is interconnected, the system can place the organization's information and/or strategic frameworks for sale in an efficient manner, thereby enabling transactions that otherwise could not occur. In some embodiments, the system can apply machine learning algorithms to the customization of organizations within the system to design templates and/or recommend various priorities or imperatives to organizations.

In some embodiments, the system can enable organizations to put their needs out for biding. For example, an organization could publish that they are trying to solve problem X, and allow multiple other organizations or parties to connect with the organization directly and/or submit a proposal to partner with the organization to solve the problem X.

It will be understood by one of skill in the art that the components discussed above can be built in a modular fashion to enable select features to be deployed and used by an organization. For example, in some embodiments, the calendar feature of FIG. 15C can be used as a stand-alone component even if the planning component of FIGS. 2A-2E is not deployed; the planning component can be deployed independent of the later Management components of FIGS. 9A-9G, and/or the various Management components can be deployed independent of whether all of the Management features are deployed.

In some embodiments, the system can be connected to other systems such as a knowledge management system, shared databases or storage platforms, etc. to pull information and files from, or upload directly to, the other systems.

Figure 22A:
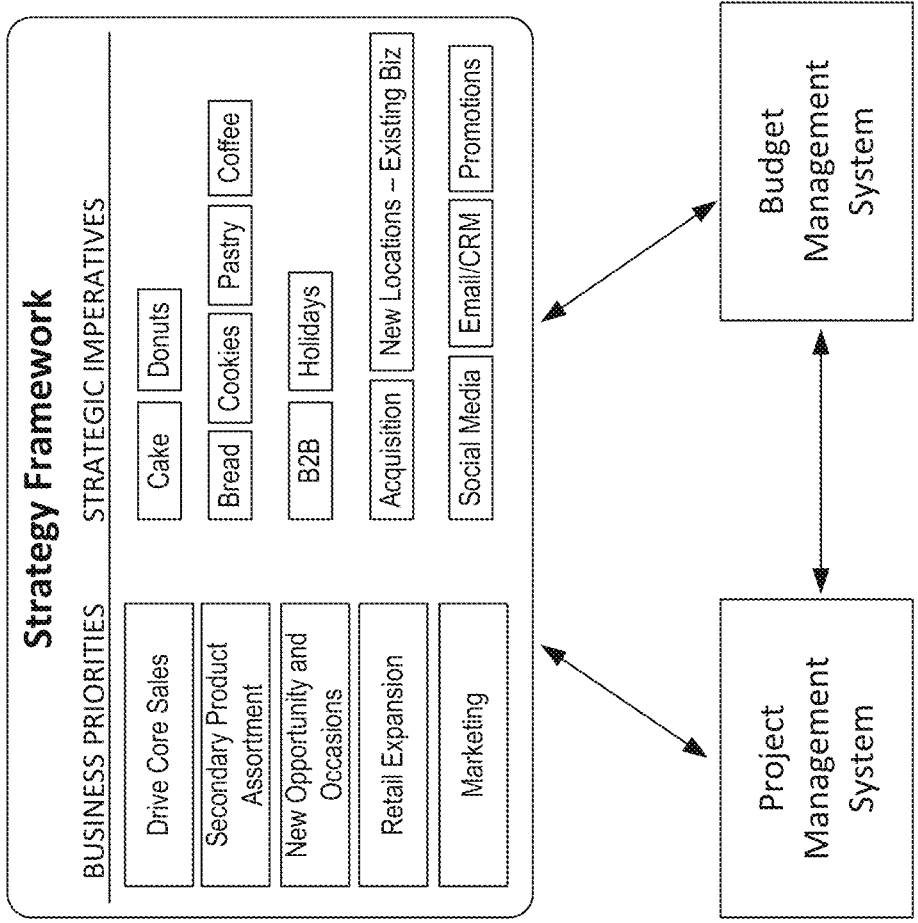
FIG. 22A is a schematic diagram illustrating the connection of the system to various other systems in accordance with some embodiments of the present technology.

FIG. 22A is a schematic diagram illustrating the connection of the system to various other systems in accordance with some embodiments of the present technology. The interconnected structure of the systems can help establish a transparent and clear connection between a desired outcome, what work is being done in pursuit of that outcome, and what resources it will take to achieve it. In some embodiments, the system can enable the user to enter various information and/or orders into the other systems it is connected to.

FIG. 22B is a display diagram of an example user interface a user can interact with to add a project to the project management system from the website's system in accordance with some embodiments of the present technology.

In some embodiments, the system can also be connected to relevant internal or external budget and resource management systems, or other systems where such information is collected, to allow a user to quickly see what resources are being consumed and reduce duplicative efforts generating reports between the systems.

Figure 23:
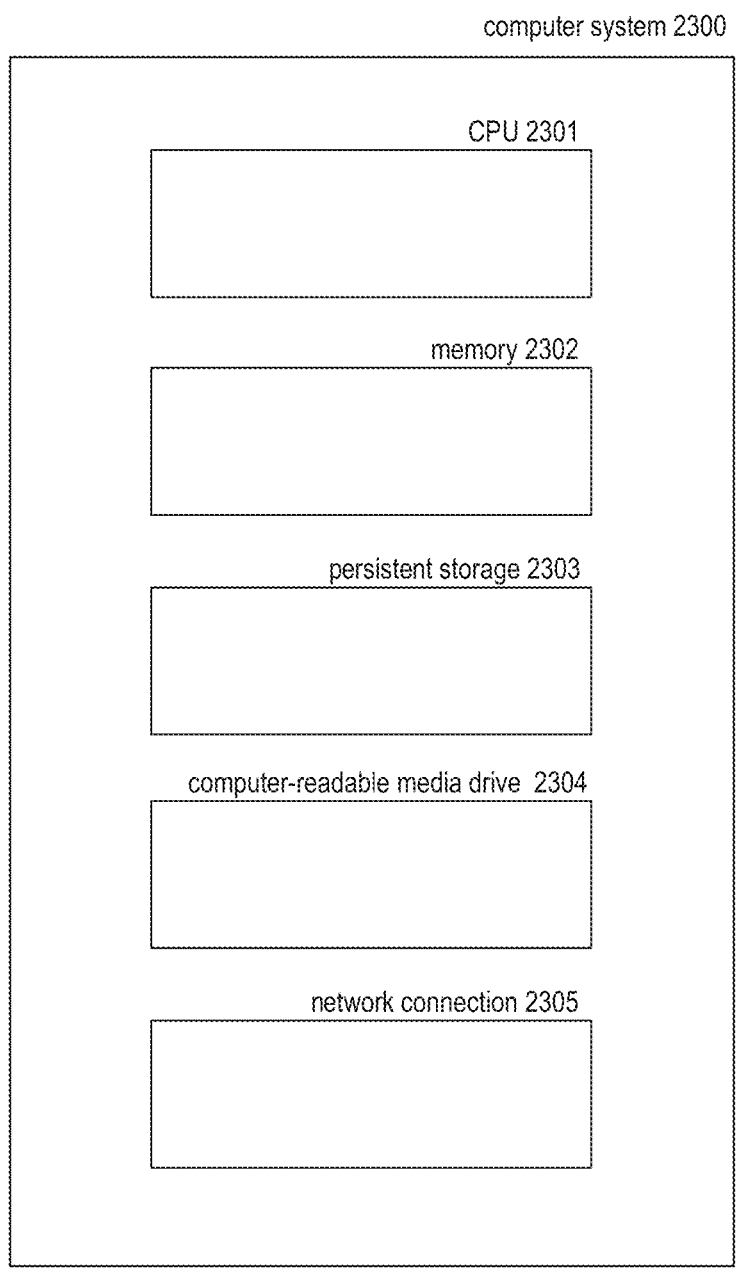
FIG. 23 is a block diagram showing some of the components typically incorporated in at least some of the computer systems and other devices on which the disclosed system operates in accordance with some embodiments of the present technology.

FIG. 23 is a block diagram showing some of the components typically incorporated in at least some of the computer systems and other devices on which the disclosed system operates. In various embodiments, these computer systems and other devices 2300 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit (CPU) 2301 for executing computer programs; a computer memory 2302 for storing programs and data while they are being used, including the facility and associated data, an operating system including a kernel, and device drivers; a persistent storage device 2303, such as a hard drive or flash drive for persistently storing programs and data; computer-readable media drives 2304 that are tangible storage means that do not include a transitory, propagating signal, such as a floppy, CD-ROM, or DVD drive, for reading programs and data stored on a computer-readable medium; and a network connection 2305 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 24:
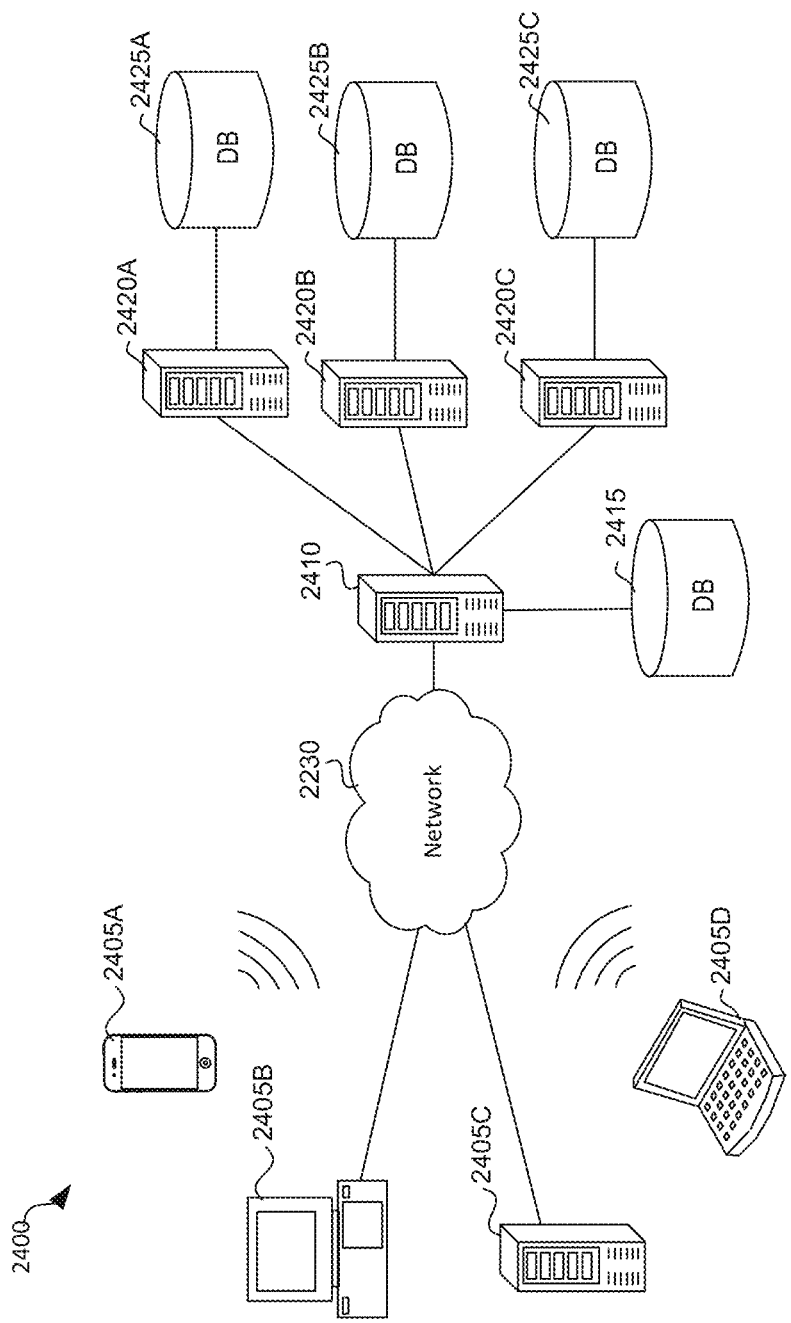
FIG. 24 is a system diagram illustrating an example of a computing environment in which the disclosed system operates in some embodiments of the present technology.

FIG. 24 is a system diagram illustrating an example of a computing environment in which the disclosed system operates in some embodiments. In some embodiments, environment 2400 includes one or more client computing devices 2405A-D, examples of which can host the system 100. Client computing devices 2405 operate in a networked environment using logical connections through network 2430 to one or more remote computers, such as a server computing device.

In some embodiments, server 2410 is an edge server which receives client requests and coordinates fulfillment of those requests through other servers, such as servers 2420A-C. In some embodiments, server computing devices 2410 and 2420 comprise computing systems, such as the system 100. Though each server computing device 2410 and 2420 is displayed logically as a single server, server computing devices can each be a distributed computing environment encompassing multiple computing devices located at the same or at geographically disparate physical locations. In some embodiments, each server 2420 corresponds to a group of servers.

Client computing devices 2405 and server computing devices 2410 and 2420 can each act as a server or client to other server or client devices. In some embodiments, servers (2410, 2420A-C) connect to a corresponding database (2415, 2425A-C). As discussed above, each server 2420 can correspond to a group of servers, and each of these servers can share a database or can have its own database. Databases 2415 and 2425 warehouse (e.g., store) information such as user data, project data, tasks data, and so on. Though databases 2415 and 2425 are displayed logically as single units, databases 2415 and 2425 can each be a distributed computing environment encompassing multiple computing devices, can be located within their corresponding server, or can be located at the same or at geographically disparate physical locations.

Network 2430 can be a local area network (LAN) or a wide area network (WAN), but can also be other wired or wireless networks. In some embodiments, network 2430 is the Internet or some other public or private network. Client computing devices 2405 are connected to network 2430 through a network interface, such as by wired or wireless communication. While the connections between server 2410 and servers 2420 are shown as separate connections, these connections can be any kind of local, wide area, wired, or wireless network, including network 2430 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology may include not only additional elements to those embodiments noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated.

In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A computer implemented method for implementing language processing and one or more machine learning algorithms to develop a strategy for addressing a problem statement of an organization, the computer implemented method comprising, by a processor:
   receiving via a first interactive form, information about a plurality of objectives related to the strategy;
   converting the information about the plurality of objectives into a standardized format to create the problem statement comprising one or more components for each of the plurality of objectives;
   automatically pre-populating a second interactive form with the formatted information to eliminate duplication of work and improve alignment between resources within the organization, wherein the second interactive form is a collaborative document;
   updating the information in the second interactive form, wherein updating the information comprises:
     preventing one or more users with access to the second interactive form, from publishing the information until the second interactive form has been completed with the one or more components;
     processing the information on the plurality of objectives to generate one or more recommendations of additional objectives related to the strategy based on additional information from external sources;
     generating, through semantic analysis of the information, a plurality of tags for the plurality of objectives, wherein each of the plurality of tags is associated with a difficulty level of one or more of the plurality of objectives;
     in response to generating the plurality of tags, automatically updating the information to further include at least one of the plurality of tags for each of the plurality of objectives;
     for each objective from the plurality of objectives:
       determining, using the language processing and the one or more machine learning algorithms, that the information is related to the objective by identifying one or more of: points of research, limitations among the resources, or connections between the objective and other objectives in the plurality of objectives;

iteratively populating, a portion of the second interactive form related to the objective based on updates to the information related to the other objectives from the plurality of objectives;

determining, through the semantic analysis, one or more of the external sources relevant to the objective to identify and recommend the one or more external sources as a recommendation;

generating, a notification related to the external source, when the external source is determined as relevant to the objective; and executing by regression analysis, the one or more machine learning algorithms, to predict a likelihood of success for the objective; and storing, the updated information about each of the plurality of objectives in the problem statement;

pre-populating a plurality of templates with the updated information about each of the plurality of objectives; and publishing the updated information in the plurality of templates simultaneously with the storing of the updated information so that authorized users can access and visualize the plurality of objectives.

2. The computer implemented method of claim 1 wherein at least one objective of the plurality of objectives is a priority, and wherein the plurality of objectives comprise one or more of:

a description of the priority, an indication of a relevance of the priority to the organization, a description of one or more challenges for the priority, an indication of an expected resource requirement, an indication of personnel involved in the priority, or a specification of one or more imperatives related to the priority.

3. The computer implemented method of claim 2 wherein the updating of the information in the second interactive form further comprises prompting the one or more users with access to the second interactive form to provide an input related to the priority, wherein the input includes at least one of:

an update to the description of the priority, an update to the indication of the relevance of the priority to the organization, an update to the description of the one or more challenges for the priority, an update to the indication of the expected resource requirement, an update to the indication of the personnel involved in the priority, or an update to the specification of the one or more imperatives related to the priority.

4. The computer implemented method of claim 1, further comprising automatically generating a second notification, to the authorized users, after publishing the updated information in the plurality of templates, the second notification alerting the authorized users about the updated information to provide the authorized users with immediate access to the updated information.

5. The computer implemented method of claim 1 wherein the updating of the information in the second interactive form further comprises:

generating, by the one or more machine learning algorithms, a ranking of the plurality of objectives in order of most likely to be successful based on the predicted likelihood of success; and in response to generating the ranking, automatically updating the information to further include the ranking for each of the plurality of objectives.

6. The computer implemented method of claim 1 wherein the updating of the information in the second interactive form further comprises:

receiving an indication from one of the one or more users to provide a third party with access to the second interactive form; and in response to receiving the indication, generating a message including a link to the second interactive form.

7. The computer implemented method of claim 1, further comprising:

analyzing, using the language processing and the one or more machine learning algorithms, the updated information about each of the plurality of objectives to identify important dates in the updated information; and automatically generating a calendar with the identified important dates.

8. The computer implemented method of claim 7, further comprising publishing the calendar simultaneously with the storing of the updated information so that the authorized users can access the calendar to view the important dates.

9. A computer system for implementing language processing and one or more machine learning algorithms to develop a strategy for addressing a problem statement of an organization, the computer system comprising:

at least one processor; and at least one memory storing computer-executable instructions that, when executed by the at least one processor, control the computer system to:

receive via a first interactive form, information about a plurality of objectives related to the strategy;

convert the information about the plurality of objectives into a standardized format to create the problem statement comprising one or more components for each of the plurality of objectives;

automatically pre-populate a second interactive form with the formatted information to eliminate duplication of work and improve alignment between resources within the organization, wherein the second interactive form is a collaborative document;

update the information in the second interactive form, wherein to update the information the instructions control the computer system to:

prevent one or more users with access to the second interactive form, from publishing the information until the second interactive form has been completed with the one or more components;

process the information on the plurality of objectives to generate one or more recommendations of additional objectives related to the strategy based on additional information from external sources;

generate, through semantic analysis of the information, a plurality of tags for the plurality of objectives, wherein each of the plurality of tags is associated with a difficulty level of one or more of the plurality of objectives;

in response to generating the plurality of tags, automatically update the information to further include at least one of the plurality of tags for each of the plurality of objectives;

for each objective from the plurality of objectives:

determine, using the language processing and the one or more machine learning algorithms, that the information is related to the objective by identifying one or more of: points of research, limitations among the resources, or connections between the objective and other objectives in the plurality of objectives;

iteratively populate, a portion of the second interactive form related to the objective based on updates to the information related to the other objectives from the plurality of objectives;

determine, through the semantic analysis, one or more of the external sources relevant to the objective to identify and recommend the one or more external sources as a recommendation;

generate, a notification related to the external source, when the external source is determined as relevant to the objective; and execute, by regression analysis, the one or more machine learning algorithms to predict a likelihood of success for the objective; and store, the updated information about each of the plurality of objectives in the problem statement;

pre-populate a plurality of templates with the updated information about each of the plurality of objectives; and publish the updated information in the plurality of templates concurrently with the storing of the updated information so that authorized users can access and visualize the plurality of objectives.

10. The computer system of claim 9 wherein the instructions further control the computer system to:

analyze, using the language processing and the one or more machine learning algorithms, the updated information about each of the plurality of objectives to identify important dates in the updated information; and automatically generate a calendar with the identified important dates.

11. The computer system of claim 10 wherein the instructions further control the computer system to publish the calendar simultaneously with the storing of the updated information so that authorized users can access the calendar to view the important dates.

12. The computer system of claim 9 wherein, to update the information, the instructions further control the computer system to:

receive an indication from one of the one or more users to provide a third party with access to the second interactive form; and in response to receiving the indication, generate a message including a link to the second interactive form.

13. The computer system of claim 9 wherein, to update the information, the instructions further control the computer system to:

analyze, using the language processing and the one or more machine learning algorithms, the updated information to identify missing information related to at least one of the plurality of objectives; and prompt the one or more users to provide the missing information.

14. The computer system of claim 9 wherein the instructions further control the computer system to send a second notification to one or more additional users indicating the published updated information.

15. A non-transitory computer-readable storage medium storing instructions that, when executed by a computing system, cause the computing system to perform operations for implementing language processing and one or more machine learning algorithms to develop a strategy for addressing a problem statement of an organization, the operations comprising:

receiving via a first interactive form, information about a plurality of objectives related to the strategy;

converting the information about the plurality of objectives into a standardized format to create the problem statement comprising one or more components for each of the plurality of objectives;

automatically pre-populating a second interactive form with the formatted information to eliminate duplication of work and improve alignment between resources within the organization, wherein the second interactive form is a collaborative document;

updating the information in the second interactive form, wherein updating the information comprises:

preventing one or more users with access to the second interactive form, from publishing the information until the second interactive form has been completed with the one or more components;

processing the information on the plurality of objectives to generate one or more recommendations of additional objectives related to the strategy based on additional information from external sources;

generating, through semantic analysis of the information, a plurality of tags for the plurality of objectives, wherein each of the plurality of tags is associated with a difficulty level of one or more of the plurality of objectives;

in response to generating the plurality of tags, automatically updating the information to further include at least one of the plurality of tags for each of the plurality of objectives;

for each objective from the plurality of objectives:

determining, using the language processing and the one or more machine learning algorithms, that the information is related to the objective by identifying one or more of: points of research, limitations among the resources, or connections between the objective and other objectives in the plurality of objectives;

iteratively populating, a portion of the second interactive form related to the objective based on updates to the information related to the other objectives from the plurality of objectives;

determining, through the semantic analysis, one or more of the external sources relevant to the objective to identify and recommend the one or more external sources as a recommendation;

generating, a notification related to the external source, when the external source is determined as relevant to the objective; and executing by regression analysis, the one or more machine learning algorithms, to predict a likelihood of success for the objective; and storing, the updated information about each of the plurality of objectives in the problem statement;

pre-populating a plurality of templates with the updated information about the plurality of objectives; and publishing the updated information in the plurality of templates simultaneously with the storing of the updated information so that authorized users can access and visualize the plurality of objectives.

16. The non-transitory computer-readable storage medium of claim 15 wherein the operations further comprise:

receiving a request for a report in a specific format from a first user of the authorized users;

retrieving a template, from the plurality of templates based on the specific format in the request; and outputting the report to the first user in the specified format.

17. The non-transitory computer-readable storage medium of claim 15 wherein updating the information in the second interactive form further comprises:

generating, by the one or more machine learning algorithms, a ranking of the plurality of objectives in order of most likely to be successful based on the predicted likelihood of success; and in response to generating the ranking, automatically updating the information to further include the ranking for each of the plurality of objectives.

18. The non-transitory computer-readable storage medium of claim 15 wherein the operations further comprise automatically generating a second notification, to the authorized users, after publishing the updated information.

19. The non-transitory computer-readable storage medium of claim 15 wherein the updated information includes one or more important dates relevant to at least one objective from the plurality of objects, and wherein pre-populating the plurality of templates with the updated information includes generating pre-populating a calendar with the one or more important dates.

20. The non-transitory computer-readable storage medium of claim 19 wherein the operations further comprise automatically generating a second notification, to at least one of the authorized users, indicating the one or more important dates.

* * * * *